United States Patent
Raffaele et al.

(10) Patent No.: US 8,245,627 B2
(45) Date of Patent: Aug. 21, 2012

(54) SCOTCH YOKE ENGINE OR PUMP

(76) Inventors: Peter Robert Raffaele, Mona Vale (AU); Michael John Raffaele, Mona Vale (AU)

(*) Notice: Subject to any disclaimer, the term of this patent is extended or adjusted under 35 U.S.C. 154(b) by 812 days.

(21) Appl. No.: 12/377,255

(22) PCT Filed: Oct. 11, 2007

(86) PCT No.: PCT/AU2007/001536
§ 371 (c)(1), (2), (4) Date: Feb. 11, 2009

(87) PCT Pub. No.: WO2008/017132
PCT Pub. Date: Feb. 14, 2008

(65) Prior Publication Data
US 2010/0180762 A1    Jul. 22, 2010

(30) Foreign Application Priority Data

Aug. 11, 2006 (AU) .................. 2006904356
Aug. 15, 2006 (AU) .................. 2006904419

(51) Int. Cl.
*F01B 9/04* (2006.01)
*F02B 75/32* (2006.01)

(52) U.S. Cl. ............................ 92/140; 92/179
(58) Field of Classification Search .......... 92/140, 92/179, 187; 403/364
See application file for complete search history.

(56) References Cited

U.S. PATENT DOCUMENTS 3,911,753 A * 10/1975 Daub .......................... 74/40
4,013,048 A *  3/1977 Reitz ......................... 92/187

FOREIGN PATENT DOCUMENTS
DE           3641782 A1 *  6/1987
* cited by examiner

*Primary Examiner* — Thomas E Lazo
(74) *Attorney, Agent, or Firm* — Pedersen and Company, PLLC; Ken J. Pedersen; Barbara S. Pedersen

(57) ABSTRACT

An improved scotch yoke engine of pump including a piston joined to a yoke structure wherein the piston (1) is free to move along at least one axis defined by a flying cross (60) relative to the yoke structure (7) during piston reciprocation, the piston and yoke structure being joined in a flat type joint arrangement and the piston prevented from rotation around the piston axis by engagement of the piston and the yoke with the flying cross, the flying cross being not locked in position between the piston base (50) and the yoke shank end arrangement (700).

15 Claims, 26 Drawing Sheets

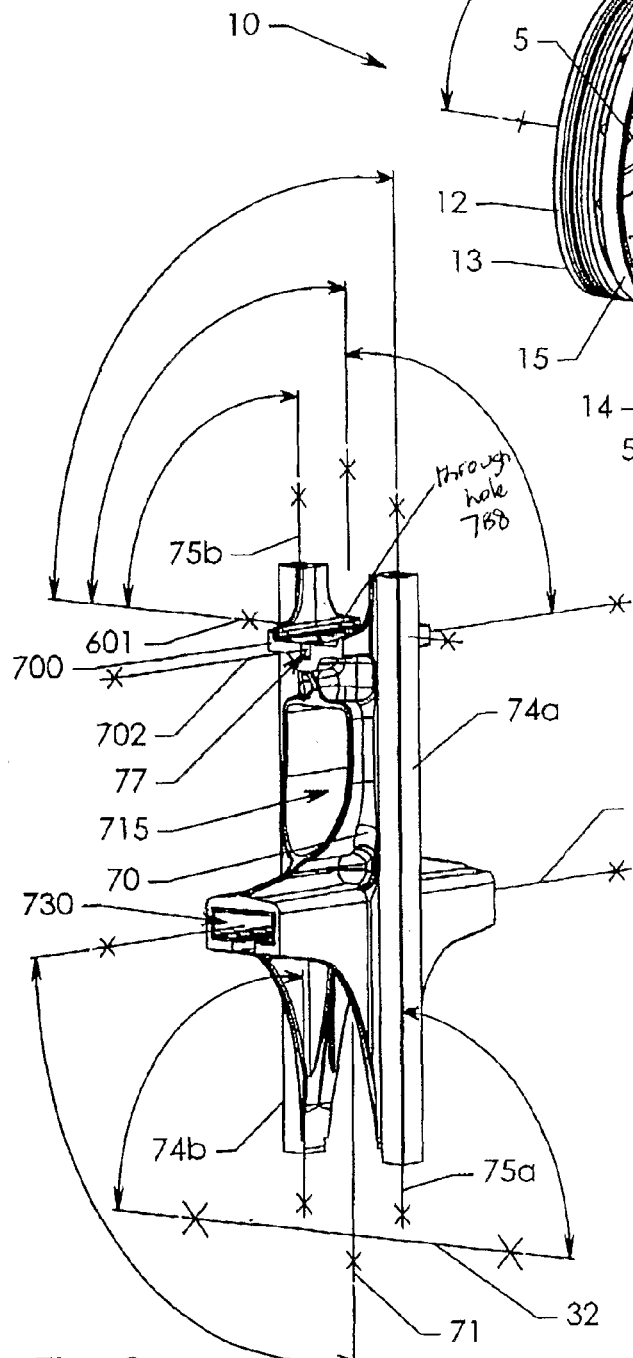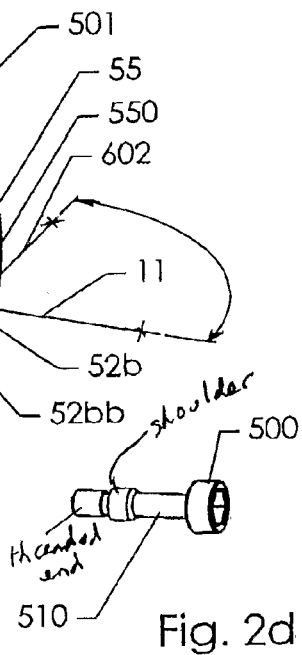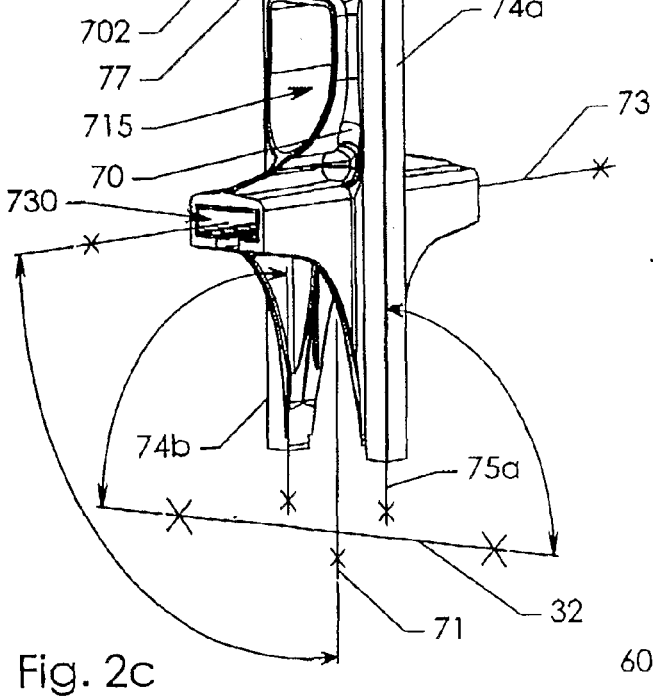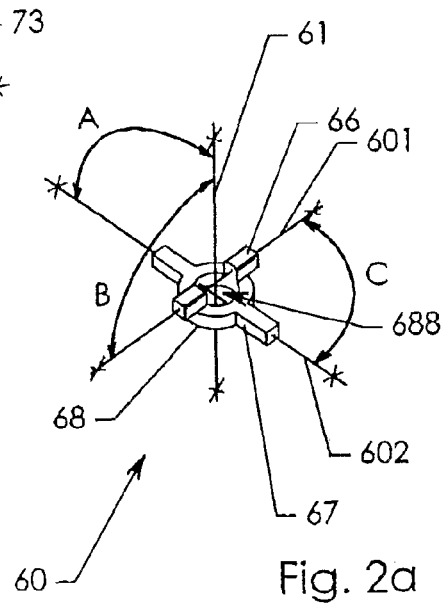

Fig. 3b
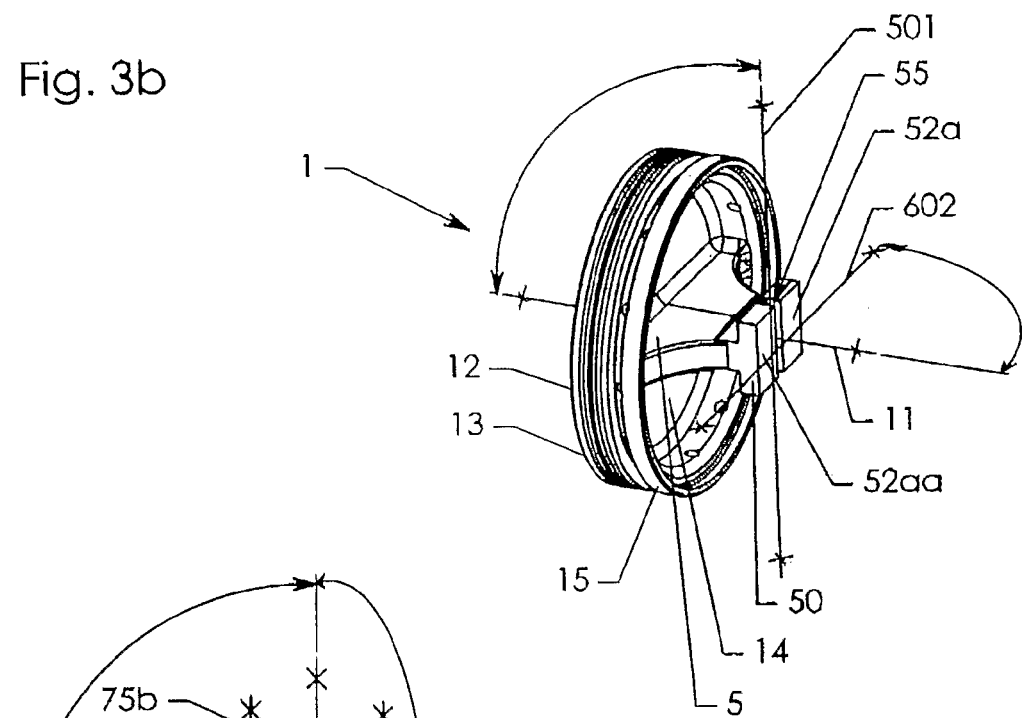
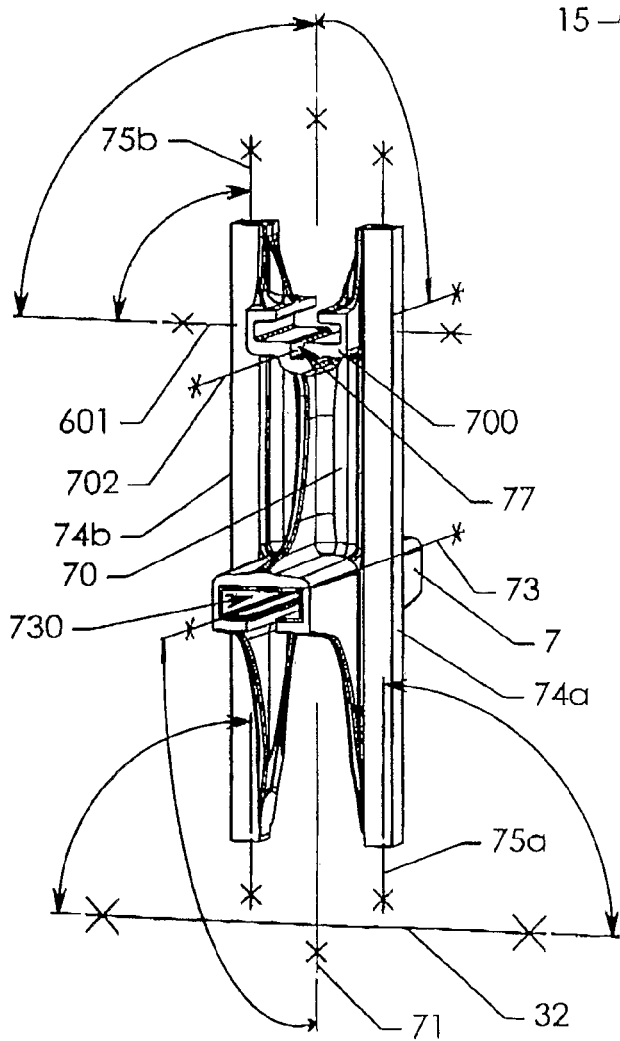
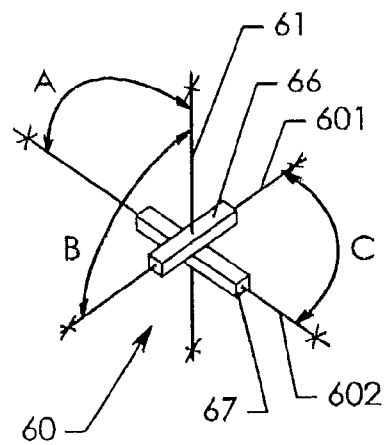
Fig. 3a
Fig. 3c

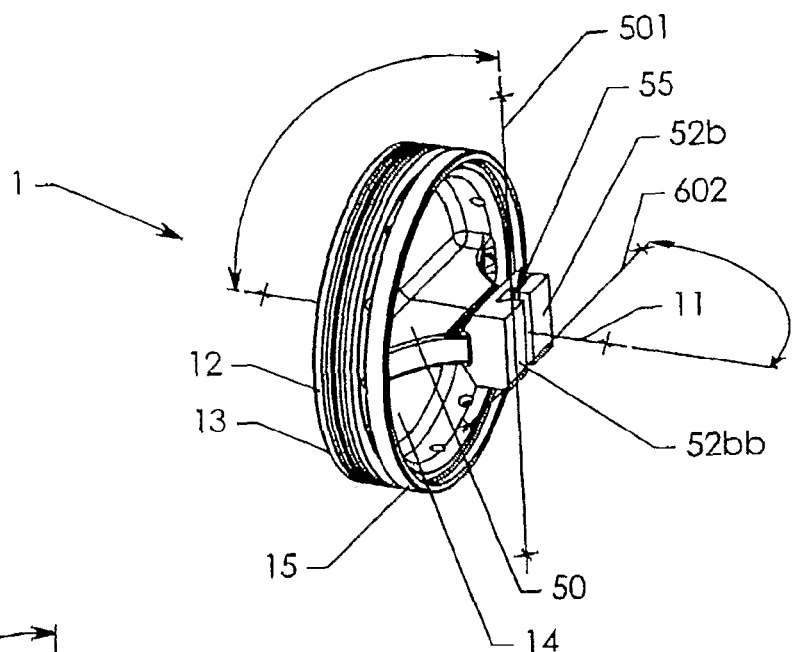
Fig. 4b
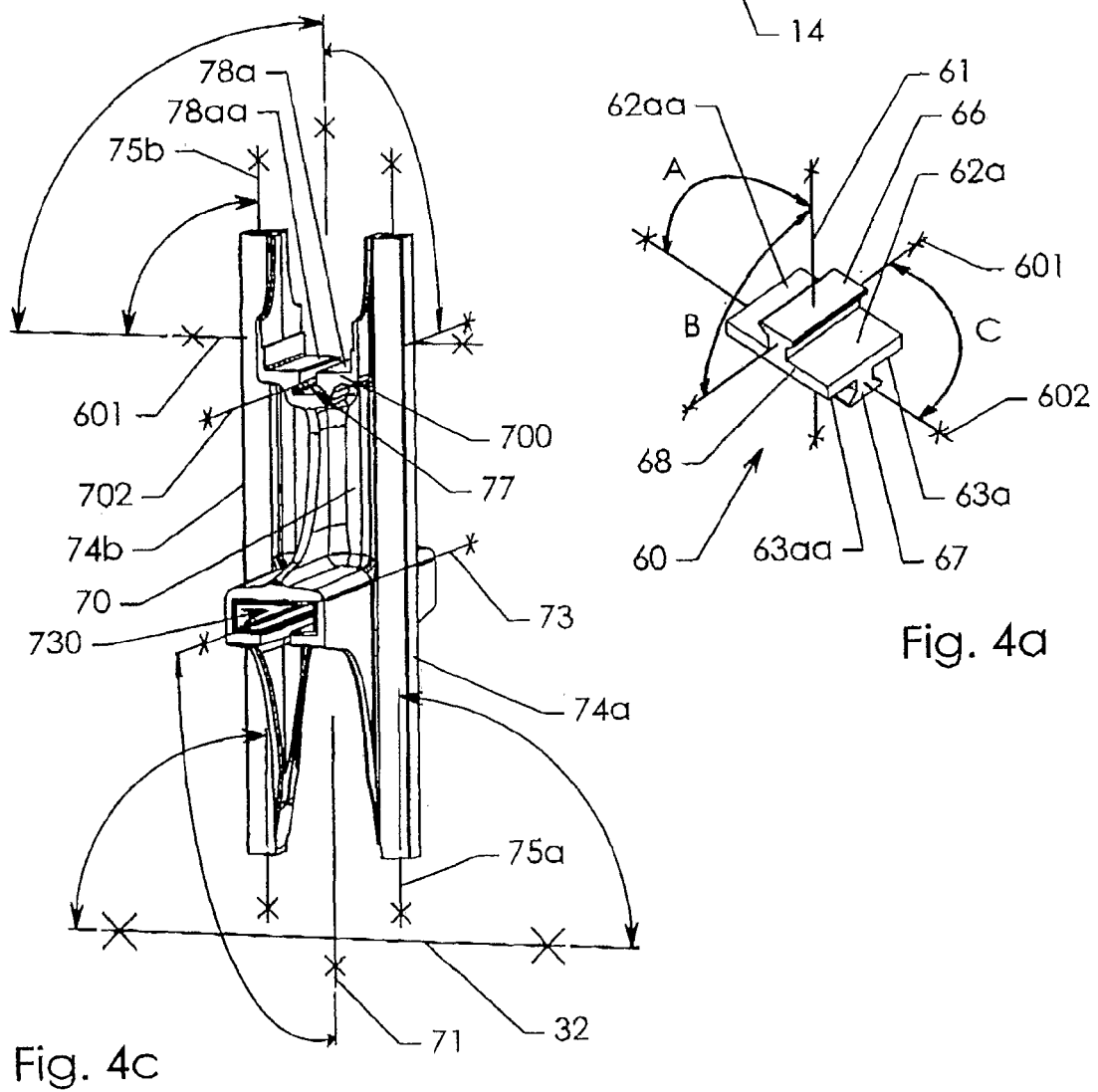
Fig. 4a
Fig. 4c

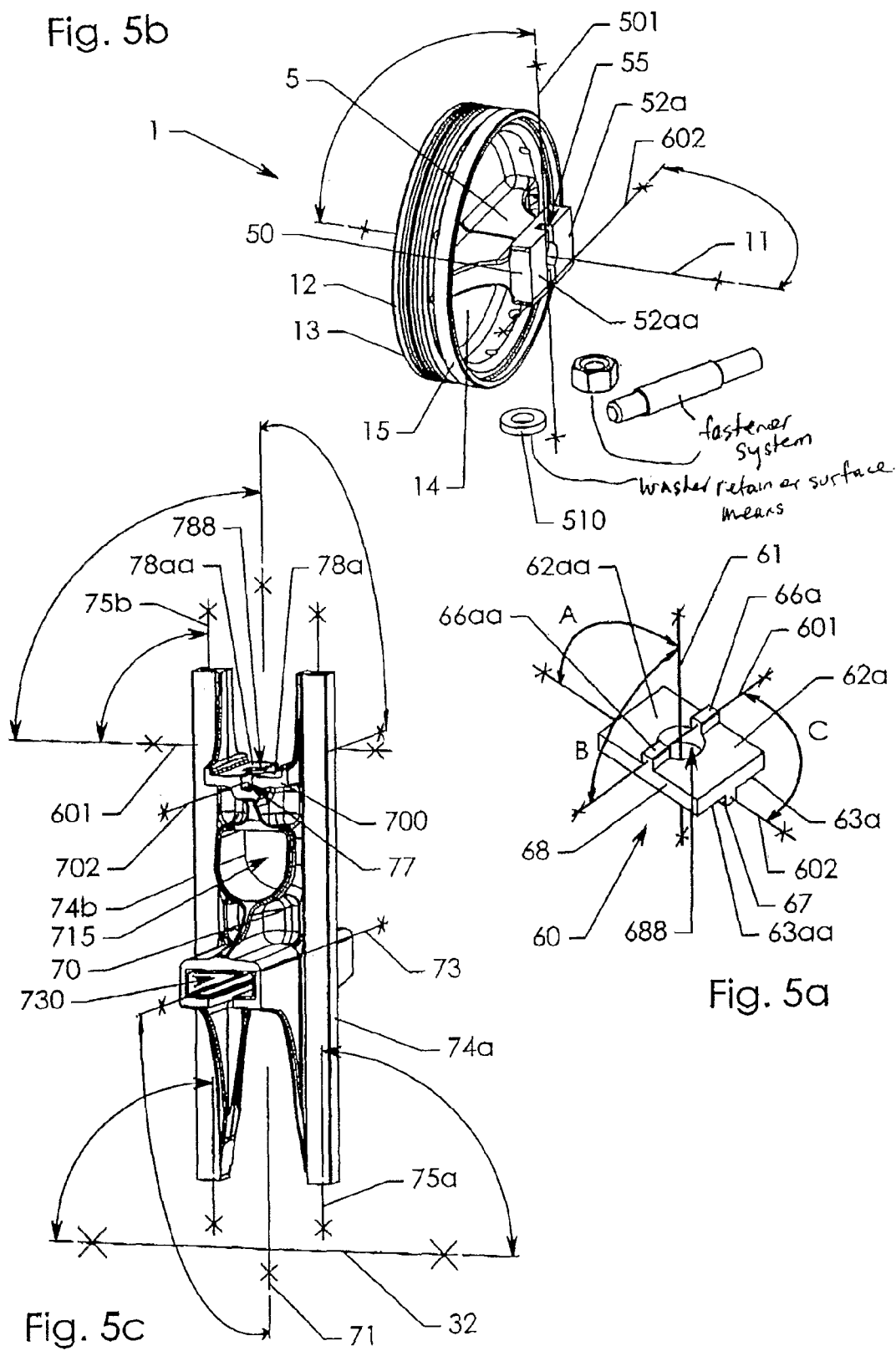

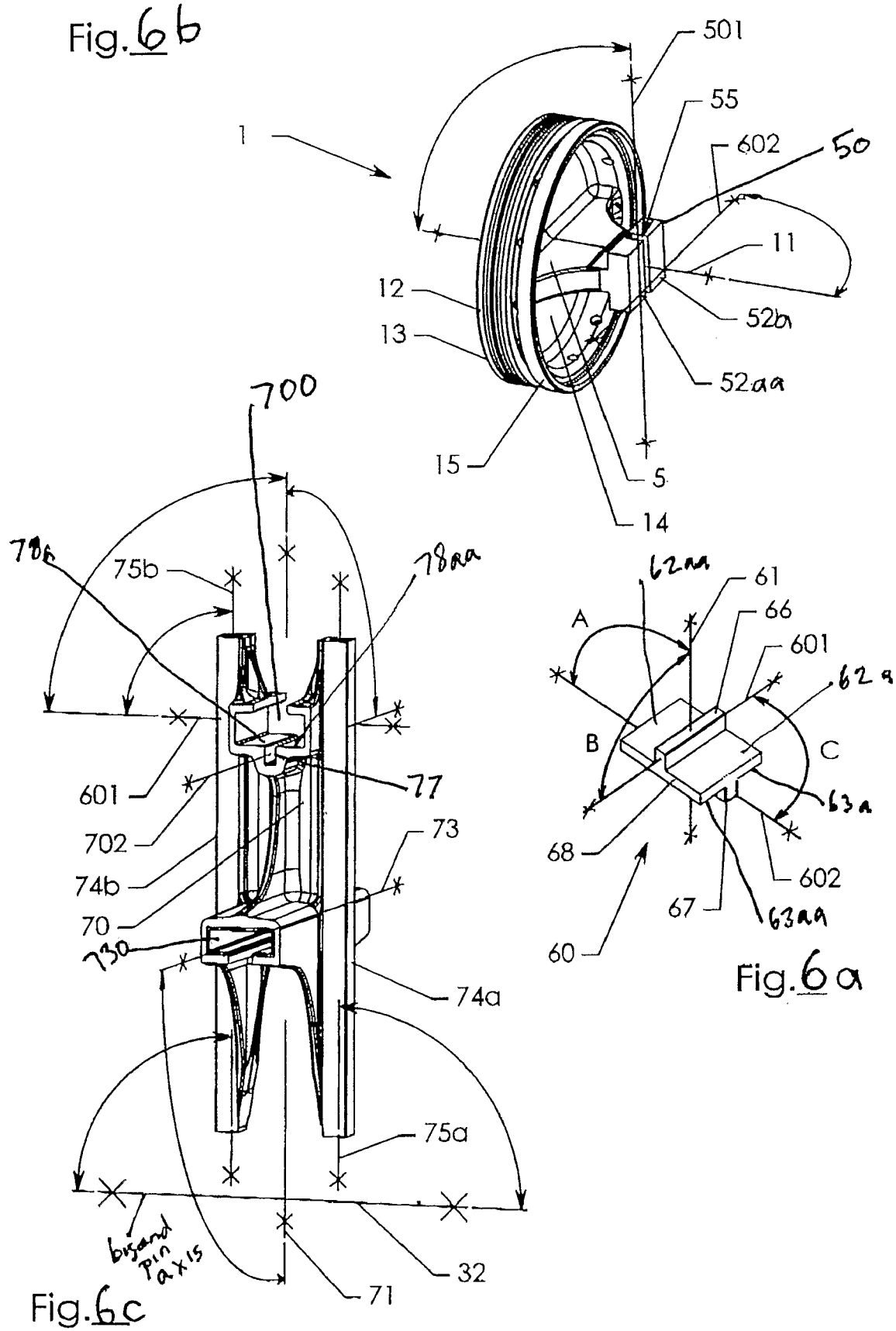

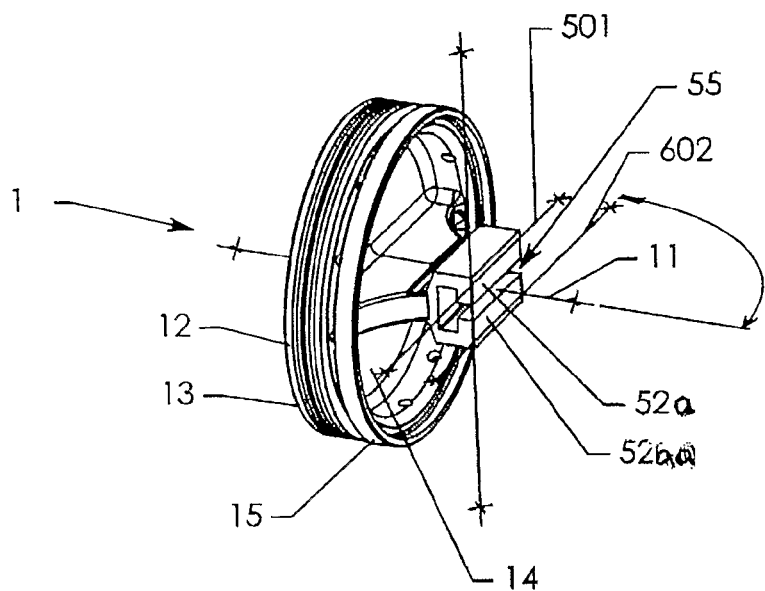
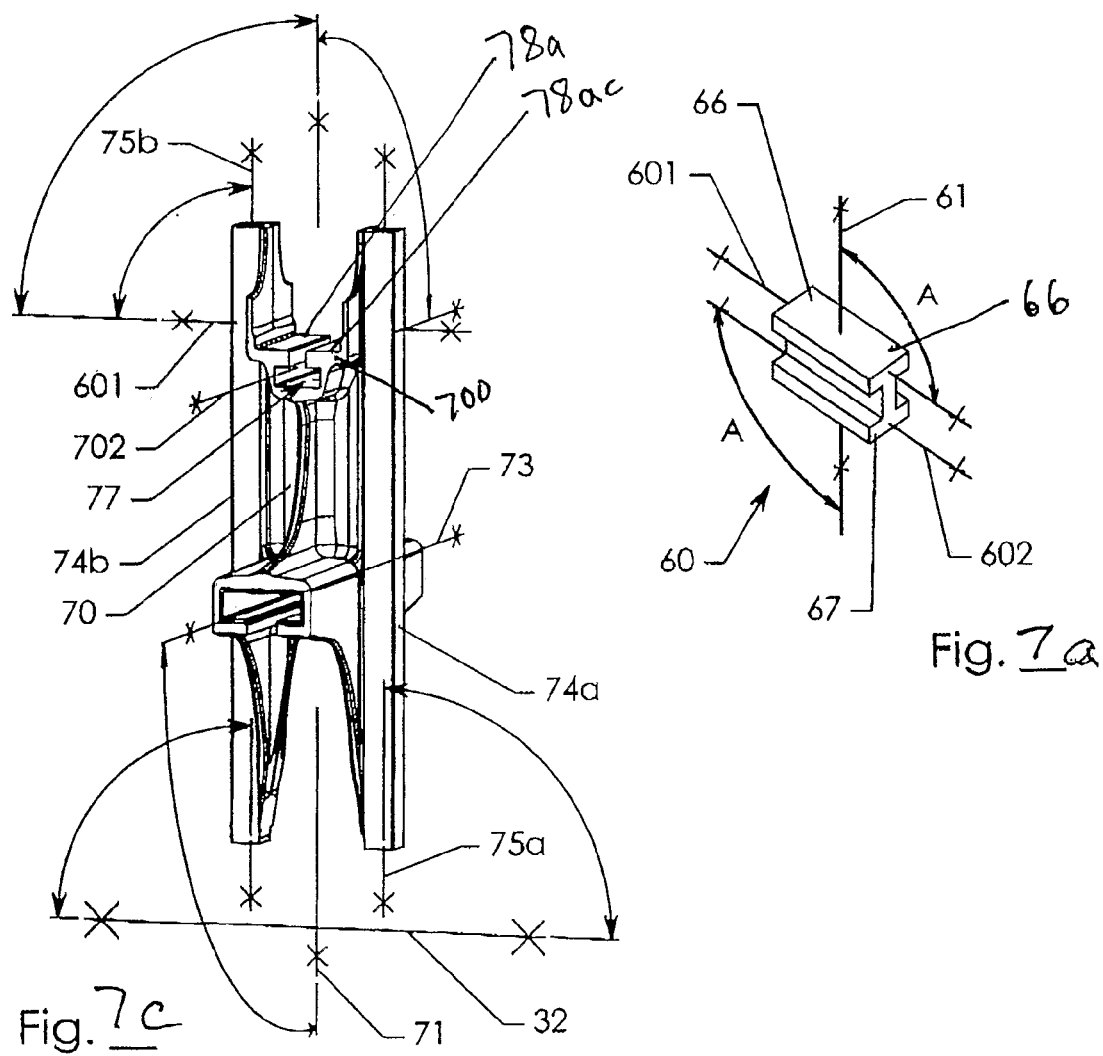

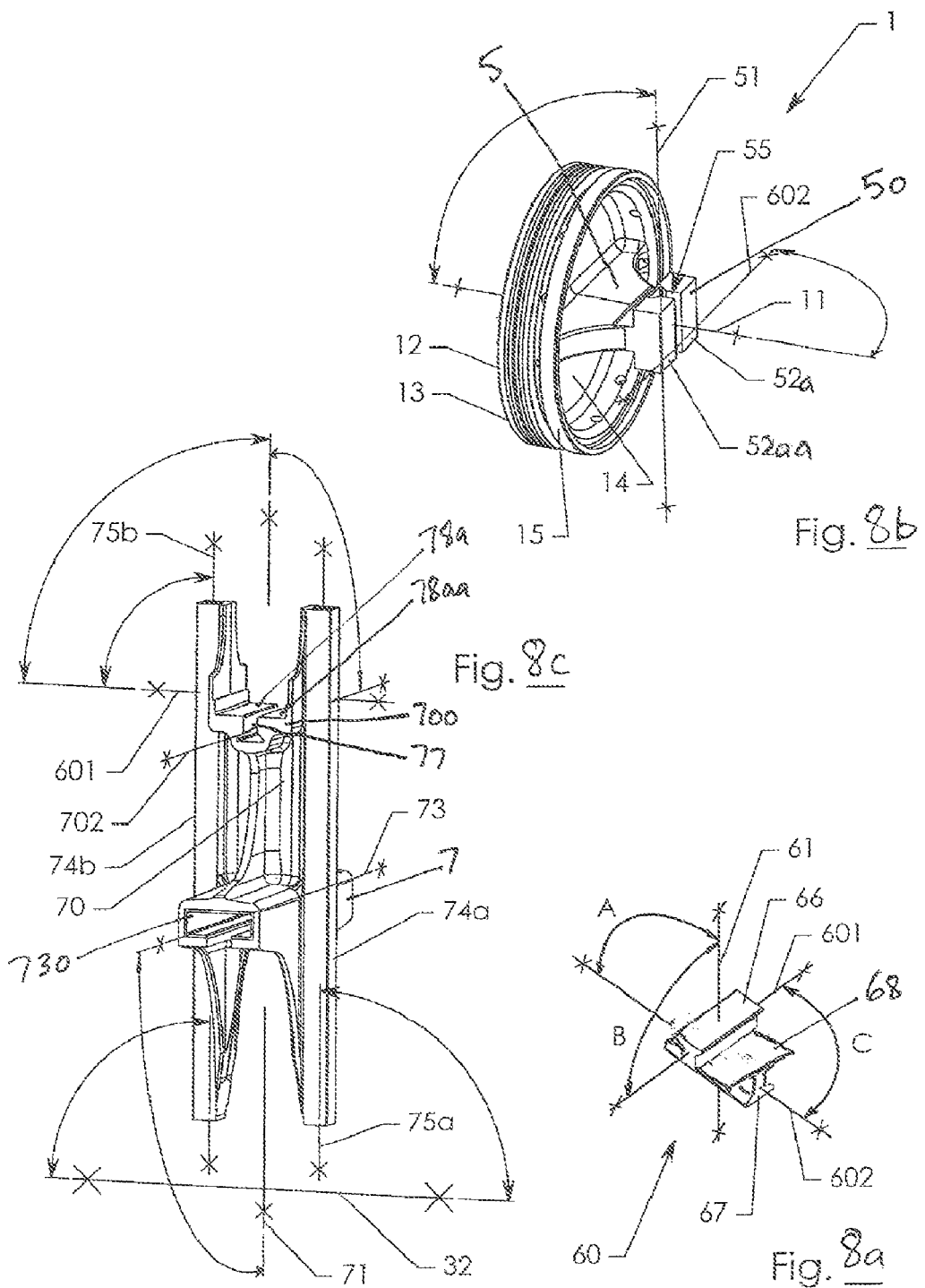

SCOTCH YOKE ENGINE OR PUMP

This application claims priority benefit of PCT Application PCT/AU2007/001536, filed Oct. 11, 2007 (Right to File having been Restored), which claims priority of AU2006904356, filed Aug. 11, 2006 and AU2006904419, filed Aug. 15, 2006.

TECHNICAL FIELD

This disclosure relates to devices known as scotch yoke type engines or pumps. More particularly to the connection arrangement between a piston and a yoke structure in a scotch yoke type engine or pump.

BACKGROUND ART

Known scotch yoke engine and or pump designs are known to include a piston assembly having a yoke structure with a shank to which is rigidly attached or pivotably mounted to or formed with a piston body of the piston assembly, the piston body including a crown and being adapted for reciprocation within a respective cylinder along the cylinder axis, the crown having a crown top surface and having a base or foot opposite the crown top surface. The base or foot includes a base surface. A shank of the yoke structure may be a protrusion or attached web member of the yoke structure extending generally towards the underside of the piston crown from the yoke structure proper and typically includes a surface of a kind and disposition suitable for mating as a member of a friction joint with the base surface and a fastener means is used to clamp the piston base surface and the shank surface together such that the piston base and the shank end face, surface and substantially immobile relative to each other as they are locked together with friction preventing generally any movement relative to each other. Others have clamped fast a coin-like washer between the piston base surface and the yoke structure shank surface and to align the piston with the yoke structure so that the piston and yoke structure are rigidly locked together it has been proposed in the prior art to equip the washer with a key system wherein there is provided a cruciform key having a midplate and wherein the arms of the cruciform are at 90 degrees to each other and laying on opposite sides of the washer midplate so that the mid plate lays between each grouping of respective key backs as it were. The yoke structure and the piston of the prior art each possessing complimentary key features and each aligned parallel to a respective key feature on the midplate of the crossed washer which is sandwiched between the piston base surface/s and the shank end surface/s and there being fixed into position by the action of a clamping means in the form of fastener arrangement extending between the piston and the yoke structure so that the washer midplate respective surface/s are engaged by and clamped onto by the piston base surface/s and the shank end face surface/s and held by friction thereby generated between the surfaces under the action of the constant clamping force of the fastener means when in engine operation such that crossed washer of the prior art remains immobile between the piston and yoke structure after fastener tightening of the piston onto the yoke structure, the prior art crossed washer and its key features laying dead and locked into position and therefore unable to move relative to either the piston or the yoke structure. Others have sought to attach a piston to a yoke structure by means of a gudgeon pin type arrangement and still others have sought to do away with the need to attach the piston to the yoke structure in the first place by way of making the yoke structure and the piston of one piece or as a unit.

Problems have arisen in executing a number of the objectives of the prior art designs. Attempts at clamping a piston to a yoke body in attempts to hold the rigidly together can cause the components to making up the joint to fret against each other or even friction weld together. The use of a gudgeon pin results in unwanted turning forces being introduced into the reciprocating piston assembly and piston noise and slap being generated thereby, the piston being able to turn around an axis being perpendicular relative to the piston axis, whilst the piston formed of a piece with the shank of the yoke can be costly to produce due to a need for a considerable up-scaling in alignment accuracy between certain of the various running surfaces of the reciprocating piston assembly.

DISCLOSURE OF THE INVENTION

The invention in a broad form includes a flying key system being preferably a flying cross system or a flying dove system for use in a scotch yoke engine or pump and preferably a scotch yoke engine or pump as herein described in which the flying cross can prevent piston rotation around an axis parallel to the flying cross alignment axis but allow the piston or a yoke structure of the invention in some embodiments to move along at least one key or key way of the flying key system even when the scotch yoke engine or pump is operating such that the crankshaft is revolving around its main axis. The invention in another broad form includes an improved scotch yoke engine wherein the piston can utilizing a flat joint arrangement move sideways relative to the yoke and cylinder axis in a controlled manner so the piston cannot rotate around an axis. The improved engine including a new way to link or connect the piston to the yoke using flat sliding joint arrangement. The joint including a "flying cross," In this application we use the terms "upper" and "lower" and by this we mean as one normally would use the terms and this can be seen in how the drawings are presented on the page in this document as a direction the skilled man would know that the over head valve engine is still an overhead valve arrangement even if the engine is upside down or for that matter any other orientation relative to a horizon or other datum. Preferably the upper element being described is further way, from the big end axis than the lower element is to the big end axis, however the upper and lower element may share the same planes an therefore neither is higher than the other, nevertheless for the purposes of this disclosure the terms upper and lower hold true, the upper key is for engagement with the piston base and the lower key is for engagement with the yoke structure end face for example regardless the distance the upper or lower key be from the big end axis measured in a straight line along the cylinder axis. A flying cross can be used in a scotch yoke engine or pump and is not limited to being used to just those shown as examples herein. A preferred form of flying cross of the invention has a flying cross alignment axis, the flying cross preventing rotation of the piston around the piston axis by keying into both the base of the piston and the shank end face of the yoke, the flying cross has upper and lower keys and/or keyways, the upper and lower keys and/or keyways being preferably at 90 degrees relative to each other around the flying cross alignment axis. Preferably the upper key is offset in a direction along the flying cross alignment axis from the lower key. In some versions a key of the flying cross may be captured in a keyway of the piston base or shank end face, in a preferred form of the invention the upper key is captured in a keyway in the piston base and the lower key of the flying cross is captured in a keyway of the yoke. In another aspect of the invention the head end of the shank of the yoke includes a trap having at least a upper flat bearing roof and a lower flat bearing floor being in spaced relation to each other and being parallel to each other and being substantially parallel to a plane being perpendicular to the yoke axis and piston axis, and, the foot or base of the piston having an upper and lower opposed parallel bearing arrangement being aligned parallel to a plane being perpendicular to the piston and yoke axes and being arranged such that the upper bearing of the foot is adjacent and facing the roof of the trap and the lower bearing of the foot is adjacent and facing the floor of the trap, the flying cross being a member of the joint such that it prevents rotation of the piston around the piston axis and allows to the piston to move along the upper key feature of the flying cross and the flying cross lower key feature to move along the trap key feature.

The flying cross of the invention is an active cross, it is not clamped to or in a fixed position between the base of the piston and the shank end face of the yoke, by that we mean it may be compressed by inertia or spring or gas means but it is not locked in compression by a fastener and if there is compression of the flying cross it is intermittent and cyclic, in rhythm with the engine cycle as the piston goes about working in reciprocation. Its faces, that is its key feature surfaces and its midplate surfaces if it has a midplate, are preferably linear bearing surfaces and preferably these surfaces are plain flat bearings similar in nature to those used in the yoke slideway and those on the big end mounted sliding connecting means, that is, what the slider mechanism employs however of course the rollerised key features and or midplates are contemplated. The flying cross is a floating cruciform key system It may be interposed between the piston base and the shank end face, it can inhabit a pocket in either of the base or end face or may even inhabit a pocket in both end face and base. In some variants of the flying cross is included a midplate, the midplate may include surfaces extending parallel to a plane being perpendicular to the piston axis. Various surfaces of the midplate may be bearing surfaces. The crossed surfaces are preferably four in number as elsewhere shown herein there may be only two or more surfaces in number, two crossed surfaces being an outcome if one uses round backed or faced keys for example, but preferably the number of crossed surfaces is four divided into two pairs, each pair being composed of two surfaces which are parallel to each other, that is, it is preferred that way, the two surfaces are preferably flat, they are preferably each on a separate plane and each of those planes is parallel to each other, but this is not the end of the story for in one variation the surfaces may be flat and parallel in only one direction or, two directions, and, it is possible that they are parallel in a third direction also, that is three dimensional versus two dimensional. In some embodiments the flying cross may be a controller of motion between a piston and a shank. In some embodiments the flying cross may control motion along only two axes X and Y, X and Y being along a plane being perpendicular to the piston axis, X being a direction inline with a plane being perpendicular to the crankshaft main axis, Y being parallel to the main axis and Z being in a direction substantially inline with the piston axis. In another preferred form the flying cross is able to control motion in two or more directions X and or Y and or Z. In another preferred embodiment only X or Y extends along a plane which extends perpendicular to the piston/cylinder axis. In another embodiment the flying cross is formed from stamping or other suitable deformation processes, it may also be expanded metal deformation, the flying cross can be made from a variety of materials including but not limited to the following examples, steel, metal, brass, bronze, alloys, aluminium, copper based alloys, titanium, or any alloy of metals can be suitable, it may be that a spring steel or metal material is selected for use, it may be carbon fibre, carbon based material, any suitable material, plastic, or any mixture of the above or a mix including any of the above with other substitutes for any of the above. In some embodiments the flying cross can be used to link the piston to the yoke that is it being adapted to can carry both compressive and tensile loads substantially inline with the piston axis or, the flying cross being able to carry tensile loads only. A flying cross may link and align and prevent rotation of the piston relative to the yoke. A flying cross may link the piston to the yoke, the flying cross may link to a piston base. A flying cross of the invention may be adapted to be a variable compression ratio flying cross if the piston base is angled and or if the shank end face is angled, it is envisaged to use the various members of the flying cross family, be they be flying keys or ways or keys and ways or other types disclosed for alignment of the piston to the yoke and for purpose of anti rotation of the piston relative to the yoke whilst also being part of an variable compression angled joint arrangement. In another preferred form the flying cross is adapted to carry compressive loads and tensile loads and may be used to link the piston to the yoke shank, the key system used in the flying cross can be for example (non-limiting) dovetail keys, that is preferably dovetail keys with the upper and lower dovetail keys being joined at the key narrows, the flying cross can link and align and prevent rotation of the piston relative to the shank and or vice versa, the sliding cross is an improved mechanism to join the piston base to the yoke, it is simple and easy to make. In another embodiment one or more flying crosses can be used to link one or more pistons to one or more shanks of one or more yokes. A flying cross may adjustable so that it can have its bearing surfaces moved closer or further apart from each other or another bearing surface, screw adjuster means, spacer adjuster means, any useful adjuster means, and yet in another form the flying cross may be a built up unit, it may be a built up unit and use a spacer element to set the distance between the walls of the key, the built up flying cross may be fastened together, pinned together, releasably fastened together, joined together, bonded together, it may be of one piece, it may be formed of multiple pieces, a key of the flying cross may be bolted on or off or otherwise fastened into position, preferably a flying cross is formed of one piece although in some forms of the flying cross the keys or, a key may be added onto the midplate and fixed into position on the midplate or, the key could be movable relative to the midplate so that it is trapped in the midplate but can move along an axis in the midplate, that is the key could be a key which can float along an axis or move along the axis of the key, that it can float in the midplate or move relative to the midplate. The shape of the key of a flying cross can be any practicable key shape including but not limited to the following shapes, the shapes being in seen with the key in cross section the section being perpendicular to the key axis along which the key is elongated, straight sided key forms, straight sided and parallel relative to flying cross alignment axis key forms, curved sided key forms, rollerised key forms, intermittently bearing surfaced key forms, angled and curved, straight and curved, double angled formed, more than one angle forms, the key may be a dovetail type key, a square key, old fashioned door key shape, T-type shape, roller key, the opposite of a dove tail shape or any combination of any of the above. The flying cross of the invention may include a midplate having a keyway, preferably the midplate includes two keyways, an upper keyway having an upper keyway axis and a lower keyway having a lower keyway axis, the upper and lower keyway being at 90 degrees relative to each other around an axis, preferably that is, the keyway of the flying cross can be of any practical shape, it maybe a dovetail shape or the opposite thereof, it may b rollerised, it may be square shape, rectangular shape, it may be T-shaped, L-shaped, curved walled, roller channel shape, angle, straight, flat, round backed, the keyway shape being adaptably suited to the key shape. It is envisaged that the key may be a button head key in some instances if required, the button head key being a key for including a post having a head, the head having a underside surface which may be used to retain a piston or midplate or yoke structure in a direction parallel to the cylinder axis, the retaining surface may be a spacer surface itself mounted on the underside of the head of the post or there being a stack of spacers It is envisaged that a series of at least two flying crosses be used to interconnect the piston to the yoke structure, the series may be lateral or separated along the cylinder axis. It is envisaged that a series of at least two button head keys is utilized to form a elongate key line for engagement with a elongate key way. The upper and or lower surface or surfaces of the midplate may include oil outlets and any other oil flow or pooling means. The joint surfaces adjacent to and engaging those of or any of those of the flying cross may be pressure fed with lubricant via gallery means extending through any of the flying cross, the piston, the yoke structure, the shank end face, the second guide means. The key way of the flying cross or the yoke structure or piston base may be rollerised and adapted to capture a plain bearing type key or keys. A flying cross may have at least one surface forming the upper key or key way surface, the at least one surface being aligned to a parallel of the axis along which the key or key way is elongated, the flying cross may have at least one bearing surface forming the lower key or key way surface, the at least one surface being aligned to a parallel of the axis along which the lower key or key way is elongated. The piston base may include a bearing insert. The piston base may include rollerised surfaces. It is preferable that the scotch yoke engine and or pump of the invention be configured such that the motion of the piston or each piston within the cylinder or respective cylinder is equivalent to simple harmonic motion when plotted on a graph.

A flying key system of the invention can take the form of a flying dove. A preferred embodiment of a flying dove including an upper key feature and a lower key feature which are axially parallel to each other and being male or female or both and being engaged in the base of the piston and in the shank end face, the flying dove being preferably a double dovetail key arrangement although it can be configured such that it uses keyways or at least one keyway instead of a key, the flying dove having an upper key aligned to an upper key axis and having a lower key aligned to a lower key axis, the upper and lower key being parallel to each other and the narrow of each fan of the dovetail key being adjacent the region where the upper key and lower key are joined, in cross section, the section being perpendicular to the upper key axis and the lower key axis, the flying dove looks like two dove tails joined together along their narrows. The idea being that the upper key of the dove is captured in the piston base keyway and the lower key of the dove is captured in the top end of the shank of the yoke structure, the flying dove being able to move along the keyway in the piston base and the keyway in the head end face of the shank at the same time and in the same direction in both if required. A variation of this is a flying dove type arrangement wherein the key in a sectional end view has a different sectional shape to that of the dove arrangement. Accordingly each flying key may have a cross sectional shape but not limited to the following, dove tail shape, I-shaped, L-shaped, C-shaped, T-shape, or some other shape in cross section which can be captured in a suitably shaped keyway, its purpose being to constrain the piston to move relative to the yoke structure only along a flat bearing path being parallel to a plane extending perpendicularly relative to the yoke axis, the flat bearing may be aligned to the plane in one or more directions relative to the plane, the flat bearing allowing the piston to move sideways relative to the yoke and its yoke axis and vice versa, preferably the motion is restricted to being substantially parallel to a plane extending perpendicular to the main axis, the upper key extending from a keyway in the piston base and the lower key being extending into a corresponding keyway in the end face of the shank, the keys and the keyways being of suitable geometry and size o ensure a good bearing fit having an lubricant film preferably between the members, though in some cases it is possible to use a dry lubricant, the point is that the piston or the yoke or both the piston and the yoke can move along the axis of the keyway relative to each other, we have a situation wherein the piston base and the face end of the shank both have a keyway and that a flying key system being a linking key is captured in the piston base and shank end face keyway arrangement such that the piston base and the shank end face are linked together in a sliding joint wherein the flying key is the link member of the joint or at least one of the link members of the joint linking the piston base to the shank end face, this can hold true for the flying cross as well, the flying cross and the flying key of the invention may be configured such that they include a midplate, the flying key may be adapted to carry compressive and tensile loads, a flying dove key can include a midplate and interpose the midplate between the base of the piston and the end face of the yoke.

A flying cross is a form of key system which allows the piston to move sideways relative to the cylinder axis at least during engine operation such that the crankshaft enjoys crankshaft rotation. The flying cross makes assembly easier but also makes it possible for the piston to find or continually find a comfortable position within the cylinder even when the engine or pump is cycling/turning over. The flying cross of the invention may be formed by any useful process or means, it may be cast, it may be forged in forging processes, it may be sintered, stamped, folded, welded, bolted or fastened together, machined from a mass, it may be built up in layers, it may be made from parts, it may be put together and or pull apart-able, it may be made of any useful method and in any respectively useful material or group of materials as the case may be. A flying cross of the invention may include fluid flow means including fluid or oil galleries, a flying cross may include coolant chambers or piping and may include a sodium well or the like for heat dissipation if required, a flying cross may include fluid metering means and or fluid flow control means, valves and valve systems and the like, a flying cross may be coated with a low friction surface, it may be coated with a plated surface, the surfaces of the flying cross may be surface hardened, the flying cross may be through hardened, in manufacture the flying cross may be immersed and chilled in cryogenic mediums to improve toughness, preferably a flying cross is made from a steel alloy but other alloys are contemplated, a flying cross, can include weight tabs which can be machined to adjust the mass of a flying cross downwards for balance purposes for example, a flying cross may include a set of location surfaces for manufacturing setup, the location surfaces may include a location pin or pin hole or any other useful locating surface or edge means may be part of a flying cross in order that the flying cross is able to be held during manufacture or handling.

A flying cross of the invention may include at least two keys and its prevents rotation of the piston in a piston and yoke structure assembly around an axis being parallel to the piston axis, the flying cross allowing motion of the piston along its upper key or key way, the piston along with its lower key or key way being able to move along the key or key way of the shank end face in order that the piston and or the yoke can move sideways relative the cylinder axis. A flying cross may include a multi part midplate having means to adjust the distance between the upper and lower surfaces of the midplate. A flying cross may be a multi part flying cross in which the distance between keys or key ways may be adjusted or the distance between surfaces of a key or key way adjusted.

The flying cross is a living cross. In some forms a flying cross is a link member for the sliding joint. A flying cross is in some preferred embodiments able to carry both compressive and tensile loads, in other embodiments it is able to carry compressive loads and in yet other embodiments it is not adapted to carry either compressive loads or tensile loads and in another embodiment it is able to carry tensile loads.

Another preferred embodiment includes a flying cross adapted to carry both a compressive load inline with the cylinder axis and a extension load inline with the cylinder axis and it can be used to link the piston to the yoke structure. In this way it is a reactive flying cross, the keys of the flying cross being preferably each a elongate bar shape having dove tail profile or functional equivalent of same in end view along the axis the respective key is elongate, with the two keys being joined or as one at the narrows of the fan of the dove shape of each key, each key may be slid into a key way trap, the trap being a female member of the system having walls suitable for engaging and complimenting a respective key bar of the flying cross, the flying cross can link and align and prevent rotation of the piston relative to the yoke structure and it may be lightweight and be made relatively easily. One or more flying crosses may be utilized to link one or more pistons to one or more shank of one or more yokes in a combustion engine or pump or assembly of same of our invention. The invention in another embodiment includes a yoke and piston assembly which is joined together by a dove tail type keyed flying cross, the yoke is linked to the piston base by way of a dove tail key arrangement which allows the piston to be aligned axially parallel to the cylinder axis, the piston may be mounted for reciprocation within a cylinder along the cylinder axis, the piston includes a perimeter surface or surfaces and extending from the underside of the piston crown is a leg protrusion or member, the leg has a foot structure adjacent its distal end having a flat type bearing surface arrangement having at least one bearing surface aligned parallel to a plane being perpendicular to the piston axis, the foot structure including a dovetailed key way elongate along an axis being parallel to the main axis of a crankshaft, a flying cross including a first dovetail shape key elongate along an axis extending parallel to the crankshaft main axis, the first key being a upper key and being encaptured in the key way of the foot structure, the fit between the first key and the foot structure key way being a close bearing fit and the flying cross including a second lower key elongate along an axis extending perpendicular relative to the main axis and along a plane being perpendicular to the flying cross alignment axis, the first key and the second key being as one at a juncture of their narrows or being joined at the juncture, a yoke is provided having first guide means in the form of a scotch yoke slideway arrangement including opposed bearing walls for engagement with a slider mechanism mounted for rotation on big end bearing pin of the crankshaft, the yoke structure including at least one second guide means, each respective second guide means elongate along a respective axis parallel to the piston axis, preferably each second guide means is located within a projection along the piston axis of the piston crown cross sectional area perpendicular to the piston axis, the projection being towards the crankshaft, the or each second guide means adapted to engage a respective third guide means, the engagement occurring within the projection of the piston cross sectional area and being such that the yoke structure is prevented from rotating around an axis parallel to the main axis, the yoke structure including a shank extending generally towards the crown underside surface, the shank may be a separately formed member which is attached or mounted to the yoke structure, the shank having a shank end face including at least one flat type bearing surface adapted for engagement with a flat type bearing arrangement of the foot structure of the piston, a cylinder head may be provided to close the cylinder, the cylinder may include valve and fluid flow port means, each second guide means having a first end and a second end, the first end closer to the piston crown than the first guide means are to the piston crown and the second end being a closer to the big end axis that the first guide means are to the big end bearing pin axis, the second guide means adapted to be carried by the yoke structure such that the second guide means second end moves in and out of the volume swept by the big end bearing pin as it orbits the main axis during crankshaft rotation centred on the main axis.

In another preferred embodiment a piston and yoke structure are parts of an assembly joined together by a flying cross, the piston has a crown and a perimeter, the piston has a piston axis extending parallel to a cylinder axis of a cylinder, the piston has an underside opposite to the crown top surface, extending from the underside is a leg having a foot structure or other wise known as the piston base, the foot/leg structure has a key slot elongate along an axis perpendicular to the piston axis, the base having a pair of flat type bearing surfaces aligned parallel to each other and parallel to a plane being perpendicular to the piston axis, the yoke structure including first guide means elongate along an axis extending perpendicular to the piston axis for engagement with a slider mechanism being rotatably mounted on the big end bearing pin of a crankshaft, the yoke structure further including second guide means elongate along a axis extending parallel to the piston axis, the second guide means extending elongate along its elongate axis such that each second guide means is located partly above and partly below the first guide means but is offset to a side of the first guide means, by side we means long side and there being two long sides, the first guide means having a first end and a second end, the second guide means being located about mid length of the elongation of the first guide means, the yoke structure further including a shank having an end face arrangement including a flat type bearing arrangement for mating with the piston base flat type bearing arrangement, the shank end face flat type bearing arrangement is basically a flat bearing pad or a pad of flat bearings and the piston base flat type bearing arrangement being a flat bearing pad or pad of flat bearings also, the two flat pads bearing on each other, the upper key of the flying cross is trapped in the base key way and the lower key is trapped in the shank end key way, the fit of the flying cross in the key way of the base and of the shank being such that the piston base flat type bearing arrangement and the shank end flat type bearing arrangement are held proximate each other, the upper key in a sectional end view having a narrow web portion extending parallel to the flying cross alignment axis and portion being circular in section and having a bigger diameter than the width of the narrow portion, the circular section being adapted to be captured in the key way of the piston base having a similar but female shape and sizing, the lower key of the flying cross having a similar key form in sectional end view to the upper key and being captured in the key way of the shank end.

In a preferred embodiment of a flying cross any of the upper surfaces of the cross be they be upper surfaces of a key or key or key way or be they be upper surfaces of a midplate may be a bearing surface adapted to carry compressive loads, the same goes for any of the lower surfaces of the flying cross whether it be lower key or key way surface or it be midplate lower surface it may be a bearing surface adapted to carry compressive loads.

In another preferred embodiment includes a yoke structure having first guide means elongate along a axis extending perpendicular relative to the piston axis and having second guide means elongate along an axis extending parallel to the piston axis, the first guide means being located either side of the big end bearing pin axis of a crankshaft having a main axis, the yoke structure having at least two shanks located on the same side of the big end bearing pin axis, a piston having a piston base is mounted on the first shank and another piston having a piston base is mounted on the second shank, a flying cross having a flying cross alignment axis is utilized to prevent rotation of the piston around the piston axis, the piston is free to move along two axes being preferably 90 degrees to each other on a plane being perpendicular to the flying cross alignment axis, each piston has a respective piston base having a respective flat type bearing for engagement with a complimentary flat type bearing arrangement on a respective shank end of the yoke structure. Preferably each piston is linked a respective shank by way of the flying cross and its engagement with both the piston base key way and the shank end key way, however in a variation to this the shank end may include a slot adapted to capture the piston base such that the piston base can move along the slot perpendicular to the flying cross alignment axis, the base having upper and lower opposed bearing walls and the slot having upper and lower bearing walls, the upper bearing walls of the base engaging the upper bearing walls of the slot and the lower bearing walls of the base adapted for engagement with the lower bearing walls of the slot being the floor of the slot, the slot floor including a key way for engagement with the lower key of the flying cross lower, the piston base key way engaging the upper key of the flying cross, there may be a mid plate or spacer element between the base and the shank end face, in yet another variation the respective piston may be linked to the yoke structure shank by way of a fastener arrangement or a post and collet arrangement, each second guide means being preferably located to a first or a second long side of the first guide means and extends partly above and partly below the first guide means but is positioned to a long side of the first guide means, the or each second guide means is preferably engaged by a third guide means in a projection along a respective piston axis of the cross sectional area perpendicular of the respective piston towards the crankshaft.

A flying cross can be used in a sliding joint arrangement. A preferred inventive sliding joint arrangement of the invention including a yoke shank having a T-slot in its head end, the T-slot being orientated such that the T is inverted so that the top of the cross bar of the T is the floor of the T-slot, the floor of the slot including a keyway, the sliding joint also including a piston base being in the form of a T-piece and the T-piece having a keyway also, the flying cross being formed of an upper key and a lower key, a flying cross residing in the keyway, the flying cross keys being at 90 degrees relative to each other around the flying key alignment axis. The upper and lower walls of the T-slot engaging the upper and lower walls of the T-piece such that the T-piece is trapped in the T-slot. The T-slot extending parallel to an axis extending along a plane being perpendicular to the piston axis, the keyway in the floor of the T-slot being likewise parallel, preferably the slot is also aligned along a plane being substantially perpendicular to the main axis of the crankshaft. The T-piece of the piston being aligned along a plane being substantially perpendicular to the piston axis and along a plane being substantially perpendicular to the crankshaft main axis, the keyway in the piston base being aligned substantially parallel to the main axis, a flying cross being interposed between the shank end and piston base, the piston base lower bearing bearing on the shank end upper face and piston base upper bearing bearing on the upper wall or roof of the T-slot. The slot being of sufficient width to allow the piston to move sideways relative to the yoke within the confines of the T-slot along axis 702. The situation can be reversed however wherein the piston base is in the form of a T-slot and the shank end is in the form of a T-piece, the relative position to the members of the flying cross being preserved.

The joint joining the piston to the yoke is a moving joint which permits the piston to move perpendicularly relative to the yoke axis. A piston of the invention p is able to float sideways relative to the yoke structure of the invention but without rotation, the piston includes a base having at least one lower flat bearing surface, the lower flat bearing surface of the piston base aligned along a first plane being perpendicular to the piston axis, the base including a key feature adapted to be aligned parallel to the crankshaft main axis. The yoke structure including a shank and at its head end is situated a shank end face, the shank end face including a key feature adapted to be aligned parallel to the first plane being substantially perpendicular to the crankshaft main axis, the shank end face including at least one flat bearing surface and said at least one flat bearing surface being aligned parallel to the first plane.

The invention teaches a new piston and yoke assembly for use in a scotch yoke engine or pump wherein the piston and the yoke structure are joined together by way of a flying cross being a midplate type of flying cross having at least one upper key way and at least one lower key way, the piston including at least one corresponding and complimentary key for engagement with the at least one upper key way of the flying cross and the yoke structure including a end face including a key for engagement with the lower key way of the flying cross, the upper key way of the flying cross being of a kind adapted to capture the at least one key of the piston base such that the key way can move along the axes of the key way along which the key way is elongate and the upper key is elongate, the lower key way of the flying cross being of a kind adapted to capture the at least one key of the yoke structure end face and the lower key way being able to move along the shank end face key axis along which the shank end face key is elongate, the flying cross may carry compressive loads directly or the piston base may bear directly on the shank end face or a surface of same, the flying cross being adapted to link the piston to the yoke structure and prevent rotation of the piston around an axis being parallel to the piston axis and the cylinder axis.

Our invention provides a new way to link a piston to a yoke in a scotch yoke engine. One of the advantages of the new system is that the piston of the engine is restricted to movement along two axis of motion being perpendicular relative to the alignment axis of a flying cross during at least engine or pump operation without the piston being free to rotate around the piston axis or cylinder axis and also being prevented from rotating around an axis being perpendicular relative to the cylinder axis.

Attaching a piston to a scotch yoke, herein called a yoke has proven a difficult task but we have invented a way that it may be done successfully in our discovery that the piston may be mounted to the yoke by means of a sliding joint arrangement involving the piston and the yoke which constrains the piston to the yoke yet restricts the piston to movement relative to the yoke to only two direction and each of those two direction being non opposing directions and both being parallel a plane being perpendicular to the piston axis, without rotation of the piston around an axis. The joint includes a flying cross which is a cruciform key. The flying cross is a living cross, that is, it is an active member of the joint arrangement permitting movement of the piston perpendicularly relative to the yoke structure during both engine assembly and engine operation. The yoke structure includes a first guideway defining a first guide path extending perpendicularly relative to the piston axis and the yoke structure includes a second guideway being substantially parallel to the piston axis, the first guideway being adapted to engage and constrain a slider mechanism being rotatably mounted on the big end bearing of a crankshaft to reciprocate back and forth along the length of the first guideway during crankshaft rotation, the second guideway being mounted for reciprocation on a third guideway which defines a third guide path extending substantially parallel to the piston axis. Preferably the third guide path is located within a projection of the pistons' circumference, the projection being inline with the piston axis and extending from the piston crown towards the crankshaft and, the second guideway being mounted for reciprocation on the third guideway within the projection. Preferably the second guideway is a rail or slot or channel or groove or combination thereof and it extends both above and below the first guide. It is preferable the yoke structure is provided with more than one second guideway and that each second guideway is engaged by a suitable third guideway, the crankshaft having a main axis and being adapted to rotate around the main axis, the cylinder having an cylinder axis being aligned along a plane being perpendicular to the main axis, the second guideway being adapted to be moved in and out of the volume swept by the big end as the crankshaft rotates, A flying cross of the invention may have a midplate or it may be of a kind which does not have a midplate. A flying cross may interconnect a piston to a yoke structure of member of same but there may also be included a fastener or retaining system utilizing a post and collot arrangement for a non-limiting example. A flying cross system may include floating keys which are maintained on or to the flying cross by retaining means, in other embodiments utilizing floating keys the retaining means may be included in either the yoke structure or the piston base. The flat type hearing is a linear bearing. A flat type bearing may be made of several linear hearings together making a flat type bearing, a flat type bearing is parallel to a plane being perpendicular to the piston axis in at least one direction, it is adapted to resist rotation of the piston around an axis perpendicular to the piston axis which is parallel to the cylinder axis, this can be done with a plain bearing or group of plain bearing however it can also be done with a group of roller bearings or linear bearings. It can be done with two linear bearings spaced apart but extending parallel to each other such that together they define a path extending along a plane. A flying cross has a flying cross alignment axis which is in most embodiments aligned parallel if no coaxial with the piston and or cylinder axis and it may be mounted to the piston by first flat type bearing means permitting the flying cross to move along a first path defined by the first flat type bearing means and the flying cross may be mounted to the piston using second flat type bearing means, the second flat type bearing means defining a second path along which the flying cross can travel, the first path elongate along a first axis extending in a first direction and the second path elongate along a second axis extending in a second direction, preferably the first axis and the second axis are at an angle to each other around the flying cross alignment axis, preferably the first path is offset along the flying cross alignment axis from the second path relative the flying cross alignment axis, preferably the angle separating the first axis from the second axis is either zero degrees, forty five degrees or ninety degrees, or is selected from an angle between zero and ninety degrees, preferably the angle between the first axis and the second axis is ninety and the first axis is aligned parallel to the main axis, preferably the first axis extends parallel to a alignment plane being perpendicular to the flying cross alignment axis, preferably the second axis extends parallel to the alignment plane although it may extend in certain variable compression ratio versions of the joint connection between the piston and the yoke structure at an angle other than ninety degrees to the flying cross alignment axis, the end face of the shank whether it be a floor of a t-slot or the upper surface of a T-piece or a end face having a hole through which extends a fastener means or, collet post system, or whether it be on the or adjacent the ends of the second guide means can in a end view looking along the axis of the second path have a straight profile or it may be curved or angular, it may be made of a series of points or tangents, it may be made of a series of two or more plain bearing surfaces or linear hearing surfaces or roller bearing surfaces or any combination of the forgoing.

A piston of the invention may be a multi part piston having a bowl or other such crown feature or shape and having a cooling fluid jacket around at least select parts of the bowl, the piston may include a crown which is welded or other wise bonded to a under structure or body, there being a volume between the crown and the under structure being the jacket volume, the under structure including a base for the piston which is then connected to or interconnected to the yoke structure by flat type bearing joint means and flying cross means as herein described, the jacket may be fed with oil by splash means if it has openings allowing oils splash to enter or oil to be directed though onto the back outer wall of the jacket and having means to release the oil from the jacket volume/space or the jacket can be more controlled oil flow means than simple splashing oil through holes, the jacket may be fed though oil gallery means extending through the yoke structure or second guide means and through the flat bearing joint and any components thereof, the oil entering the jacket may leave by out let passage means which may include valve or flow metering or stop means.

In one broad embodiment the invention a scotch yoke engine is formed having a piston by its base joined to the head end of a shank of a yoke structure by a sliding joint arrangement which includes a midplate style flying cross being positioned between the base surface of the piston and the upper face of the head end of the shank, the midplate has an top side and a bottom side, on the top side is a first key having a first key axis and the first key being adapted to have at least one wall running parallel with the first key axis, on the bottom side of the midplate is a second key having a second key axis and the second key being adapted to include at least one second wall running parallel to the second key axis, the first key and the second key being at 90 degrees relative to each other around an axis being parallel to the piston axis, the base including a first keyway having a complimentary wall geometry to that of the first key such that the first key and the first keyway are a close bearing fit and thereby allowing first key to move along the keyway in a direction being along the first keyway axis and vice versa, the shank head end including a second keyway having a complimentary wall geometry to that of the second key such that the second key and the second keyway being a close bearing fit allowing the second key to move only along the second keyway inline with the second key axis, the base surface resting on the top surface of the midplate and the shank end face resting on the bottom surface of the midplate.

In one broad embodiment the invention includes an improved scotch yoke engine and or pump. The new engine includes a flying cross wherein the arms of the cross are preferably at 90 degrees relative to each other around an axis being parallel to a respective piston axis, there being an upper arm on the upper side of the washer of a upper and lower bearing surfaced washer and the upper and the lower bearing surfaces of the washer being parallel to a plane extending perpendicularly to the piston axis in at least one mutual direction; a yoke having a head end of its shank equipped with a upper surface being complimentary to that of the washer lower surface and having a keyway adapted to receive the lower key of the yoke structure shank end face and the piston possessing complimentary key features each aligned to respective key of the cross and the mid-plate being sandwiched between the machined surfaces and fixed into position by the action of a clamping means in the form of fastener arrangement extending between the piston and the yoke so that the washer is clamped immobile between the piston and yoke arrangement after assembly, the crossed washer laying dead between the piston and the yoke In one broad embodiment the invention is a scotch yoke engine or pump having a flying cross having a flying cross alignment axis, the flying cross including a first key having a first key axis along which it is elongate and a second key having a second key axis along which it is elongate, the first key axis and the second key axis being at 90 degrees to each other around the flying cross alignment axis, the first key defining a first elongate key path and the second key defining a second elongate key path, the flying cross being adapted to be an active component of a sliding joint connecting or linking a shank portion of a yoke structure to a piston base of a piston having a piston axis, a crown, an outer perimeter circumference of the piston; a crown underside, a leg extending from the crown underside towards the crankshaft and having adjacent its distal end a foot having as its base a flat type bearing wall aligned in at least one direction parallel to a plane being perpendicular to the piston axis, the flat type bearing wall of the foot including at least one keyway having a axis along which it is elongate extending along a plane being perpendicular to the piston axis and being substantially parallel to the main axis, the foot keyway axis and the first key axis being parallel to each other, the foot keyway having a suitable type of and complimentary internal hearing wall geometry and sizing to match and mate with that of the first key and movement of the foot keyway and the first key relative each other being restricted thuswise to only motion inline with the first key axis because that's which way there bearing surfaces are aligned, it's a captive arrangement where the only freedom is long the axis of the foot keyway and first key axis; the shank portion of the yoke having a head end or top end on which is a flat type bearing being adapted to be complimentary to the flat type bearing surface of the foot so that the foot via its flat type bearing can bear upon the shank head end flat bearing; a cylinder having a cylinder axis is provided and the new system allows the piston to find its position in the cylinder whilst maintaining the correct orientation of the piston to the yoke, furthermore the new system constrains the piston to only movement relative to the yoke along a plane being perpendicular to the piston or cylinder axis, the location of the piston relative the yoke is assured by the flying cross and the yoke is guided in its reciprocation towards and away from the main axis by a guide portion of the yoke structure, the guide portion being a linear guide arrangement which extends parallel to the piston axis and, the guide portion being adapted to be engaged by a corresponding complimentary guide being formed in or attached to a block of the engine, called a block mounted guide, the complimentary guide defining a guideway extending substantially parallel to the cylinder axis, the guide portion being adapted to reciprocate along the guideway, the yoke further including an opposed parallel bearing wall arrangement extending substantially perpendicular relative to the piston axis and being adapted to engage the opposed linear bearing arrangement of a slider mechanism being rotatably mounted on a big end bearing of a crankshaft, the crankshaft having a main bearing centred for rotation on a main axis for the crankshaft and, the big end bearing being centred on a big end axis for the crankshaft, the big end axis and the main axis being substantially parallel and in spaced relation to each other, the piston axis being aligned to a plane extending substantially perpendicular to the main axis, the alignment axis extending substantially parallel to the piston axis, the yoke axis being aligned substantially parallel to the piston axis, the piston being adapted for reciprocation in the cylinder.

The flying cross is an active cross, it is not clamped or locked to or in between the base of the piston and the shank end face of the yoke, by that we mean it may be compressed by inertia or spring or gas means but it is not locked in compression by a fastener, if there is compression of the flying cross it is intermittent and cyclic, in rhythm with the engine cycle as the piston goes about working in reciprocation. Its faces, that is its key feature surfaces and its midplate surfaces if it has a midplate are preferably linear bearing surfaces and preferably these surfaces are plain flat bearings similar in nature to those used in the yoke slideway and those on the big end sliding connecting means that is the slider mechanism employs. The flying cross in one broadly applicable form is a floating key system It may be interposed between the piston base and the shank end face, it can inhabit a pocket in either of the base or end face or may even inhabit a pocket in both end face and base. The flying cross is a device adapted to have surfaces aligned along imaginary axes and planes. In a form of flat sided flying cross the linear bearing surfaces are on planes being at substantially 90 degrees to each other and the crossed surfaces extend both along planes parallel to a plane which is perpendicular to the cylinder axis/piston axis and along planes which are parallel to the cylinder piston/piston axis. In some variants of this particular set up the is interposed between the crossed surfaces a midplate, the midplate is located between the crossed surfaces and has surfaces extending at an angle being 90 degrees to the crossed surfaces. Various surfaces of the midplate may be bearing surfaces. The crossed surfaces are preferably four in number as elsewhere shown herein there may be only two or more surfaces in number, two crossed surfaces being an outcome if one uses round hacked or faced keys for example, but preferably the number of crossed surfaces is four divided into two pairs, each pair being composed of two surfaces which are parallel to each other, that is, it is preferred that way, the two surfaces are preferably flat, they are preferably each on a separate plane and each of those planes is parallel to each other, but this is not the end of the story for in one variation the surfaces may be flat and parallel in only one direction or, two directions, and, it is possible that they are parallel in a third direction also, that is three dimensional versus two dimensional. In some embodiments the flying cross may be a controller of motion between a piston and a shank. In some embodiments it may control motion along only two axes X and Y, Z being in a direction substantially parallel to the cylinder axis. In another preferred form the flying cross is able to control motion in two or more direction X and or Y and or Z. X and Y preferably extend along planes which are perpendicular to the piston/cylinder axis and yet in another preferred embodiment only X or Y extends along a plane which extends perpendicular to the piston/cylinder axis. In another embodiment of the flying cross the flying cross is formed from stamping or other suitable deformation processes, it may also be expanded metal deformation, the flying cross can be made from a variety of materials including but not limited to the following examples, steel, metal, brass, bronze, alloys, copper based or including allows, titanium or any alloy of metals can be suitable, it may be that a spring steel or metal material is selected for use, it may be formed of or coated in carbon fibre, carbon based material, any suitable material, ptfe, Teflon, plastic, or any mixture of the above or a mixture including any of the above with other substitutes for any of the above. In some embodiments the flying cross can be used to link the piston to the yoke that is can carry both compressive and tensile loads. The flying cross may link and align and prevent rotation of the piston relative to a yoke. The flying cross may link the piston to the yoke, the flying cross may link to a piston base, the flying cross. The flying cross of the invention may be adapted to be a variable compression ratio flying cross if the piston base is angled and or if the shank end face is angled, it is envisaged to use the various members of the flying cross family be they be flying keys or ways or keys and ways or other types disclosed for alignment of the piston to the yoke and for purpose of anti rotation of the piston relative to the yoke whilst also being part of an variable compression angled joint arrangement. In another preferred form the flying cross is adapted to carry compressive loads and tensile loads and may be used to link the piston to the yoke shank, the key system used in the flying cross can be for example (non-limiting) dove keys, that is dovetail keys and or keyways with the upper and lower dovetail keys being joined at the key narrows, the flying cross can link and align and prevent rotation of the piston relative to the shank and or vice versa, the sliding cross is an improved mechanism to join the piston base to the yoke, it is simple and easy to make. In another embodiment one or more flying crosses can be used to link one or more pistons to one or more shanks of one or more yokes. The flying cross may be adjustable so that it can have its bearing surfaces moved closer or further apart from each other or another bearing surface of the flying cross, the adjustable flying cross may include adjustment means, and yet in another form the flying cross may be a built up unit, it may be a built up unit and use a spacer element to set the distance between the walls of the key, the built up flying cross may be fastened together, pinned together, releasably fasted together, joined together, bonded together, it may be of one piece, it may be formed of multiple pieces, the key may be bolted on or otherwise fastened into position, preferably the flying cross is of formed of one piece although in some forms the flying the keys or a key may be added onto the midplate and fixed into position on the midplate or it could be movably mounted to the midplate so that it is trapped in the midplate but can move along an axis in the midplate, that is the key could be a key which can float along an axis or move along the axis of the key, that it can float in the midplate or move relative to the midplate. The shape of the key of the flying cross can be any practicable key shape including but not limited to the following shapes, the shapes being in seen with the key in cross section the section being perpendicular to the key axis, straight sided key forms, straight sided and angled key forms, curved sided key forms, rollerised key forms, intermittently bearing surfaced key forms, angled and curved, straight and curved, double angled formed, more than one angle forms, the key may be a dovetail type key, a square key, old fashioned door key shape, T-type shape, roller key, the opposite of a dove tail shape or any combination of any of the above. The flying cross of the invention may include a midplate having a keyway, preferably the midplate includes two keyways, an upper keyway having an upper keyway axis and a lower keyway having a lower keyway axis, the upper and lower keyway being at 90 degrees relative to each other around an axis, the keyway of the flying cross can be of any practical shape, it maybe a dovetail shape or the opposite thereof, it may b rollerised, it may be square shape rectangular shape, it may be T-shaped, L-shaped, curved walled, roller channel shape, angle, straight, flat, round backed. When we talk of first key axis we mean that axis of the first key along which the first key is elongate and this goes for first key way axis also. When we speak of second key axis we mean that axis of the second key along which the second key is elongate and this goes for second key way axis also.

The flying key system can be a flying dove. The flying dove being a key feature laid out parallel to the dove key axis and being male or female and being either in the base of the piston or in the face of the shank end, the flying dove being dove tailed in cross section or it may be a T-shape or some other shape in cross section, its purpose being to allow the piston to move along a flat bearing path being parallel to a plane extending perpendicularly relative to the yoke axis, the flat bearing may be aligned to the plane in one or more directions relative to the plane, the flat bearing allowing the piston to move sideways relative to the yoke and its yoke axis, preferably the motion is restricted to being parallel to a plane extending perpendicular to the main axis, the dove being for example a key extending from a location on or in the base and being received by a dove tailed keyway in the end face of the shank, the key and the keyway being of suitable geometry and size to ensure a good bearing fit having an lubricant film preferably between the members, though in some cases it is possible to use a dry lubricant, the point is that the piston or the yoke or both the piston and the yoke can move along the axis of the keyway. It is possible to have a situation wherein the piston and the face end of the shank both have a key way and that a linking key is placed in the two keyways such that the piston and the shank are linked together in a sliding joint wherein the flying key is the link member of the joint or at least one of the link members of the joint linking the piston base to the end face of the shank, this can be for the flying cross and the flying cross in midplate guide also, the flying key can be a reactive key system which is able to carry compressive and tensile loads, the flying dove key feature can be used with a midplate system, with a midplate system it is possible to interpose the midplate between the base of the piston and the end face of the yoke. The flying cross of the invention may be cast it may be forged in forging processes it may be sintered, stamped, folded, welded bolted together, machined from a mass, it may be built up in layers, it may be made from parts, it may be put together and or pull apart-able, it may be made of any useful method and in any respectively useful material or group of materials as the case may be. The flying cross of the invention may include fluid flow means including fluid or oil galleries, the flying cross may include coolant chambers or piping and may include a sodium well for heat dissipation if required, the flying cross may include fluid metering means and or fluid flow control means, valves and valve systems and the like, the flying cross may be coated with a low friction surface, it may be coated with a plated surface, the surfaces of the flying cross may be flame hardened, they may be immersed and chilled in cryogenic mediums to improve toughness, preferably the flying cross is made from a steel allow but other metals and allows are contemplated, the flying cross can include weight tabs which can be ground or cut down in mass to adjust the weight of the flying cross downwards for balance purposes for example, the flying cross may include a set of location surfaces for manufacturing setup, the location surfaces may include a location pin or pin hole or any other useful locating surface means may be part of the flying cross in order that the flying cross is able to be held.

The invention includes a piston having a piston base having at least one key feature be it a key or keyway or even a mixed key having both key and key way portions together forming the key feature, the key feature including a key feature axis along which the key or key way or combined key and key way extend or is/are aligned, the key feature being adapted to engage with the upper key feature of a flying key system, the flying key system being a flying cross. The key feature of the piston base being able to constrain a upper key feature of a flying cross to constrain the flying cross to movement only along the upper key feature axis, the lower key feature of the flying cross being engaged and constrained by a corresponding complimentary key feature in the end face of a shank of a yoke, the end face including a linear bearing wall or linear bearing walls and the piston base having at least one base surface being a lower bearing wall of the piston base being complimentary in nature to that of the shank end face linear bearing wall or walls, the flying cross upper key feature being engaged with the piston base key feature and the flying cross lower key feature being engaged by the shank end face key feature, the lower key feature of the flying cross is preferably slid into or over or out of or off of the key feature of the shank end face inline with the flying cross lower key feature axis and the shank end face key feature axis, it is preferable that the lower key feature axis extends along a plane being perpendicular to the crankshaft main axis and perpendicular to the flying cross alignment axis, the yoke structure being adapted to include a set of opposed parallel slideway or rollerised at least partially bearings aligned along an axis extending parallel to a plane being perpendicular to the piston axis and parallel to a plane extending perpendicular to the crankshaft main axis, the yoke structure set of slideway bearings or at least partially rollerised parallel bearings adapted to engage and constrain a set of parallel and opposed linear hearing surfaces of a slider mechanism being rotatably mounted on a big end pin of a crankshaft having a main axis. The yoke structure includes second guide means elongate along an axis extending parallel to the piston axis, the second guide means engaging third guide means being attached to or formed integral with the stationary part of the engine such that the yoke structure is prevented for rotating around an axis being parallel to the main axis, the second guide means being preferably located within a projection by light of the piston crown area along the piston and cylinder axis towards the crankshaft, the crown are being the total piston area of the piston perpendicular to the piston and cylinder axes. Preferably the second guide means is carried by the yoke structure or is part of the yoke structure The invention provides for a novel piston and yoke assembly which includes a flying cross, the yoke portion of the assembly having a first guide way being perpendicular relative to the piston axis and a second guide way being substantially parallel to the piston axis, the second guideway is located transversely relative to the first guideway, the second guide way being preferably a rail or channel or groove or bore. The second guide being offset from the line of the first guide and extending beside or past a side of the first guide from above to below the first guide, the first guide way and the second guideway being a crossed pair of guide ways, that is that the guide ways are preferably at 90 degrees relative to each other around an axis being parallel to the crank main axis and that the guide ways are offset from each other along said axis, further more it is preferred that the first guideway is located or adapted to be located such that it is located on only one side of the big end axis of the crankshaft and that side of the big end axis being that side of the big end axis being on which side of the big end axis the piston is located, the second guideway being adapted to be engaged by a third guide way that is aligned axially parallel the second guideway axis and the second guideway including a bearing surface configuration which is accepted by the third guideway and the second guideway being constrained by the third guide way to have freedom of movement defined for it by the bearing surface wall configuration of the third guide way, the third guideway being mounted to or formed or attached to a crankcase or block for the engine, preferably the third guide is integrally formed with the crankcase or block.

The shank of the yoke may have an elongate T-slot, the T-slot elongation being along an axis being along a plane being perpendicular to the main axis and being along a plane being perpendicular to the piston alignment axis, the base of the piston may be a T-piece elongated along an axis extending along a plane being perpendicular to the main axis and along a plane being perpendicular to the piston alignment axis. The T-piece is able to slide sideways into the T-slot axis, the T-slot has a key or key in its floor and the underside surface of the piston base has a key or keyway formed in it also however the piston base key or keyway is 90 out from the key or key way in the floor of the T-slot around a flying cross alignment axis being parallel to the piston alignment axis, a flying cross having an upper key being elongate along an axis extending along a plane being perpendicular to the piston alignment axis and along a plane being parallel to the main axis, the upper key or key way engaging the key or key way in the piston base and the lower key or key way engaging a key or key way of the shank end T-slot into which can slide in a close fit the T-piece base of the piston base.

The flying cross of the engine can be a tensile load bearing flying cross, that is it can pull the piston down the cylinder, to do this the flying cross is trapped in the piston base and in the shank end face. The type of key is preferably a dove tailed key arrangement or T-shaped key arrangement The invention in another broad embodiment has a piston and yoke assembly wherein the piston and the yoke are joined together but they can move perpendicularly relative to each others axis and are unable to rotate around each others axis. The piston has a base which includes at least one bearing surface, the bearing surface being planar and aligned to a plane extending perpendicularly relative the piston axis, the yoke structure or member attached to same like wise includes at least one linear hearing surface which mates with the piston base bearing surface so as to prevent rotation of the piston around an axis being perpendicular relative to the cylinder and piston axes.

In another preferred embodiment the invention includes the joining of a piston to a shank of the yoke so that the piston can move perpendicularly relative to the yoke axis. Included in this joint is a flying cross which includes at least one first key being located in and constrained in and by a first keyway located in the piston base such that the first keyway traps the first key in the first keyway so that the first key can move only along the first keyway axis, the flying cross including at least one second key being located in and constrained in and by a second keyway located in end face of the shank of the yoke. the first key and keyway being axially parallel to each other and the second key and keyway being axially parallel to each other. Preferably the first key and the first keyway being at 90 degrees apart relative to the second key and second keyway around the flying cross alignment axis, the flying cross being a link between the piston and the shank of the yoke, the flying cross holding the piston base in close proximity to the shank end face so that the piston base rests upon the shank end face, preferably there is an oil gap between the base surface and the shank end face, the piston base able to move in a first direction, the first direction being parallel to the first key axis and the piston base being able to move in a second direction, the second direction being parallel to the second key axis, the flying cross limits motion of the piston relative to the yoke to two directions namely the first direction and the second direction, the piston cannot rotate around the piston axis. If the flying cross has a midplate then the midplate may be interposed between the piston base and the shank end face such that the piston base rests on the upper surface of the midplate and the lower surface of the midplate rests on the shank end face, the first key being captured in a capturing keyway of the piston base and the second key being captured in a capturing keyway of the shank end face, the piston base is able to move along the upper surface of the midplate in a direction determined by the first key and keyway interaction and the flying cross being able to move along the shank end face in a direction determined by the interaction of the second key with the second keyway, the first direction being inline with the first key axis and first keyway axis and the second direction being inline with the second key axis and second keyway axis. In another preferred embodiment the flying cross is a midplate style flying cross and includes at least one keyway being a capturing keyway for capturing a key of the piston base or for capturing a key of the shank end face, the midplate style flying cross may include at least one second keyway for capturing a key of the piston base or a key of the shank end face, the piston base being able to move along the midplate upper surface in a direction parallel the first key axis and the midplate being able to move along the shank end face in a direction parallel to the second key axis, preferably the first and second keys are at 90 relative to each other around the flying cross alignment axis or alternatively around an axis being parallel to the flying cross alignment axis.

In another preferred embodiment of the joint arrangement of the piston and yoke the yoke has a T-type rail which is trapped in a T-slot of the shank, the rail having a keyway extending as keyways do in directions parallel to the keyway axis, the keyway axis being aligned along a plane extending perpendicular to the piston axis and along a plane being, the rail having at least one lower planar bearing wall, the lower wall being aligned parallel to a plane being perpendicular to the piston axis, the shank of the yoke includes at least one upper bearing wall being aligned parallel to the lower bearing wall of the rial0

In another preferred broad aspect of the invention there is included a oil supply route from the crankshaft big end to the slider mechanism then to the yoke body and then through the flying cross and then it may enter the sliding joint arrangement linking the piston to the yoke and then preferably also passing through into and or onto the piston to cool the piston, preferably the route is through the crankshaft and slider mechanism and sliding joint arrangement members or at least some of same. In another preferred aspect of the invention oil is pressure conveyed to the flying cross and joint by way of gallery means of the third guide mean flowing into gallery means in the second guide means from there into the yoke body and then into the sliding joint linking the piston to the yoke.

Manufacture of offset slider mechanisms has proven problematic. Prior art attempts at manufacturing offset sliding connection means have attempted to fasten a slider having an upper and lower bearing arrangement to a rod end, the rod end being adapted to be mounted for rotation on the big end of a crankshaft, the other end of the rod has a clamp surface and fastening means, the slider is then bolted to the rod end face such that the slider is clamped to the clamp face of the rod end, this makes the structure overly heavy and requires significant machine processing to accomplish. We have invented a new way to manufacture the offset slider and a new comparatively lightweight offset slider mechanism wherein the slider is not fastened to the rod end but is an integrally formed portion of it. Accordingly we have invented a way to rotary machine cut and or grind the lower bearing. Our method includes the use of a grinding wheel having a recessed end face or a cutting wheel having a recessed end face, preferably the recess is centred on the wheel axis. The wheel recess being of sufficient diameter to accommodate the big end of the rod and allow motion of the wheel and or the slider mechanism along a plane being at least sufficient for the outer diameter of the wheel to traverse a length of the lower bearing surface, preferably the length is the entire length of the lower bearing surface. In a preferred embodiment the offset slider mechanism is it the form of a T with the lower end of the T upright being the big end of the slider mechanism and the cross bar of the T being the offset slider of the slider mechanism, the cross bar of the T having a upper bearing surface and there being a first lower bearing surface on a first front side of the upright of the T and a second lower bearing surface on a second back side of the upright, the first lower bearing being on the opposite side of the upright to the second lower bearing surface, the big end is longer along the big end axis than the closest distance between the first lower bearing and the second lower bearing and the distance between the front side and the back side, the big end may have a big end cap arrangement or it may have a tunnel having an integral cap. In another broad form the slider mechanism may be formed in the shape of a T-piece or functional equivalent of same, the T-piece elongate along an axis extending perpendicular to the piston axis. It's a T-rail having rail surfaces extending along an axis being the rail elongate axis so in other words the cross-bar of the T is for connecting with the slot or functional equivalent of same of a yoke structure end face arrangement. The upright may include a through hole formed through it through which may pass a big end pin of a crankshaft, and because the upright walls are closer together than the inside edge of each underside of cross-bar surface a grinding wheel aligned parallel to the relative position of the crankshaft main axis if the crankshaft were in situ can be used. In the disclosure of the application there is talk of upper and lower surfaces, keys, members, parts, elements, and features. The auto and engine industry is used to such terms. For example the term overhead cam is used whether the engine is upside down or right way up. That is even if the pistons point towards the centre of the earth and the crankshaft is above them it is still the case that the engine still has over head valves though they be indeed under the piston. So upper keys are upper keys in that sense, however, it is possible that the upper and lower keys of a flying cross share the same planes and therefore that neither is higher or lower in distance form the big end axis (that is upper or lower) for example but they still work on the upper side of the joint in regards to the upper key and the lower key still works on the lower side of the joint so upper and lower terminology still applies.

The flying cross is able to restrict the orientation of the piston and the yoke or a intermediate member interposed between the piston and the yoke structure relative each other whilst allowing movement of each component relative to the other at 90 degrees to the other. The flying cross is a construction having upper and lower keys and or key ways, it may or may not have a mid-plate. It is preferably a link member between the piston and the yoke. The fact is it is possible to have a flying cross having a mid-plate and having floating keys in keyways of the midplate so that the floating keys are aligned with a keyway in the piston base or head end of the shank such that the key links the midplate to the piston base and another key the lower key links the midplate to the shank endplate that is the head end of the shank. A flying cross may be a multi part flying cross having floating keys or at least one floating or movable key or key element. The flying cross allows the yoke to move side ways relative to the piston and the piston alignment axis and the piston to move sideway relative to the yoke and yoke alignment axis. The flying cross can be used in variable compression ratio embodiments of the invention wherein the base surface of the piston is tilted at an angle which is not 90 degrees to the cylinder axis, the angle is preferably less than 15 degrees from perpendicular to the cylinder axis/piston axis, the shank end face at a like angle to that of the piston base, preferably the piston base is T-piece in end section and elongate along an axis extending at an angle of less than 15 degrees from being perpendicular relative to the piston axis.

In another embodiment of the invention a scotch yoke engine or pump includes a block, a crankshaft having a main axis and including a offset big end bearing pin, a slider mechanism mounted for rotation on the bearing pin, a piston having a piston axis, a yoke structure including first guide means elongate along an axis extending perpendicular relative to the piston axis, the first guide means engaging the slider mechanism and constraining the slider mechanism to reciprocate along the first guide means, the yoke structure including second guide means for constraining the yoke structure to reciprocate along the piston axis, the second guide means engaging third guide means, the engagement of the second guide means with the third guide means being such that the yoke structure is prevented from rotating around an axis parallel to the main axis, the piston and the yoke structure being separate units; the piston includes a base surface opposite the crown top surface, the yoke structure has a end face surface in opposition to the piston base surface and the piston base surface either directly engages the end face surface or at least one spacing element is interposed between, the base surface is part of a flat type joint system utilizing a flying cross in which the piston and the yoke structure are connected or linked together such that the piston is prevented from rotating relative to the yoke structure but is allowed to move along a path defined by a upper key of a flying cross and the flying cross is free to move along the keyway of the shank end face or the yoke structure at least during engine operation, the upper key and the lower key of the flying cross being at an angle to each other around an axis parallel to the cylinder axis.

In another broad embodiment forms an improved scotch yoke engine or pump including:
a crankshaft having a main axis and a big end bearing pin, the bearing pin having a bearing pin axis and being adapted to orbit the main axis during crankshaft rotation, the bearing pin sweeping a volume as it orbits the main axis;

connecting means rotatably mounted on the bearing pin and being adapted to orbit the main axis during crankshaft rotation;
a cylinder having a cylinder alignment axis, the cylinder axis being perpendicular to the main axis;
a piston assembly having a piston alignment axis and including preferably at least one of each of the following (a), (b), (c) and (d) wherein:
(a) a piston crown having a cross sectional area perpendicular to the piston axis, the crown having a base having a key or keyway elongate along an axis extending parallel to the main axis and along a plane being perpendicular to the piston axis, the base including at least one flat type surface being a plain type bearing surface or including a rollerised equivalent, preferably the flat type bearing surface being parallel to the main axis and parallel to a plane being perpendicular to the piston axis, the key or keyway elongate along a axis 501 extending along a plane being perpendicular to the piston axis and the axis 501 being parallel to the main axis, preferably the base key or key way being a dove tailed in end view along its elongation axis;
(b) a flying cross 60 having a flying cross alignment axis 61, the flying cross functioning as a link means between the crown base and the head end of the shank of the yoke structure for the first guide and or second guide means, the flying cross has a like but opposite sex dove tailed profile upper key 66 or upper keyway elongate along an axis 601 and being inline with piston base key or key way axis 501 of the piston base key or keyway 55, the flying cross includes a lower key or key way 67 elongate along an axis 602 being preferably perpendicular relative to the main axis and extending along a plane being perpendicular to the flying cross alignment axis
(c) a yoke structure having first guide means elongate along an axis extending perpendicular to the piston axis, the first guide means having a first end and a second end, the first guide means including a upper wall and a lower wall being opposed, the first guide means including a first long side and a second long opposite side, the yoke structure including a shank having a end face which includes a dovetail key or key way elongate along a axis extending along a plane being perpendicular relative to the main axis and along a plane extending perpendicular to the piston axis or the flying cross alignment axis if the flying cross alignment axis and the piston alignment axis are not axially parallel, the end face including at flat type bearing to mate with that of the flat type bearing surface of the crown base, the flat type bearing of the shank end face and the flat type bearing of the base being opposed bearings which are parallel to each other and adapted for engagement with each other such that they can carry load in directions parallel to the piston axis, the flat type bearings at least substantially prevent rotation of the piston crown around any axis being perpendicular to the piston axis, the surfaces are preferably plain bearing surfaces though rollerised versions are anticipated, the surfaces may include oil passages and recesses allowing for oil to be introduced, stored within, used, discharged, re-circulated within and through or adjacent the joint between the crown base and the shank of the yoke structure, the shank end face having a key or key way elongate along an axis 702 being perpendicular to the main axis and lying along a plane being perpendicular to the piston axis, the shank end face key or key way axis 702 and the lower key or key way axis of the flying cross being parallel to each other;

(d) second guide means (2030; 4028) elongate along an axis extending parallel to the piston axis and the second guide means having a first end and a second end;

the piston of the piston assembly mounted for reciprocation along the piston axis;

the first guide means being located only to that side of the bearing pin axis lying between the bearing pin axis and the piston crown;

engagement means on one or other of the first guide means or connecting means to constrain the connecting means for reciprocation along the first guide means during crankshaft rotation;

a crank case or block including third guide means adapted to, engage the second guide means, the second guide means and the third guide means cooperating to substantially prevent rotation of the piston assembly around an axis parallel to the main axis; the third guide means being preferably fixed to the block but can be mounted on a device enabling transverse movement relative to the cylinder axis of the third guide means;

the second guide means (2030; 4028) and the third guide means (2034; 4030) are located for engagement only within a volume defined by a projection of the piston cross sectional area along the piston axis, the projection from the crown area towards the crankshaft;

the second guide means is positioned to a side of the first guide means the first end of the second guide means is located closer to the piston crown than the first guide means, and when the piston is at TDC and when it is at BDC the second end of the second guide means is located closer to the bearing pin axis than the first guide means;

the second guide means is adapted to be moved in and out of the volume swept by the bearing pin during crankshaft rotation such that the second guide means is outside the volume swept by the bearing pin when the piston is at TDC; preferably the piston includes at least two second guide means to the same side of the first guide means and each respective second guide means is engaged by a respective third guide means; the second guide means is preferably fixed relative to the yoke structure.

A flying cross may function as a link member linking the piston or pistons to a yoke structure is able to constrain the piston to move with the yoke along the piston axis but allow the yoke or piston to move sideways relative to each other along the upper and lower axes of the yoke. We prefer that the upper key of the cross be aligned parallel to the main axis but it may be at any angle relative to the main axis, the lower key is preferably 90 around the flying cross alignment axis from the first key, when we say dove tail key we mean any key which can be trapped in a key way, In another broad embodiment the piston assembly of the invention including flying cross means includes at least two second guide means, there being at least one second guide means located on a first side of the first guide means and at least one other second guide means located on the opposite side of the first guide means and each second guide means engaged by a respective third guide means, and in yet another broad embodiment the piston the second guide means (2030; 4028) is chosen from a group including: a post, a rod, a tube, a bar, a web, or a slot, and the third guide means includes a surface shape adapted for engagement with the second guide means and in another broad embodiment the first guide means extends within 5° of perpendicular relative to the piston axis, and in another broad embodiment in an end view the first guide means includes parallel opposed surfaces and at least one of them is aligned in a direction not perpendicular or parallel to the piston axis and in another broad embodiment the engagement of the second guide means by the third guide means is such that rotation of the piston assembly around an axis generally perpendicular to the cylinder axis is substantially prevented and, in another broad embodiment the engagement of the second guide means by the third guide means is such that rotation of the first guide means of the piston assembly around an axis parallel to the main axis is substantially prevented and, in another broad embodiment includes a pair of pistons assemblies in a Vee configuration having an included angle of 60°, 72° or 90°, each piston of the pair mounted for reciprocation within a respective cylinder, the crankshaft adapted to be moved along the bisector of the included angle such that the compression ratio of each piston assembly within the cylinder may be raised or lowered without change of phase of either piston motion relative to crankshaft rotation and in another broad embodiment includes a pair of piston assemblies in a Vee configuration of cylinders, each piston assembly of the pair is mounted for reciprocation within a respective cylinder, the crankshaft adapted to be moved along the bisector of the included angle such that the compression ratio of each piston within the cylinder may be raised or lowered without change of phase of either piston motion relative to crankshaft.

In another embodiment the invention provides an improved scotch yoke engine or pump including:

a crankshaft having a main axis and a big end bearing pin, the bearing pin having a bearing pin axis and being adapted to orbit the main axis during crankshaft rotation, the bearing pin sweeping a volume as it orbits the main axis;

connecting means rotatably mounted on the bearing pin and being adapted to orbit the main axis during crankshaft rotation;

a cylinder having a cylinder axis, the cylinder axis being perpendicular to the main axis;

a piston assembly having a piston axis and including:

(a) a piston crown having a cross sectional area perpendicular to the piston axis, the piston crown having a top surface and an underside surface, for the crown under side surface or mounted thereto is web which has a first end closest to the crown underside surface and a second end being its distal end being further away from the crown underside surface, the second end looks like a T-piece or similar functioning shape which is adapted to be trapped in a slot of the shank of the yoke having upper and lower flat bearing wall arrangement, the slot being part of the yoke structure or an intermediate structure between the first guide means housing or base structure and the piston crown;

(b) a flying cross a having upper key or key way extending along a upper key or keyway axis 601 and having a lower key or key way having a lower key or key way axis 602, the upper key is elongate along axis 601 and the lower key or key way is elongate along the lower key or key way axis 602, the upper axis 601 and the lower axis 602 are at 90 degrees to each other around the flying cross alignment axis 61, preferably the upper axis 601 and lower axis 602 are offset from each other along the axis 61 however this is not a requirement in all cases of our inventive flying cross, the flying cross can include a midplate or it can be of a type which does not include a midplate.

(c) a yoke structure including first guide means elongate along an axis extending perpendicular to the piston axis, the yoke including a shank or shank member having a T-slot for receiving the T-piece end piston base, the T-slot having upper and lower walls which are parallel to each other and which are adapted to engage the upper and lower wall of the piston base so that the T-piece can move along the T-slot but is trapped in the T-slot, the T-slot includes a key way or key in preferably its lower wall or floor so to speak, the keyway in the floor is elongate along an axis 702 extending perpendicular to the main axis and perpendicular to the piston axis;

(d) second guide means elongate along an axis extending parallel to the piston axis and the second guide means having a first end and a second end;

the piston mounted for reciprocation along the piston axis;

the first guide means being located only to that side of the bearing pin axis lying between the bearing pin axis and the piston crown;

engagement means on one or other of the first guide means or connecting means to constrain the connecting means for reciprocation along the first guide means during crankshaft rotation;

a crank case or block including third guide means adapted to engage the second guide means, the second guide means and the third guide means cooperating to substantially prevent rotation of the piston around an axis parallel to the main axis the second guide means and the third guide means are located for engagement only within a volume defined by a projection of the piston cross sectional area along the piston axis;

the second guide means is positioned to a side of the first guide means, the first end of the second guide means is located closer to the piston crown than the first guide means, and when the piston is at TDC the second end of the second guide means is located closer to the bearing pin axis than the first guide means; and the second guide means is adapted to be moved in and out of the volume swept by the bearing pin during crankshaft rotation such that the second guide means is outside the volume swept by the bearing pin when the piston is at TDC.

In another preferred embodiment the piston includes at least two second guide means to the same side of the first guide means and each respective second guide means is engaged by a respective third guide means.

In another preferred embodiment the piston includes at least two second guide means, there being at least one second guide means located on a first side of the first guide means and at least one other second guide means located on the opposite side of the first guide means and each second guide means engaged by a respective third guide means.

In another embodiment the second guide means is chosen from a group including: a post, a rod, a tube, a bar, a web, or a slot, and the third guide means includes a surface shape adapted for engagement with the second guide means.

In another embodiment the first guide means extends within 5° of perpendicular relative to the piston axis.

In an end view the first guide means includes parallel opposed surfaces and at least one of them is aligned in a direction not perpendicular or parallel to the piston axis. In another broad form the engagement of the second guide means by the third guide means is such that rotation of the piston around an axis generally perpendicular to the cylinder axis is substantially prevented.

In another broad form the engagement of the second guide means by the third guide means is such that rotation of the first guide means of the piston around an axis parallel to the main axis is substantially prevented.

In another broad embodiment of the invention the piston is retained on the yoke structure by a post and collet system including at least one post and collet, the post can be a rigid member of the piston or it can be affixed to the piston by fixing means, the collect system may use shims to adjust the distance between the retaining faces of the collet system and the piston base or other means including screw adjustment means may be employed. The piston of the invention can be retained to the yoke structure by fastener means which fasten tight onto a spacer means in order that the fastener means does not close the free space of the flat joint. The fastener may be akin to a shoulder screw so that it can be fastened tight against it self. The shoulder screw or screw fastener with pacer elements taking the place of the shoulder are contemplated as being used in the invention wherein the piston is retained by fastening means to the yoke body but is free to move along a plane being transverse though preferably perpendicular to the piston axis. The piston of the invention may include oil cooling galleries and chambers if necessary to keep the piston operating at a required temperature. The flying cross may need to be cooled and provided with pressure fed or even splash fed lubrication so accordingly the members of the joint including the flying cross may include lubrication supply and flow means. The piston and yoke are both preferably made of metal alloy but it is envisaged that they or either of they can be made of any useful material. Certainly carbon based materials are contemplated. The key way used in the invention may be formed in position or it may be prefabricated and then mounted into a position. Preferably the key way in the base or in the yoke shank are elongate key ways. There may be a spring means included in the system. The flying cross may be made of spring material. The spring can be used to damp vibration. The shape of the key may need to be augmented to change its frequency response to vibration, the augmentation may include vibration damping means in the form of resilient members attached or otherwise part to the flying cross. The flying cross may be a multi part flying cross wherein the upper and lower keys are joined together to form a flying cross for example. Another non-limiting version of our flying cross has the flying cross being a multi part flying cross having a first part being the upper part of the flying cross, the upper part including a midplate portion, the flying cross having a lower part and that part including a midplate portion also, the upper part midplate being joined hack to back with the lower part midplate to form a complete flying cross from the two parts, the upper part including an upper key and the lower part including a lower key and the two parts being held together or joined as a unit by pin means or fastening means. The fastening means may be screw fastening systems or rivets or the like. The flying cross may be adjustable. The flying cross may have various features and or mechanisms added to it. In practice it may be necessary to include at least one shim between the piston base surface/s and the yoke shank end face surface/s to take up clearances between the two bodies, that is the piston and the yoke structure. A flying cross with midplate may use shims or spacer elements to adjust the distance between the upper and lower surfaces of the midplate in the case of a multi part midplate. A flying cross of the invention may include adjustable width keys and or keyways. That is at least one of the key or keyway of the flying cross may be adjustable in width. In some embodiments of the invention it is possible to mount the piston to the structure supporting the second guide means, the structure of the second guide means having a end face which includes a key or key way adapted to receive a lower key or key way of a flying cross. A yoke structure of the invention may include a shank or it may not. A shank may be integrally formed with the yoke structure or from the yoke structure. A shank may be a separate unit mounted onto the yoke structure or part thereof. A flying cross in some embodiments is used as a link member between the piston and the yoke structure, the flying cross may include retaining surfaces to retain the piston to the yoke structure or control its position to the yoke structure, the idea being that the flying cross have retaining surfaces which engage and co-operate with at least one surface on the yoke structure and on at least one surface of the piston base to prevent motion of the piston along the piston axis. The retaining surface or surfaces of the flying cross may be separate surfaces from the structure or spine of a key or key way of the flying cross or the retaining surface or surfaces or at least one retaining surface of the flying cross may be a key or keyway surface rigid with the structure or spine of the respective key or key way of the flying cross. Preferably the retaining surfaces are a side wall or side wall surfaces of the respective key or key way of the respective flying cross. Any of the key or key way of a flying cross or piston base or yoke structure end face arrangement can be of any shape required for mating and engaging with a respective key or key way as required and described herein and is not therefore limited to those shapes and combination of shapes we have displayed herein. The various embodiments of our invention and aspects of our invention shown herein and described in words herein are examples and are non-limiting examples. Features and functionality found in one or other of our inventive embodiment and or aspects of same may found in one or other embodiment may be transferred to or swapped with like parts or functional equivalents of same in any other of the inventive embodiments in this disclosure or a design in this disclosure such that the design if it be a design not conforming to the respective inventive aspect is brought into conformation with the respective inventive aspect.

BRIEF DESCRIPTION OF THE DRAWINGS

FIG. 2*a* shows an isometric view of a flying cross 60 having a flying cross alignment axis 61 and including a first upper key 66 elongate along a first upper key axis 601, the first upper key axis extending perpendicularly relative to the flying cross alignment axis 61 as indicated at B, the flying cross further including a second lower key 67 elongate along a second key axis 602, the second key axis 602 extending perpendicularly relative to the flying cross alignment axis 61 as indicated at A, the first upper key axis 601 and the second lower key axis 602 separated from each other around the flying cross alignment axis 61 by an angle, preferably the angle is 90 degrees as indicated at C, the upper key 66 having side walls parallel the flying cross alignment axis 61, the second lower key 67 having side walls parallel the flying cross alignment axis 61, the upper key 66 and the lower key 67 forming a cross or cruciform shape 60, in a alternative embodiment there may be a bridging member extending between the upper key 66 and the lower key 67, the flying cross 60 can be made of one piece or may be made from separate members joined together, the upper key 66 side walls are offset from the lower key 67 side walls along the flying cross alignment axis 61.

FIG. 2*b* shows an isometric view of a piston 1 having a piston alignment axis known throughout this disclosure as a piston axis 11, the piston may include a skirt or perimeter 15 located radial of the piston axis 11, a crown 12, a crown top surface 13, a crown underside 14, a leg 5 extending from the crown underside 14 in a direction generally away from the underside along the piston axis 11, the leg having a base or "foot" 50 adjacent its distal end, the foot 50 including a flat type bearing arrangement 52 including a pair of plain bearings 52*a* and 52*aa* extending a parallel to a plane being at an angle to the piston axis 11, the angle being perpendicular, the base 50 including a key way 55 elongate along a base key way axis 501 extending perpendicular relative to the piston axis 11, the side walls of the base key way 55 are parallel to each other and the piston axis 11.

FIG. 2*c* shows an isometric view of a yoke structure 7 having a yoke structure axis 71, the yoke structure including first guide means 730 elongate along an axis 73 extending perpendicular to the yoke structure axis, the yoke structure further including second guide means 74 and 75, each respective second guide means elongate along a respective axis being parallel to the yoke structure axis, each second guide means located partly above and partly below the first guide means but each to a respective long side of the first guide means, the yoke structure including shank 70 having a endplate 700, the end plate including a flat type bearing arrangement, the flat type bearing arrangement being a pair of plain bearing surfaces aligned parallel to a plane being perpendicular to the yoke structure axis, the end plate including a key way elongate along a endplate key way axis extending parallel to the first guide means axis 73 and perpendicular relative to the yoke structure axis 71, the endplate including a through hole for the through passage of securement means, the through hole extending along an axis being parallel to the piston axis.

FIG. 2*d* is an isometric view of a securement means being a threaded fastener arrangement including a shoulder stop in order that the fastener can be tightened against it self, in a alternative the fastener arrangement may include separately formed spacer means to which the fastener may be tightened, the fastener means is a threaded fastener system.

FIG. 3a shows an isometric view of a flying cross 60 having a flying cross alignment axis 61 and including a first upper key 66 elongate along a first upper key axis 60, the first upper key axis extending perpendicularly relative to the flying cross alignment axis as indicated at B, the flying cross further including a second lower key 67 elongate along a second key axis 602, the second key axis extending perpendicularly relative to the flying cross alignment axis as indicated at A, the first upper key axis 601 and the second key axis 602 be separated from each other around the flying key alignment axis by an angle, preferably the angle is 90 degrees as indicated at C, the upper key being a dove tail form of key having side walls inclined towards the flying cross alignment axis 61, the second lower key is of a dove tail form having side walls inclined towards the flying cross alignment axis, the upper key 66 and the lower key 67 forming a cross or cruciform shape, and the keys being joined at a portion of their narrows, the narrow of each key being the narrow of the fan of the dove form, in a small alternative form there may be a bridging member extending between the upper key 66 and the lower key 67, the flying cross 60 n be made of one piece or may be made from separate members rigidly joined together, the upper key 66 side walls are offset from the lower key 67 side walls along the flying cross alignment axis 61.

FIG. 3b shows an isometric view of a piston having a piston alignment axis known throughout this disclosure as a piston axis 11, that is the piston axis of the piston 1, the piston may include a skirt 15 located radial of the piston axis, a crown 12, a crown top surface 13, a crown underside 14, a leg extending from the crown underside in a direction generally away from the underside along the piston axis and a base or "foot" 50 adjacent its distal end, the foot including a first flat type hearing arrangement 52, the bearing arrangement including a pair of plain bearings 52a and 52aa extending a parallel to a plane being at an angle to the piston axis 11, the angle being a perpendicular, the base including a key way 55 elongate along a base key way axis 501 extending perpendicular relative to the piston axis, the base key way 55 is of a dovetail form, the side walls of the base key way are parallel to each other but inclined towards the piston axis 11 in a direction generally away from the crown, the base including a second flat type bearing arrangement 53 including a pair of plain hearings 53a and 53aa extending parallel to a plane being perpendicular to the piston axis 11 and parallel to the first pair of plain bearings of the base flat type bearing arrangement 52, the base "foot" 50 is in the form of a inverted T-piece.

FIG. 3c shows an isometric view of a yoke structure 7 having a yoke structure axis 71, the yoke structure including first guide means 730 elongate along an axis extending perpendicular to the yoke structure axis 71, the yoke structure further including second guide means 74 and 75, each respective second guide means elongate along a respective axis being parallel to the yoke structure axis 71, each second guide means 74 and 75 located partly above and partly below the first guide means 730 but each to a respective long side of the first guide means, the yoke structure 7 including shank 70 having a shank end T-slot 700, the T-slot including a flat type bearing arrangement including a group of opposed parallel plain bearing surfaces extending perpendicular to the yoke structure axis 71, the T-slot including a key way 77 elongate along a key way axis 702 extending parallel to the first guide means axis 73 and perpendicular relative to the yoke structure axis 71.

FIG. 4a shows an isometric view of a flying cross having a flying cross alignment axis 61 and including a midplate 68 having and upper and lower opposed flat bearing arrangement having surfaces aligned parallel to a plane extending perpendicular to the flying cross alignment axis 61, the flying cross including a first upper key 66 elongate along a first upper key axis 67 and located adjacent the upper surfaces of the midplate 68, the first upper key axis 601 aligned perpendicular relative to the flying cross alignment axis 61 as indicated at B, the flying cross further including a second lower key 67 elongate along a second key axis 602, the second lower key 67 being located adjacent the lower opposed surface of the midplate, the second key axis 602 aligned perpendicular relative to the flying cross alignment axis 61 as indicated at A, the first upper key axis 601 and the second key axis 602 be separated from each other around the flying cross alignment axis 61 by an angle, preferably the angle is 90 degrees as indicated at C, the upper key 66 being a dove tail form of key having side walls inclined towards the flying cross alignment axis 61, the second lower key 67 is of a dove tail form having side walls inclined towards the flying cross alignment axis 61, the upper key 66 and the lower key 67 forming a cross or cruciform shape with the midplate 68 positioned between, and the keys 66, 67 being dovetail form keys joined to or extending from the midplate 68 at their narrows, the narrow of each key 66, 67 being the narrow of the fan of the dove form.

FIG. 4b shows an isometric view of a piston 1 having a piston alignment axis 11 known throughout this disclosure as a piston axis, that is the piston axis of the piston 1, the piston may include a skirt 15 located radial of the piston axis, a crown 12, a crown top surface 13, a crown underside 14, a leg 5 extending from the crown underside in a direction generally away from the underside along the piston axis and having a base or "foot" 50 adjacent its distal end, the foot 50 including a flat type bearing arrangement 52, the bearing arrangement including a pair of plain bearings 52a and 52aa being parallel to a plane being at an angle to the piston axis 11, the angle being a perpendicular, the base including a key way 55 elongate along a base key way axis 501 extending perpendicular relative to the piston axis 11, the base key way 55 is of a dovetail form, the side walls of the base key way 55 are parallel to each other but inclined towards the piston axis 11 in a direction generally away from the crown 12, the base key way being dovetail in form.

FIG. 4c shows an isometric view of a yoke structure 7 having a yoke structure axis 71, the yoke structure 7 including first guide means 730 elongate along an axis 73 extending perpendicular to the yoke structure axis 71, the yoke structure further including second guide means 74 and 75, each respective second guide means elongate along a respective axis being parallel to the yoke structure axis 71, each second guide means located partly above and partly below the first guide means 730 but each to a respective long side of the first guide means, the yoke structure 7 including shank 70 having a endplate 700, the end plate including a flat type bearing arrangement, the flat type bearing arrangement being a pair of plain bearing surfaces aligned parallel to a plane being perpendicular to the yoke structure axis 71, the end plate 700 including a dovetail form key way 77 elongate along a endplate key way axis 702 extending parallel to the first guide means axis 73 and perpendicular relative to the yoke structure axis 71.

A securement means in the form of a threaded fastener system including a shoulder stop in order that the fastener can be tightened against it self is provided (in a alternative embodiment the fastener system may include separately formed spacer means to which the fastener may be tightened). The fastener is adapted for through passage through the through hole of the midplate 68.

Figure 5F:
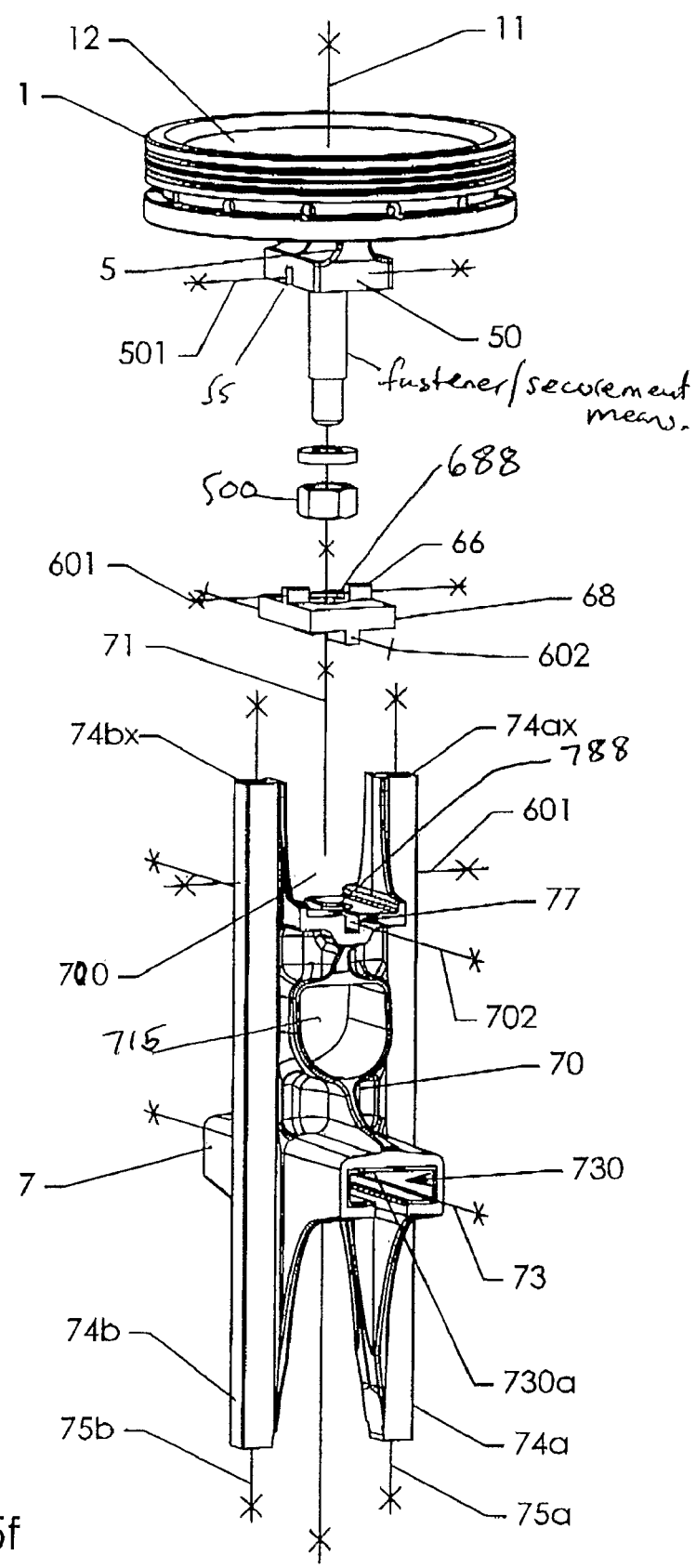
FIG. 5a shows an isometric view of a flying cross 60 having a flying cross alignment axis 61 and including a midplate 68 having and upper and lower opposed flat bearing arrangement having surfaces aligned parallel to a plane extending perpendicular to the flying cross alignment axis 61, the flying cross including a first upper key 66 elongate along a first upper key axis 67 and located adjacent the upper surfaces of the midplate 68, the first upper key axis 601 aligned perpendicular relative to the flying cross alignment axis 61 as indicated at B, the flying cross further including a second lower key 67 elongate along a second key axis 602, the second lower key 67 being located adjacent the lower opposed surface of the midplate, the midplate including a through hole 688 extends through the midplate 68 along an axis being parallel to the flying cross alignment axis 61, the second key axis extending perpendicularly relative to the flying cross alignment axis as indicated at A, the first upper key axis 601 and the second key axis 602 be separated from each other around the flying key alignment axis by an angle, preferably the angle is 90 degrees as indicated at C, the upper key having side walls parallel the flying cross alignment axis 61, the second lower key having side walls parallel the flying cross alignment axis, the upper key and the lower key forming a cross or cruciform shape, in a small alternative form there may be a bridging member extending between the upper and the lower key, the flying cross can be made of one piece or may be made from separate members joined together, the upper key side walls are offset from the lower key side walls along the flying cross alignment axis.
FIG. 5b shows an isometric view of a piston 1 having a piston alignment axis known throughout this disclosure as a piston axis 61, the piston may include a skirt or perimeter 15 located radial of the piston axis, a crown 12, a crown top surface 13, a crown underside 14, a leg 5 extending from the crown underside in a direction generally away from the underside along the piston axis and a base or "foot" 50 adjacent its distal end, the foot including a flat type bearing arrangement 52 including a pair of plain bearings 52a and 52aa extending a parallel to a plane being at an angle to the piston axis, the angle being perpendicular, the base including a key way 55 elongate along a base key way axis 501 extending perpendicular relative to the piston axis, the side walls of the base key way are parallel to each other and the piston axis.
FIG. 5c shows an isometric view of a yoke structure 7 having a yoke structure axis 71, the yoke structure including first guide means 730 elongate along an axis extending perpendicular to the yoke structure axis, the yoke structure further including second guide means 74 and 75, each respective second guide means elongate along a respective axis being parallel to the yoke structure axis, each second guide means located partly above and partly below the first guide means but each to a respective long side of the first guide means, the yoke structure including shank 70 having a endplate 700 including a first upper flat type bearing arrangement 78 in the form of a group of plain bearing surfaces 78a, 78aa aligned parallel to a plane being perpendicular to the yoke structure axis 71 and a second lower flat type bearing arrangement 79 in the form of at least one plain bearing surface 79a being parallel to the first upper group of plain bearing surfaces 78a, 78aa, the endplate 700 including a through 788 hole for the through passage of securement means, the through hole extending along an axis being parallel to the piston axis 11.

FIG. 5f is an exploded isometric view of an assembly of components from FIGS. 5a, 5b and 5c, it can be seen that the piston axis 11 and the flying cross alignment axis 61 and the yoke structure axis 71 are substantially parallel, that the axes 601 and 501 are substantially parallel and that axes 602 and 702 are substantially parallel also, the upper key axis 601 and base key way axis 501 are parallel, the lower key axis 602 and endplate axis 702 are parallel, the flying cross 60 is adapted to be engaged in both the base key way 55 and the endplate keyway 77, the securement means being a threaded fastener system adapted for through passage through the through hole 788 the end plate and the through hole of the midplate 68.

Figure 5G:
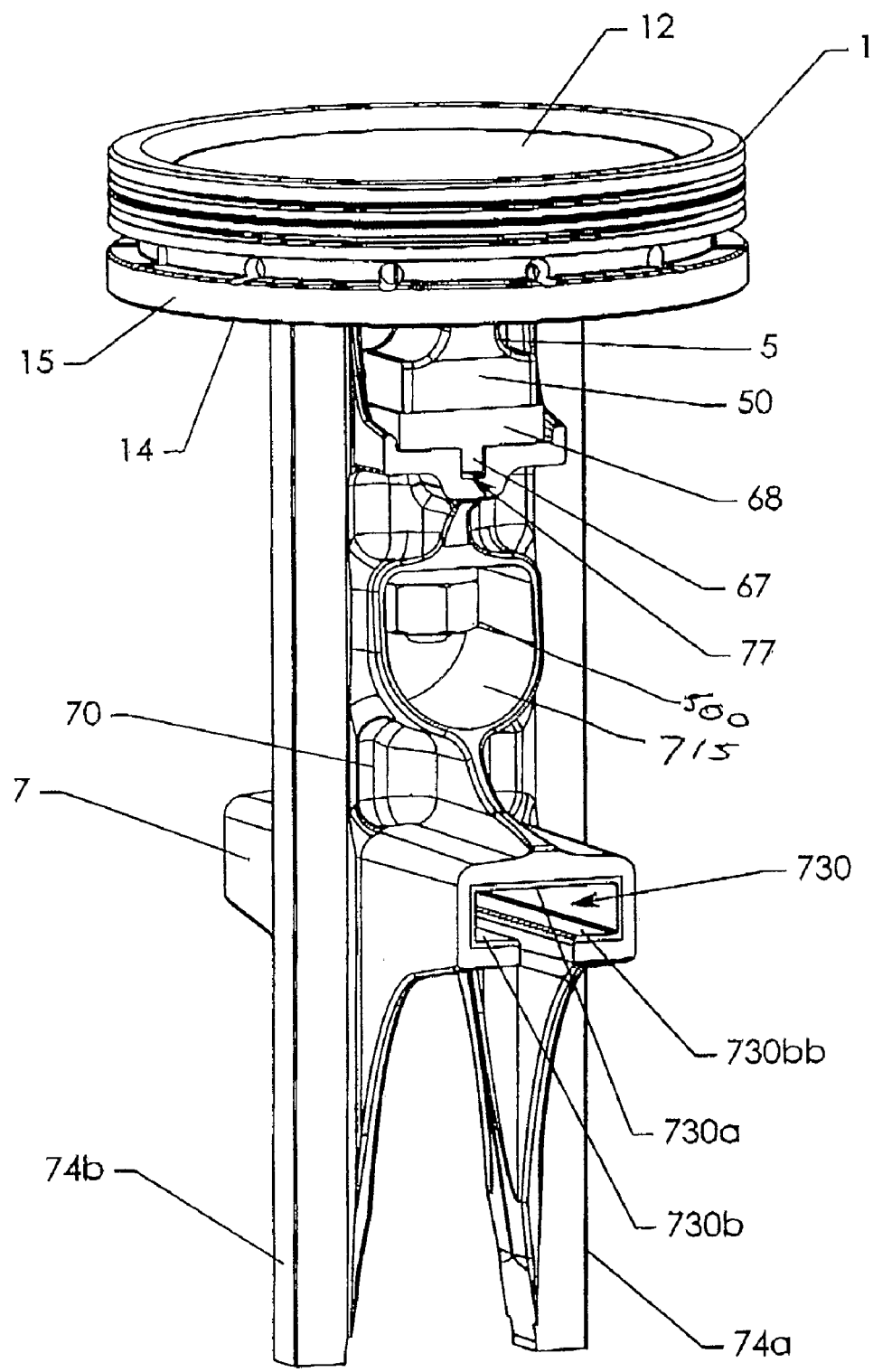

FIG. 5g is an isometric view of the components in FIGS. 5a, 5b and 5c, in assembled form wherein it can be seen that the lower key 67 of the flying cross 60 has been placed into the endplate key way 77, the upper key 66 having been placed into the base key way 55, the flat type bearing arrangement 52 of the base 50 and the first upper flat type bearing arrangement 62 of the midplate 68 being positioned for engagement with each other and the second lower flat type bearing arrangement 63 being positioned for engagement with the first upper flat type bearing arrangement 78 of the endplate 700 of the endplate being positioned for engagement with each other and the piston is linked to the yoke structure by way securement means extending through the through hole 788 in the endplate 700, the securement means including a retaining surface below the endplate for engagement with an underside surface 79 of the endplate, the retaining surface for holding the piston base 50 proximate to the endplate 700, the nature of the engagement of the flat bearing arrangement of the base and the flat bearing arrangement of the end plate being such that the piston 1 is prevented from rotating around an axis perpendicular relative to the piston axis 11, the flying cross 60 engagement with the endplate key way 77 and the base key way 55 being such that the piston 1 is prevented from rotating around the piston axis 11, the piston 1 and the yoke structure 7 can move sideways relative to each other but sideways motion is constrained to be along the plane of engagement of the base flat type bearing arrangement 52 with the endplate flat type bearing arrangement 78 and the retainer means engagement with the lower flat type bearing arrangement 79 of the endplate 700 and then mind only inline with the upper key axis 66 or lower key axis 67, the lower key 67 engagement with the endplate key way 77 being a bearing engagement such the lower key 67 is constrained to motion along the endplate keyway 77 inline with endplate key way axis 702 and the engagement of the upper key 66 with the base key way 55 being such that the upper key 66 is constrained to motion along the base key way 55 inline with the base key way axis 501.

FIG. 6a shows an isometric view of a flying cross 60 having a flying cross alignment axis 61 and including a midplate 68 having upper flat type bearing arrangement 62 and lower opposed flat type bearing arrangement 63 having surfaces aligned parallel to a plane extending perpendicular to the flying cross alignment axis 61 and to each other, the flying cross 60 including a first upper key 66 elongate along a first upper key axis 67 and located adjacent the upper surfaces of the midplate 68, the first upper key axis 601 aligned perpendicular relative to the flying cross alignment axis 61 as indicated at B, the flying cross further including a second lower key 67 elongate along a second key axis 602, the second lower key 67 being located adjacent the lower opposed surface of the midplate, the midplate including a through hole extends through the midplate 68 along an axis being parallel to the flying cross alignment axis 61, the second key axis extending perpendicularly relative to the flying cross alignment axis as indicated at A, the first upper key axis 601 and the second key axis 602 be separated from each other around the flying key alignment axis by an angle, preferably the angle is 90 degrees as indicated at C and the first key 66 in spaced relation from the second key 67 along the flying cross alignment axis, the upper key 66 being a dove tail form having side walls inclined towards the flying cross alignment axis 61, the second lower key 67 is of a dove tail form having side walls inclined towards the flying cross alignment axis 61, the upper key 66 and the lower key 67 forming a cross or cruciform shape, and the keys 66, 67 being joined to the midplate at their narrows, the narrow of each key being the narrow of the fan of the dove form, in a small alternative form there may be a web member extending from the mid plate to the narrow of the fan of the key be it a first upper key or a second lower key, the flying cross 60 n be made of one piece or may be made from separate members rigidly joined together, the upper key 66 side walls are offset from the lower key 67 side walls along the flying cross alignment axis 61.

FIG. 6b shows an isometric view of a piston having a piston alignment axis known throughout this disclosure as a piston axis 11, that is the piston axis of the piston 1, the piston may include a skirt 15 located radial of the piston axis, a crown 12, a crown top surface 13, a crown underside 14, a leg 5 extending from the crown underside in a direction generally away from the underside along the piston axis and a base or "foot" 50 adjacent its distal end, the foot including a first flat type bearing arrangement 52, the bearing arrangement including a pair of plain bearings 52a and 52aa extending a parallel to a plane being at an angle to the piston axis 11, the angle being a perpendicular, the base including a key way 55 elongate along a base key way axis 501 extending perpendicular relative to the piston axis, the base key way 55 is of a dovetail form, the side walls of the base key way 55 are parallel to each other but inclined towards the piston axis 11 in a direction generally away from the crown 12, the base 50 including a second flat type bearing arrangement 53 including a pair of plain bearings 53a and 53aa extending parallel to a plane being perpendicular to the piston axis 11 and parallel to the first pair of plain bearings 52a, 52aa of the base flat type bearing arrangement 52, the base "foot" 50 is in the form of a inverted T-piece, the plain bearings 52a, 52aa and 53a, 53aa being aligned along the cross bar of the T.

FIG. 6c shows an isometric view of a yoke structure 7 having a yoke structure axis 71, the yoke structure including first guide means 730 elongate along an axis 73 extending perpendicular to the yoke structure axis 71, the yoke structure further including second guide means 74a and 7b, each respective second guide means elongate along a respective axis 75a, 75b being parallel to the yoke structure axis 71, each second guide means 74 and 75 located partly above and partly below the first guide means 730 but each to a respective long side of the first guide means, the yoke structure 7 including shank 70 having a shank end T-slot 700, the T-slot including a flat type bearing arrangement 78 including a group of upper and lower opposed parallel plain bearing surfaces 78a, 78aa and 79a, 79aa extending perpendicular to the yoke structure axis 71, the T-slot including a key way 77 elongate along a key way axis 702 extending parallel to the first guide means axis 73 and perpendicular relative to the yoke structure axis 71.

Figure 6D:
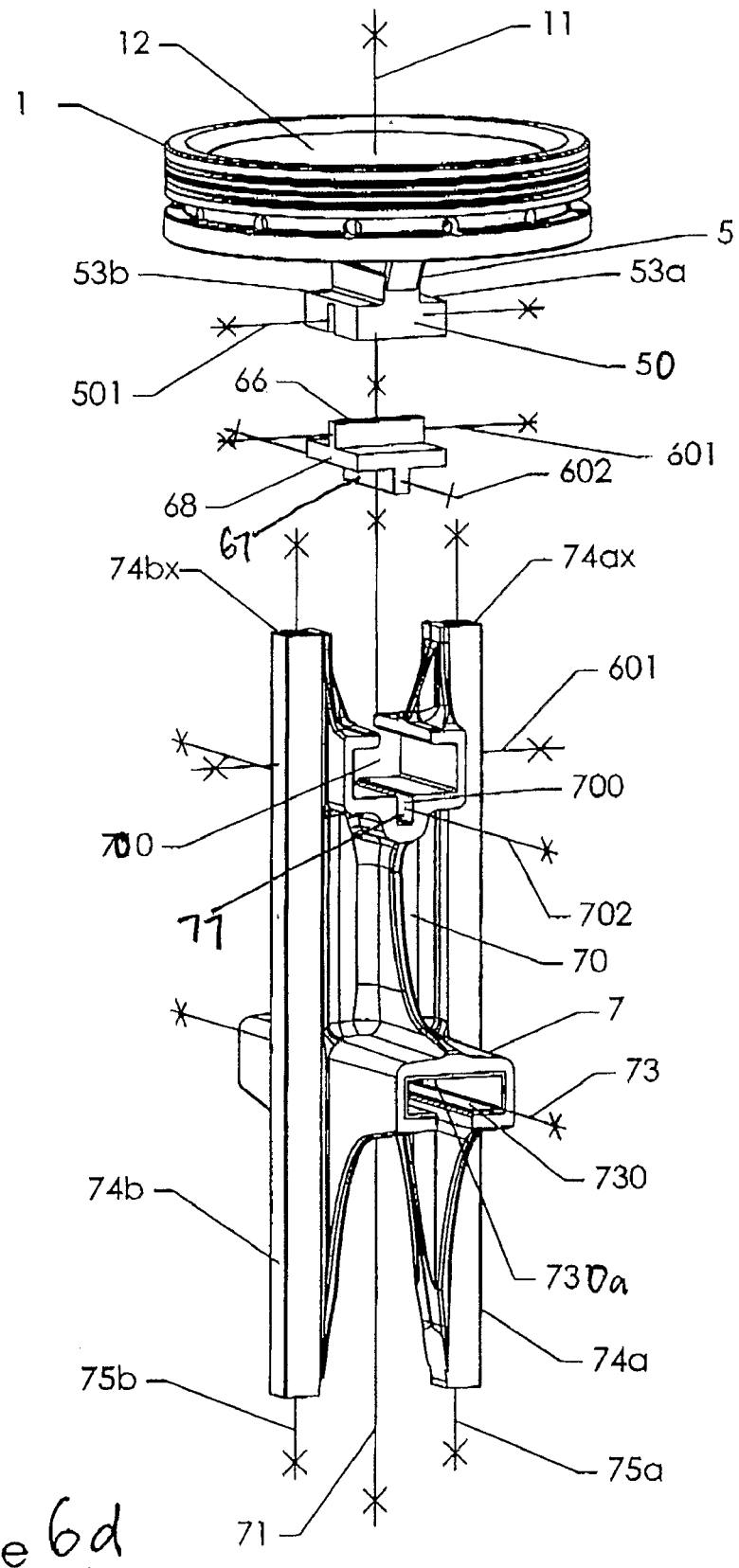

FIG. 6d is an exploded isometric view of an assembly of components from FIGS. 6a, 6b, 6c, it can be seen that the piston axis 11 and the flying cross alignment axis 61 and the yoke structure axis 71 are substantially parallel, that the axes 601 and 501 are substantially parallel and that axes 602 and 702 are substantially parallel also, the upper key 66 may be moved into the base key way 55, the lower key 67 may be moved into the T-slot floor key way 77, the flying cross 60 is adapted to be engage both the base key way 55 and the T-slot 700 floor keyway 77.

Figure 6E:
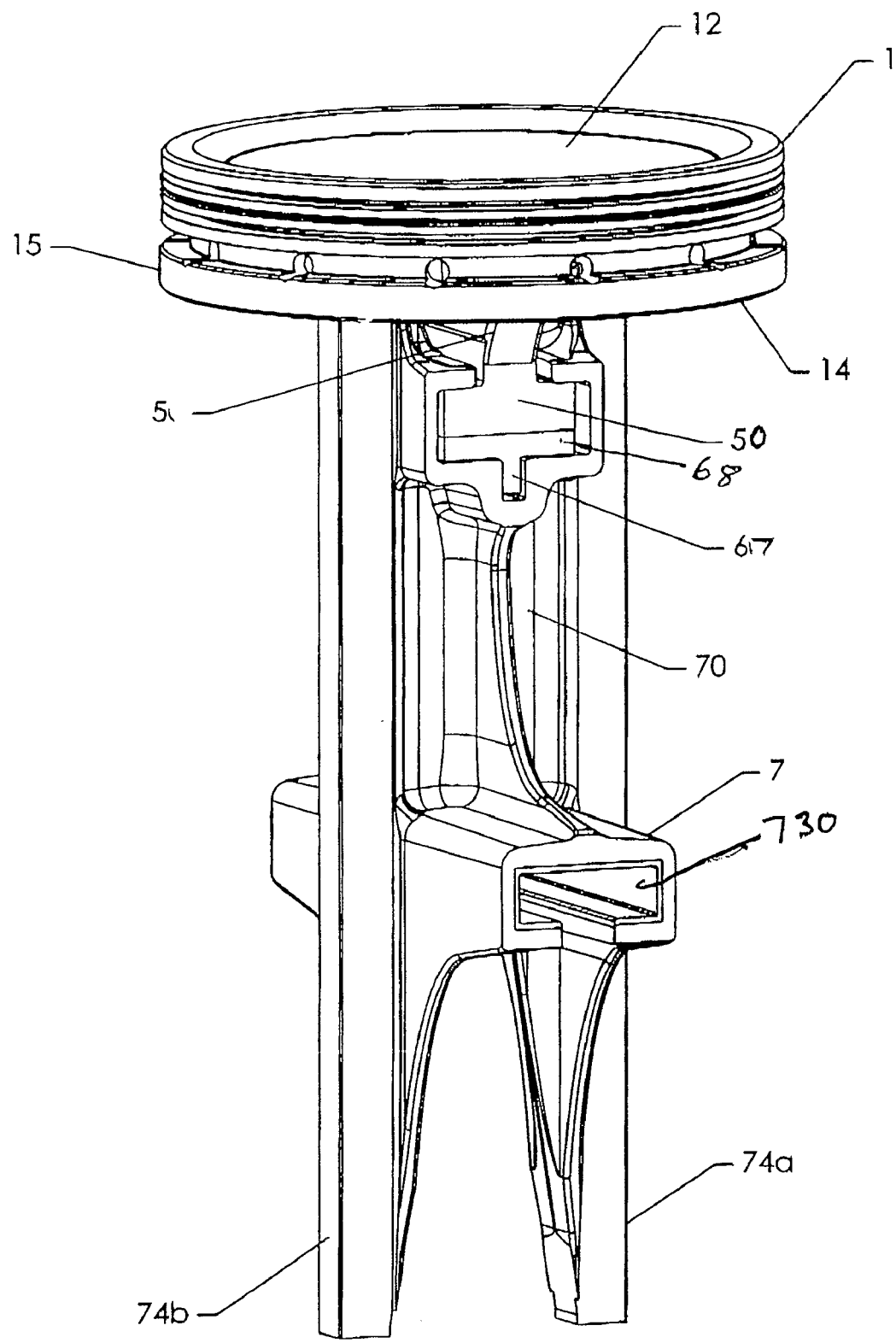

FIG. 6e is an isometric view of the components in FIGS. 6a, 6b and 6c, in assembled form wherein it can be seen that the lower key 67 of the flying cross 60 has been moved into the T-slot floor key way 77, the upper key 66 having been moved into the base key way 55, the first flat type bearing arrangement 52 of the base 50 and the second lower flat type bearing arrangement 79 of the T-slot 700 being positioned for engagement with each other and second upper flat type bearing arrangement 53 of the base is positioned for engagement with the first upper flat type bearing arrangement 62 of the base, the piston 1 is linked to the yoke structure 7 by way of the piston foot T-piece 50 being captive in the T-slot 700 of the shank 70, the nature of the engagement of the flat bearing arrangement 52 of the base and the first upper flat bearing arrangement 62 of the flying cross and the nature of the of engagement of the second lower flat type bearing arrangement 79 of the T-slot and the nature of the upper opposed parallel flat type bearing arrangement 53 of the base 50 with the upper flat type bearing arrangement of the T-slot being such that the piston 1 is prevented from rotating around an axis perpendicular relative to the piston axis 11, the flying cross 60 engagement with the T-slot floor key way 77 and the base key way 55 of the piston 1 being such that the piston is prevented from rotating around the piston axis 11, the piston 1 and the yoke structure 7 can move sideways relative to each other but sideways motion is constrained to be along parallel to the flat type bearing arrangements 52, 53, 62, 63, 78, 79 and then only inline with the upper key axis 66 or lower key axis 67, the lower key 67 engagement with the t-slot floor key way 77 being a bearing engagement such the lower key 67 is constrained to motion along the T-slot floor keyway 77 inline with key way axis 702 and the engagement of the upper key 66 with the base key way 55 being such that the upper key 66 is constrained to motion along the base key way 55 inline with the base key way axis 501.

FIG. 7a shows an isometric view of a flying key system 60 having a flying key system alignment axis 61 and including a first upper key 66 elongate along a first upper key axis 601, the first upper key axis extending perpendicularly relative to the flying key system alignment axis, the flying key system further including a second lower key 67 elongate along a second key axis 602, the second key axis extending perpendicularly relative to the flying key system alignment axis, the first upper key axis 601 and the second key axis 602 being parallel to each other, the upper key being a dove tail form of key having side walls inclined towards the flying cross alignment axis 61, the second lower key is of a dove tail form having side walls inclined towards the flying cross alignment axis, the upper key and the lower key forming a I-shape in a sectional end view of the upper key and lower key, the flying key system can be made of one piece or may be made from separate members rigidly joined together.

FIG. 7b shows an isometric view of a piston 1 having a piston alignment axis 11 known throughout this disclosure as a piston axis 11, the piston may include a skirt 15 located radial of the piston axis, a crown 12, a crown top surface 13, a crown underside 14, a leg 5 extending from the crown underside 14 in a direction generally away from the underside along the piston axis and a base or "foot" 50 adjacent its distal end, the foot 50 including a flat type bearing arrangement 52, the bearing arrangement including a pair of plain bearings 52a, 52aa extending perpendicular relative to the piston axis 11, the base 50 including a key way 55 elongate along a base key way axis 501 extending perpendicular relative to the piston axis 11, the base key way 55 is of a dovetail form, the side walls of the base key way 55 are parallel to each other but inclined towards the piston axis 11 in a direction generally away from the crown 12.

FIG. 7c shows an isometric view of a yoke structure 7 having a yoke structure axis 71, the yoke structure including first guide means 730 elongate along an axis 73 extending perpendicular to the yoke structure axis, the yoke structure further including second guide means 74a and 74b, each respective second guide means elongate along a respective axis 74a, 75b, being parallel to the yoke structure axis, each second guide means located partly above and partly below the first guide means but each to a respective long side of the first guide means, the yoke structure including shank 70 having a endplate 700, the end plate including a flat type bearing arrangement 78, the flat type bearing arrangement 78 being a pair of plain bearing surfaces 78a, 78aa extending perpendicular to the yoke structure axis 71, the end plate 700 including a dove tail form key way 77 elongate along a endplate key way axis 702 extending parallel to the first guide means axis 73 and perpendicular relative to the yoke structure axis 71, the side walls of the key way 77 in an end view of the key way would appear to be inclined towards the yoke structure alignment axis 71 in a direction away from the first guide means.

Figure 7D:
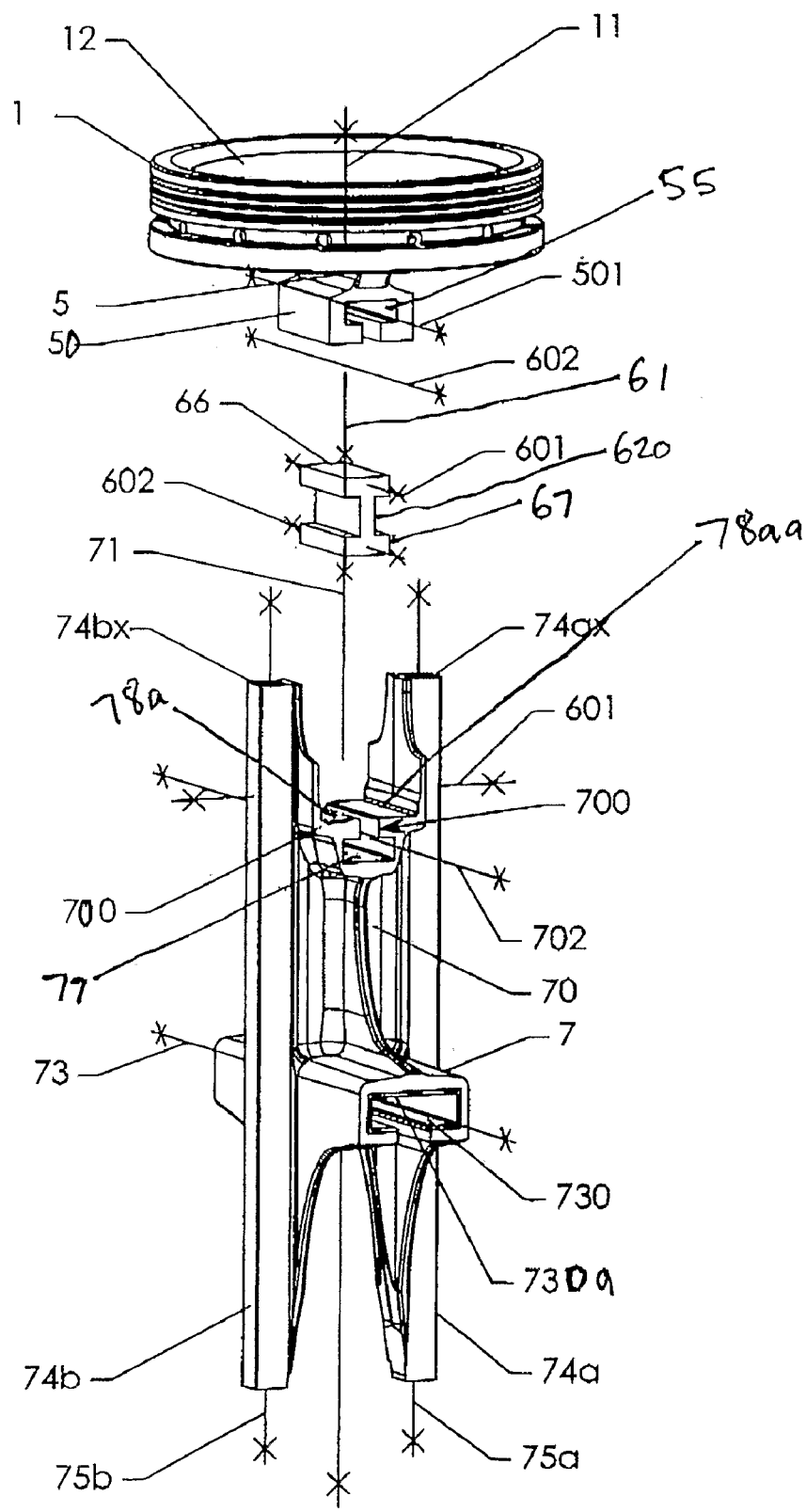

FIG. 7d is an exploded isometric view of an assembly of components from FIGS. 7a, 7b, 7c, it can be seen that the piston axis land the flying key system alignment axis 61 and the yoke structure axis 71 axes 601 and 501 are substantially parallel, the upper key may be moved into the base key way in a direction along the axes 501 and 601, the lower key may be moved into the endplate key way 77 along axes 602 and 702, the flying key system 60 is adapted to be captive in both the base key way 55 and the endplate keyway 77.

Figure 7E:
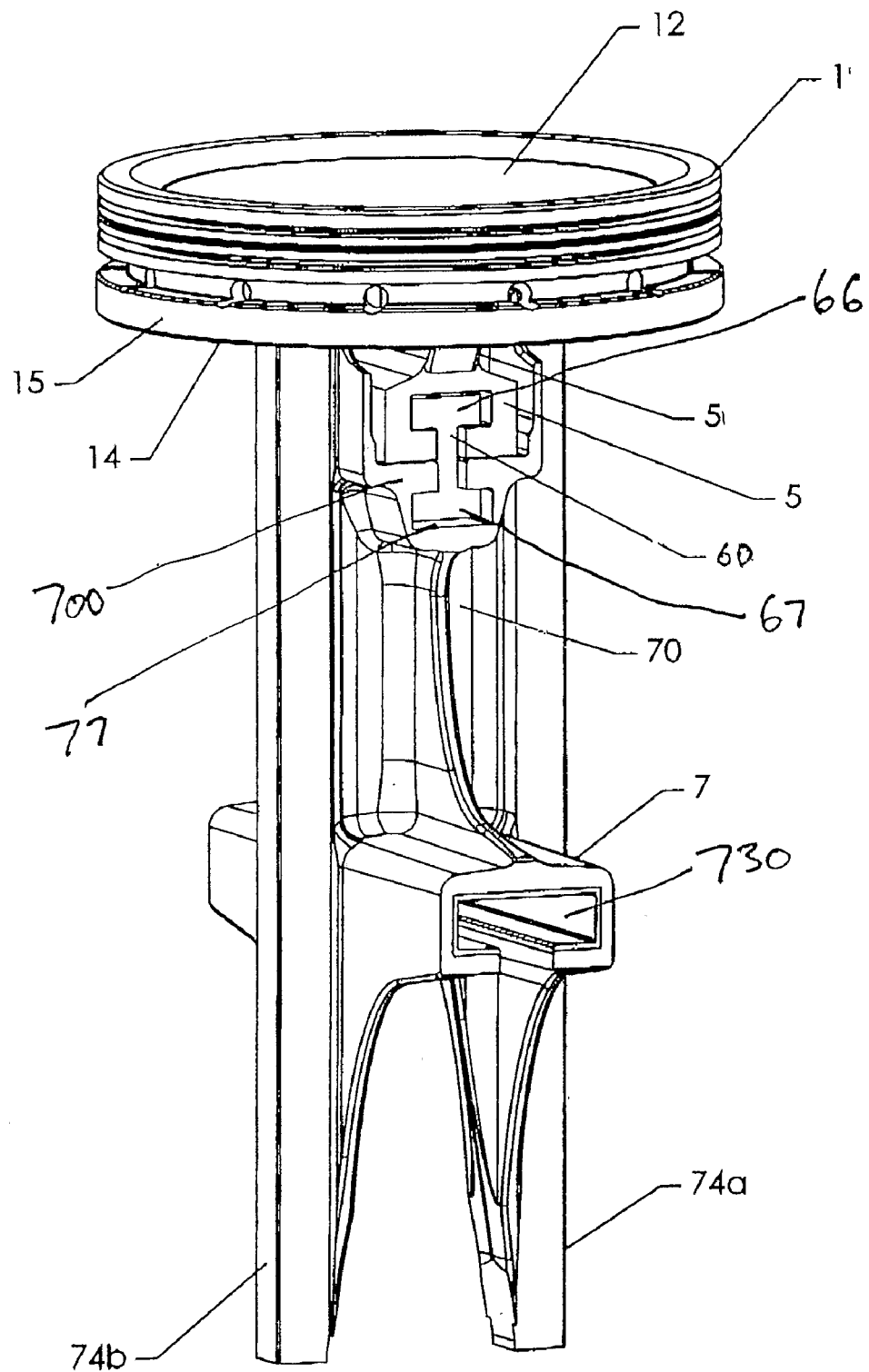

FIG. 7e is an isometric view of the components in FIGS. 7a, 7b and 7c in assembled form wherein it can be seen that the lower key 67 of the flying key system 60 has been moved into the endplate key way 77, the upper key 66 having been moved into the base key way 55, the flat bearing arrangement 52 of the base 50 and the flat bearing arrangement 78 of the endplate 700 being positioned for engagement with each other and the piston 1 is linked to the yoke structure 7 by way of the flying key system 60 which is captive to both the base key way 55 and the endplate key way 77, the nature of the engagement of the flat bearing arrangement 52 of the base and the flat bearing arrangement 78 of the end plate being such that the piston 1 is prevented from rotating around an axis perpendicular relative to the piston axis 11, the flying cross engagement with the endplate key way 77 and the base key way 55 being such that the piston 1 is prevented from rotating around the piston axis 11, the piston 1 and the yoke structure 7 can move sideways relative to each other but sideways motion is constrained to be along the plane of engagement of the base flat type bearing arrangement 52 with the endplate flat type bearing arrangement 78 and then only inline with the base key way axis 501 upper key axis 66 and lower key axis 67 and endplate key way axis 702, the lower key 67 engagement with the endplate key way 77 being a bearing engagement such the lower key 67 is constrained to motion along the endplate key way 77 inline with endplate key way axis 702 and the engagement of the upper key 66 with the base key way 55 being such that the upper key 66 is constrained to motion along the base key way 55' inline with the base key way axis 501.

FIG. 8a shows an isometric view of a flying key system having a flying cross alignment axis 61 and including a midplate 68 having a upper and a lower flat type bearing arrangement having surfaces aligned parallel to a plane extending perpendicular to the flying cross alignment axis 61, the flying key system including a first upper key 66 elongate along a first upper key axis 67 and located adjacent the upper surfaces of the midplate 68, the first upper key axis 601 aligned perpendicular relative to the flying key system alignment axis 61, the flying key system further including a second lower key 67 elongate along a second key axis 602, the second lower key 67 being located adjacent the lower opposed surface of the midplate, the second key axis 602 aligned perpendicular relative to the flying key system alignment axis 61, the first upper key axis 601 and the second key axis 602 being parallel to each, the upper key 66 being a dove tail form of key and in an end view would appear to be inclined towards the flying key system alignment axis 61, the second lower key 67 is of a dove tail form having side walls which in an end view would appear to be inclined in the opposite towards the flying cross alignment axis 61, the midplate 68 positioned between the upper key 66 and the lower key 67, and the keys 66, 67 being dovetail form keys joined to or extending from the midplate 68 at their narrows, the narrow of each key 66, 67 being the narrow of the fan of the dove form, there are other variations on the dove tail key included in the disclosure and intended to be used in like fashion, we say variations because in terms of use in the invention they have the same like function and obviously we key is masculine and the key way to which it is to be fitted is female in nature able to capture the key so that it cant be pulled out of the key way in direction parallel to the flying key system alignment axis.

FIG. 8b shows an isometric view of a piston 1 having a piston alignment axis 11 known throughout this disclosure as a piston axis, that is the piston axis of the piston 1, the piston may include a skirt 15 located radial of the piston axis, a crown 12, a crown top surface 13, a crown underside 14, a leg 5 extending from the crown underside in a direction generally away from the underside along the piston axis and having a base or "foot" 50 adjacent its distal end, the foot 50 including a flat type bearing arrangement 52, the bearing arrangement including a pair of plain bearings 52a and 52aa being parallel to a plane being at an angle to the piston axis 11, the angle being a perpendicular, the base including a key way 55 elongate along a base key way axis 501 extending perpendicular relative to the piston axis 11, the base key way 55 is of a dovetail form, the side walls of the base key way 55 in an end view of the key way would appear to be inclined towards the piston axis 11 in a direction generally away from the crown 12.

FIG. 8c shows an isometric view of a yoke structure 7 having a yoke structure axis 71, the yoke structure 7 including first guide means 730 elongate along an axis 73 extending perpendicular to the yoke structure axis 71, the yoke structure further including second guide means 74 and 75, each respective second guide means elongate along a respective axis being parallel to the yoke structure axis 71, each second guide means located partly above and partly below the first guide means 730 but each to a respective long side of the first guide means, the yoke structure 7 including shank 70 having a endplate 700, the end plate including a flat type bearing arrangement, the flat type bearing arrangement being a pair of plain bearing surfaces aligned parallel to a plane being perpendicular to the yoke structure axis 71, the end plate 700 including a dovetail form key way 77 elongate along a endplate key way axis 702 extending parallel to the first guide means axis 73 and perpendicular relative to the yoke structure axis 71, it should be noted that it is preferred that the axis 702 is parallel to axis 73 but this not need be so in an alternative embodiment.

It will be understood from the descriptions of the previous embodiments that the components of FIGS. 8a, 8b, 8c can be assembled so that the lower key 67 of the flying key system 60 is moved into the endplate key way 77, the upper key 66 is moved into the base key way 55, the midplate being positioned between the flat bearing arrangement 52 of the base 50 and the flat bearing arrangement of the endplate 700 such that it is positioned for engagement with the piston base flat type bearing arrangement and the endplate flat bearing arrangement and the nature of the engagement of the flat bearing arrangement 52 of the base and the flat bearing arrangement of the end plate with the midplate flat bearing arrangement being such that the piston 1 is prevented from rotating around an axis perpendicular relative to the piston axis 11, the flying key system 60 engagement with the endplate key way 77 and the base key way 55 being such that the piston 1 is prevented from rotating around the piston axis 11, the piston 1 and the yoke structure 7 can move sideways relative to each other but sideways motion is constrained to be along the plane of engagement of the base flat type bearing arrangement 52 with the endplate flat type bearing arrangement and only inline with the upper key axis 66 or lower key axis 67 and base key way 55 and base key way axis 501, the flying ckey system linking the piston 1 to the yoke structure 7.

Figure 10A:
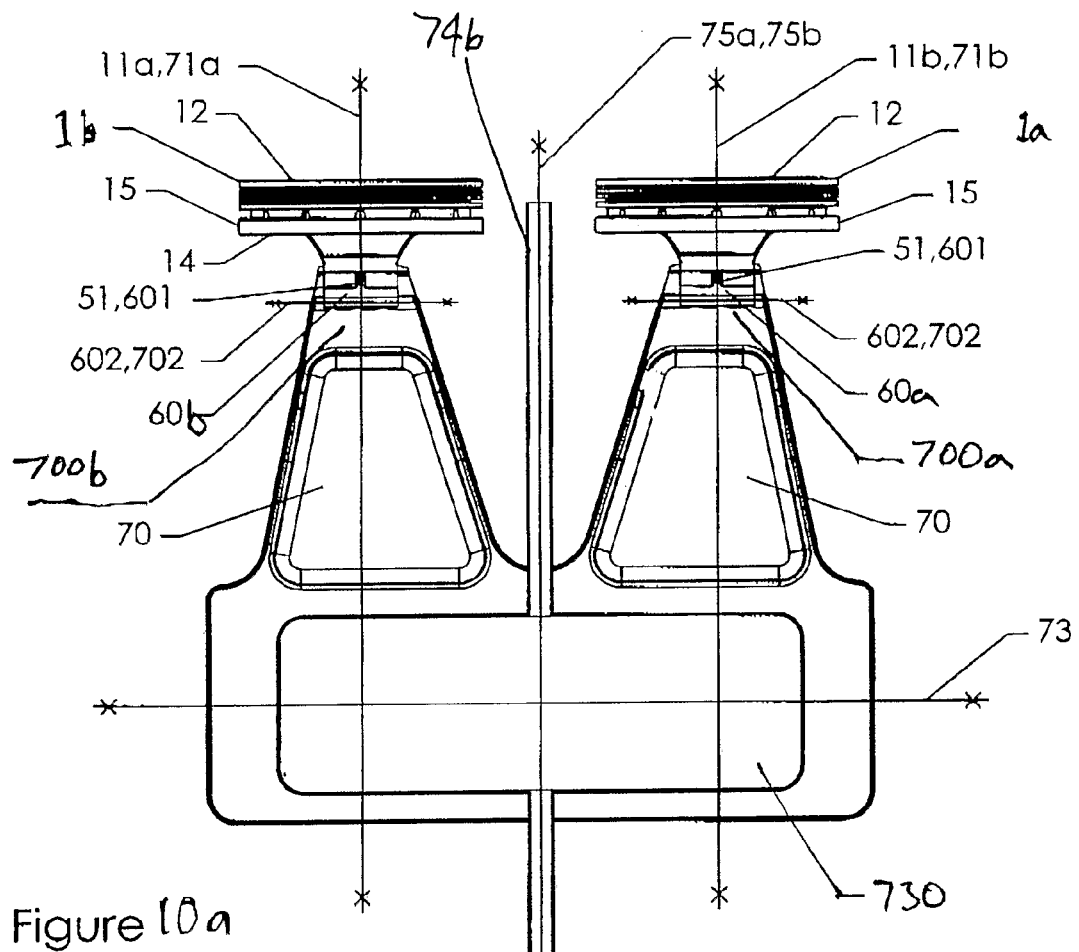

FIG. 10a is a front side view of a multi piston and yoke assembly, the assembly including a first piston 1a and a second piston 1b each respective piston mounted to a respective shank 70a, 70b having respective shank end arrangements 700a, 700aa, each piston including a respective piston base having at least one flat type bearing arrangement adapted for engagement with at least one flat type bearing arrangement of either a respective shank end arrangement 700a or 700aa or an upper flat type bearing arrangement of a midplate or spacer element of a flying cross, the yoke structure 7 including first guide means elongate along a axis extending perpendicular relative to the piston axes 11a and 11b, the yoke structure including second guide means elongate along an axis parallel to each of the piston axes 11a and 11b. each piston of the assembly being parallel to the other, the second guide means extending both above and below the first guide means.

Figure 10B:
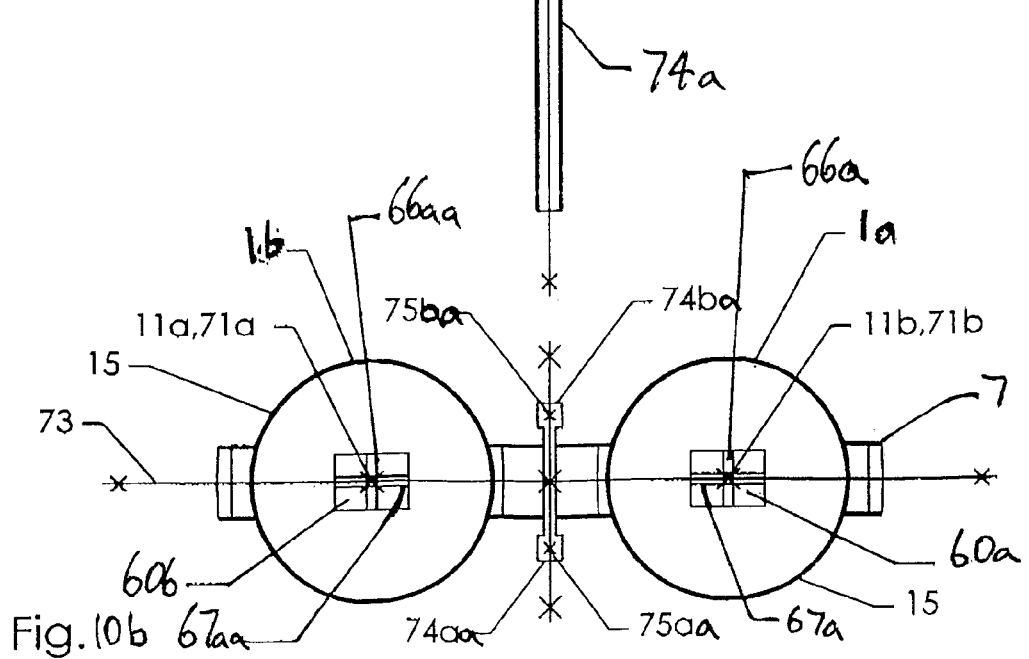

FIG. 10b is a top plan schematic view of the assembly of FIG. 10a, it can be seen that first guide means extends through a projection each piston 1a, 1b, circumference, it can be seen the second guide means are two in number in this embodiment, one second guide means each long side of the first guide means, it can be seen first guide means axis 73. Basically the embodiment found in FIGS. 10a and 10b can be configured to conform with the earlier pictured embodiments it is just that is has two piston and shanks and flying crosses. So the references and information describing the parts and functions of the earlier pictured embodiment assemblies can be used, obviously each with in adapted for reciprocation within a respective cylinder and of an scotch yoke engine of pump of the invention, each piston is prevented for rotating around its respective piston axis or axis being parallel to same, each by the action of a respective flying cross, also obviously flying key systems could be used instead of flying crosses if required, it can be seen in the image that the lower keyways of the flying crosses 60a and 60aa are aligned parallel to the first guide means axis 73 but this is not mandatory.

An flying cross arrangement comprises a multi part flying cross split along a plane being parallel to the flying cross axis 61, the flying cross may be assembled such that it is a rigid body when assembled or it may be joined together such that the separate parts of the multi part flying cross are connected to each other but able to move relative to each other.

Figures 1A, 1B, 1C:
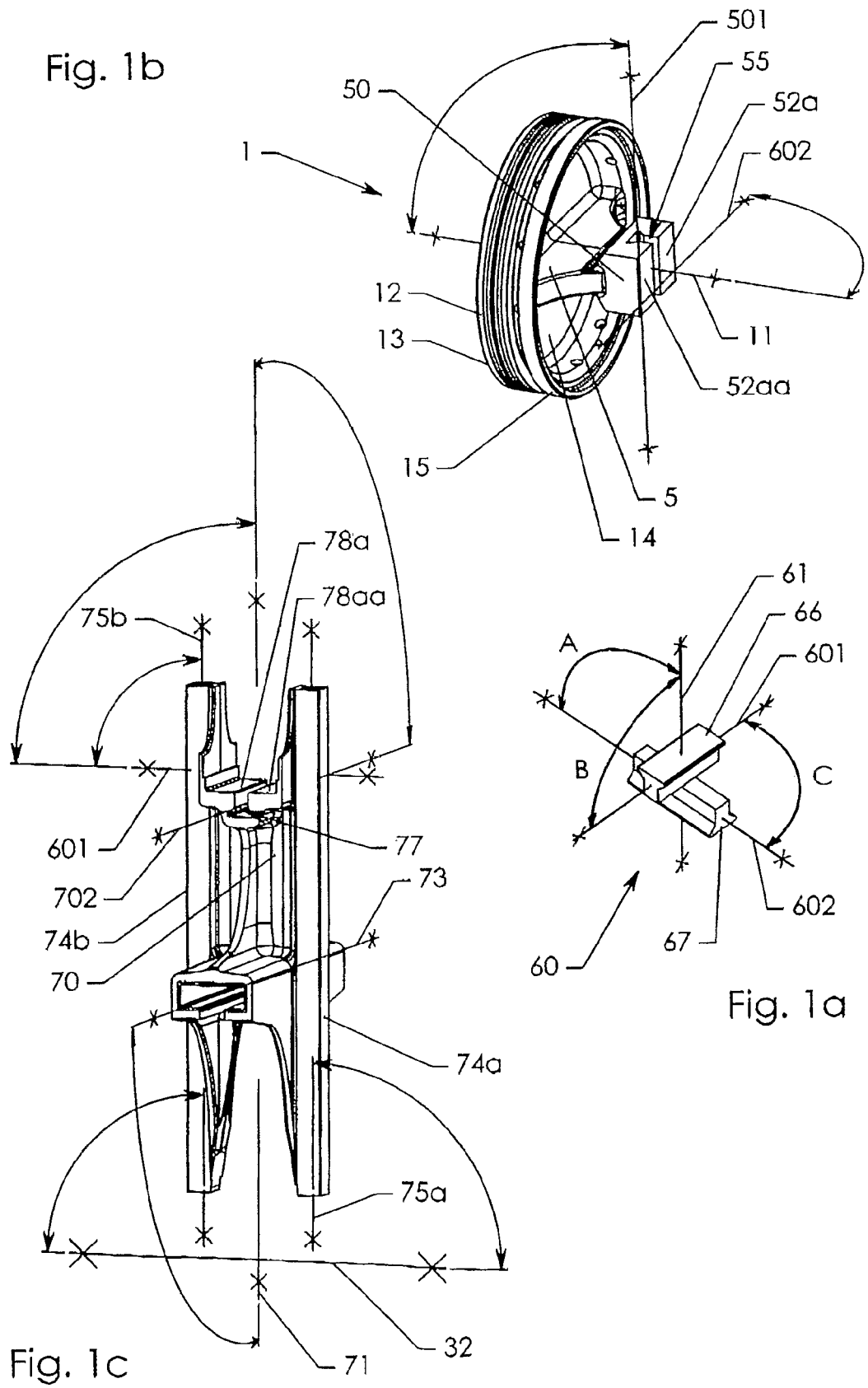
FIG. 1a shows an isometric view of a flying cross having a flying cross alignment axis 61 and including a first upper key 66 elongate along a first upper key axis 601, the first upper key axis extending perpendicularly relative to the flying cross alignment axis as indicated at B, the flying cross further including a second lower key 67 elongate along a second key axis 602, the second key axis extending perpendicularly relative to the flying cross alignment axis as indicated at A, the first upper key axis 601 and the second key axis 602 be separated from each other around the flying key alignment axis by an angle, preferably the angle is 90 degrees as indicated at C, the upper key being a dove tail form of key having side walls inclined towards the flying cross alignment axis 61, the second lower key is of a dove tail form having side walls inclined towards the flying cross alignment axis, the upper key and the lower key forming a cross or cruciform shape, and the keys being joined at a portion of their narrows, the narrow of each key being the narrow of the fan of the dove form, in a small alternative form there may be a bridging member extending between the upper and the lower key, the flying cross can be made of one piece or may be made from separate members rigidly joined together, the upper key side walls are offset from the lower key side walls along the flying cross alignment axis.
FIG. 1b shows an isometric view of a piston 1 having a piston alignment axis 11 known throughout this disclosure as a piston axis 11, the piston may include a skirt 15 located radial of the piston axis, a crown 12, a crown top surface 13, a crown underside 14, a leg 5 extending from the crown underside 14 in a direction generally away from the underside along the piston axis and a base or "foot" adjacent its distal end, the foot 50 including a flat type bearing arrangement 52, the bearing arrangement including a pair of plain bearings 52a, 52aa extending a parallel to a plane being at an angle to the piston axis 11, the angle being a perpendicular, the base 50 including a key way 55 elongate along a base key way axis 501 extending perpendicular relative to the piston axis 11, the base key way 55 is of a dovetail form, the side walls of the base key way 55 are parallel to each other but inclined towards the piston axis 11 in a direction generally away from the crown 12.
FIG. 1c shows an isometric view of a yoke structure 7 having a yoke structure axis 71, the yoke structure including first guide means 730 elongate along an axis 73 extending perpendicular to the yoke structure axis, the yoke structure further including second guide means 74a and 74b, each respective second guide means elongate along a respective axis 74a, 75b, being parallel to the yoke structure axis, each second guide means located partly above and partly below the first guide means but each to a respective long side of the first guide means, the yoke structure including shank 70 having a endplate 700, the end plate including a flat type bearing arrangement 78, the flat type bearing arrangement 78 being a pair of plain bearing surfaces 78a, 78aa aligned parallel to a plane being perpendicular to the yoke structure axis 71, the end plate 700 including a key way 77 elongate along a endplate key way axis 702 extending parallel to the first guide means axis 73 and perpendicular relative to the yoke structure axis 71.
Figure 1D:
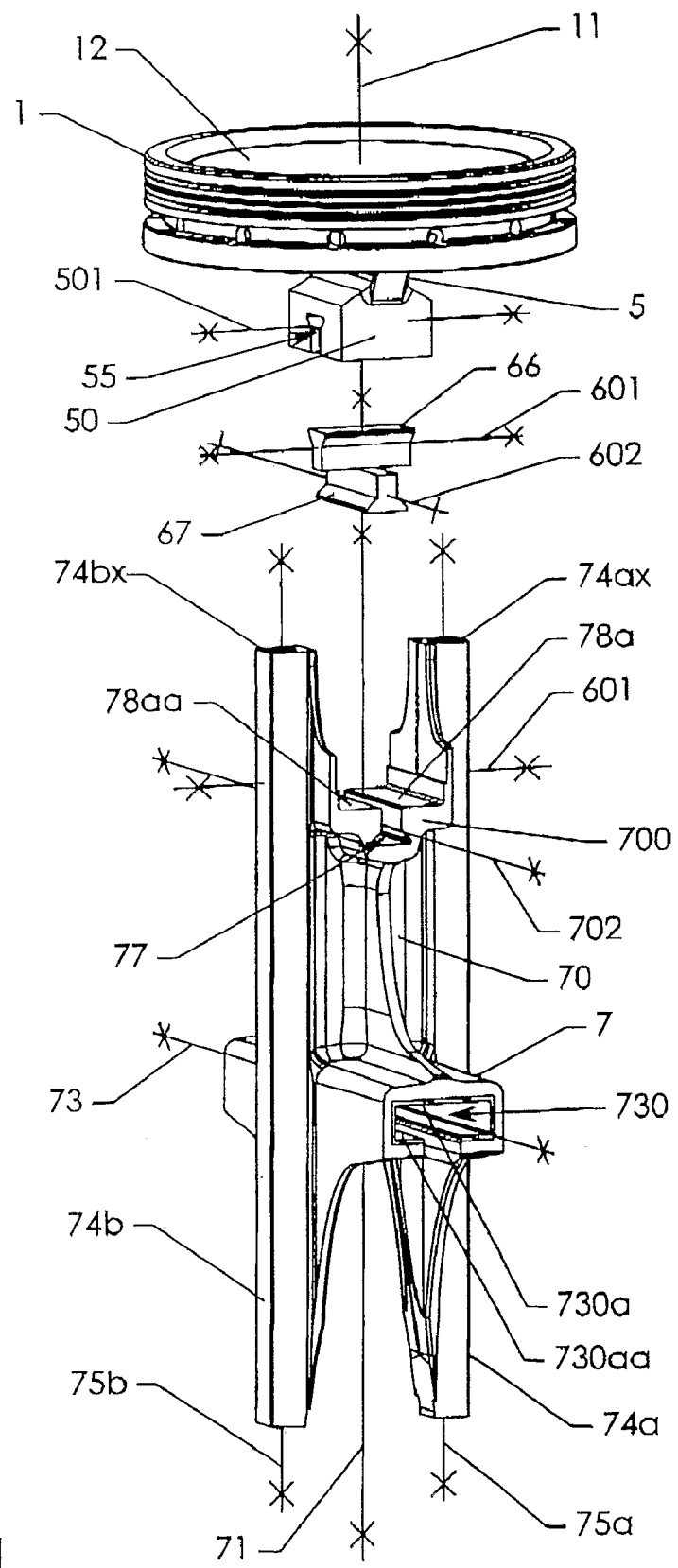
FIG. 1d is an exploded isometric view of an assembly of components from FIGS. 1a, 1b, 1c, it can be seen that the piston axis land the flying cross alignment axis 61 and the yoke structure axis 71 are substantially parallel, that the axes 601 and 501 are substantially parallel and that axes 602 and 702 are substantially parallel also, the upper key may be moved into the base key way in a direction along the axes 501 and 601, the lower key may be moved into the endplate key way 77 along axes 602 and 702, the flying cross 60 is adapted to be captive in both the base key way 55 and the endplate keyway 77.
Figure 1E:
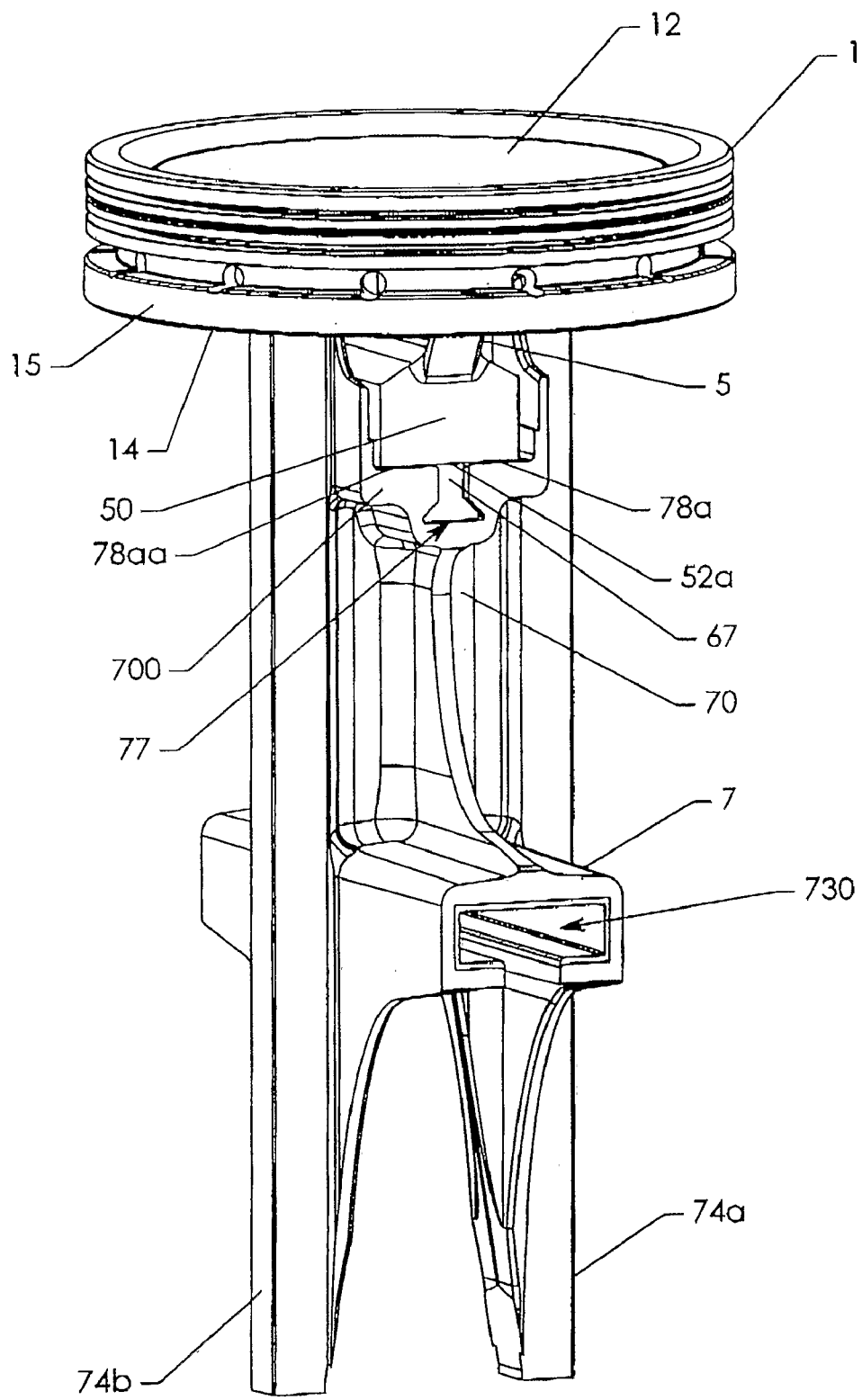
FIG. 1e is an isometric view of the components in FIGS. 1a, 1b, 1c in assembled form wherein it can be seen that the lower key 67 of the flying cross 60 has been moved into the endplate key way 77, the upper key 66 having been moved into the base key way 55, the flat bearing arrangement 52 of the base 50 and the flat bearing arrangement 78 of the endplate 700 being positioned for engagement with each other and the piston 1 is linked to the yoke structure 7 by way of the flying cross 60 which is captive to both the base key way 55 and the endplate key way 77, the nature of the engagement of the flat bearing arrangement 52 of the base and the flat bearing arrangement 78 of the end plate being such that the piston 1 is prevented from rotating around an axis perpendicular relative to the piston axis 11, the flying cross engagement with the endplate key way 77 and the base key way 55 being such that the piston 1 is prevented from rotating around the piston axis 11, the piston 1 and the yoke structure 7 can move sideways relative to each other but sideways motion is constrained to be along the plane of engagement of the base flat type bearing arrangement 52 with the endplate flat type bearing arrangement 78 and then only inline with the upper key axis 66 or lower key axis 67, the lower key 67 engagement with the endplate key way 77 being a bearing engagement such the lower key 67 is constrained to motion along the endplate key way 77 inline with endplate key way axis 702 and the engagement of the upper key 66 with the base key way 55 being such that the upper key 66 is constrained to motion along the base key way 55 inline with the base key way axis 501.
Figure 2E:
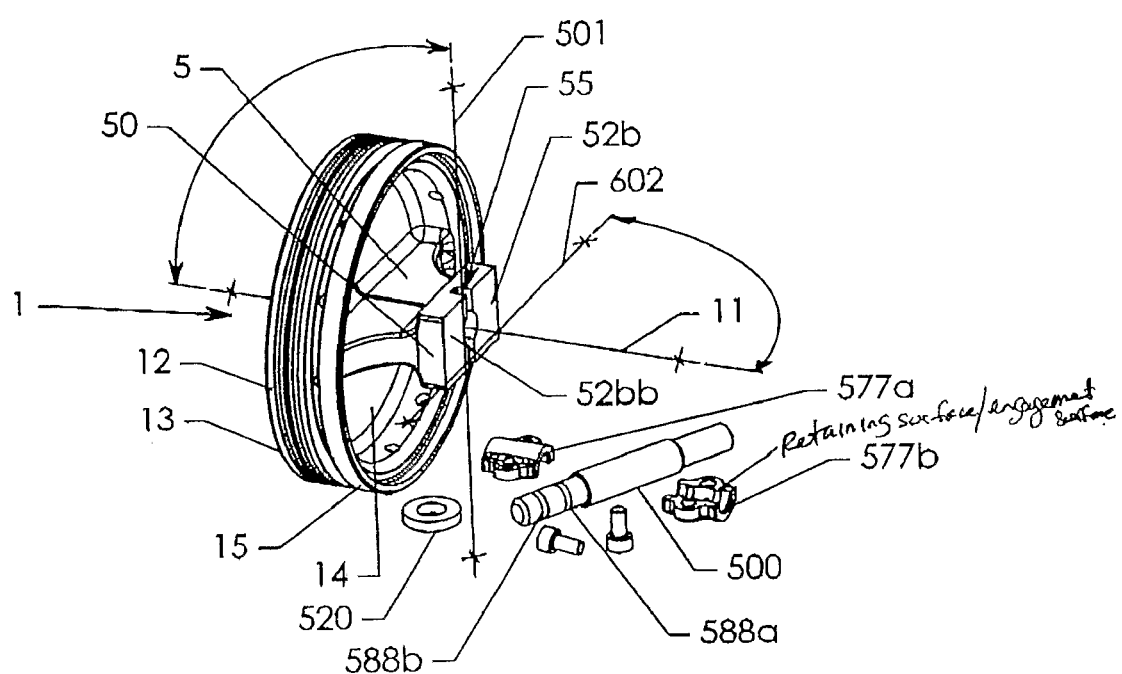
FIG. 2*e* shows an isometric view of a securement means being of a post and collet type.
Figure 2F:
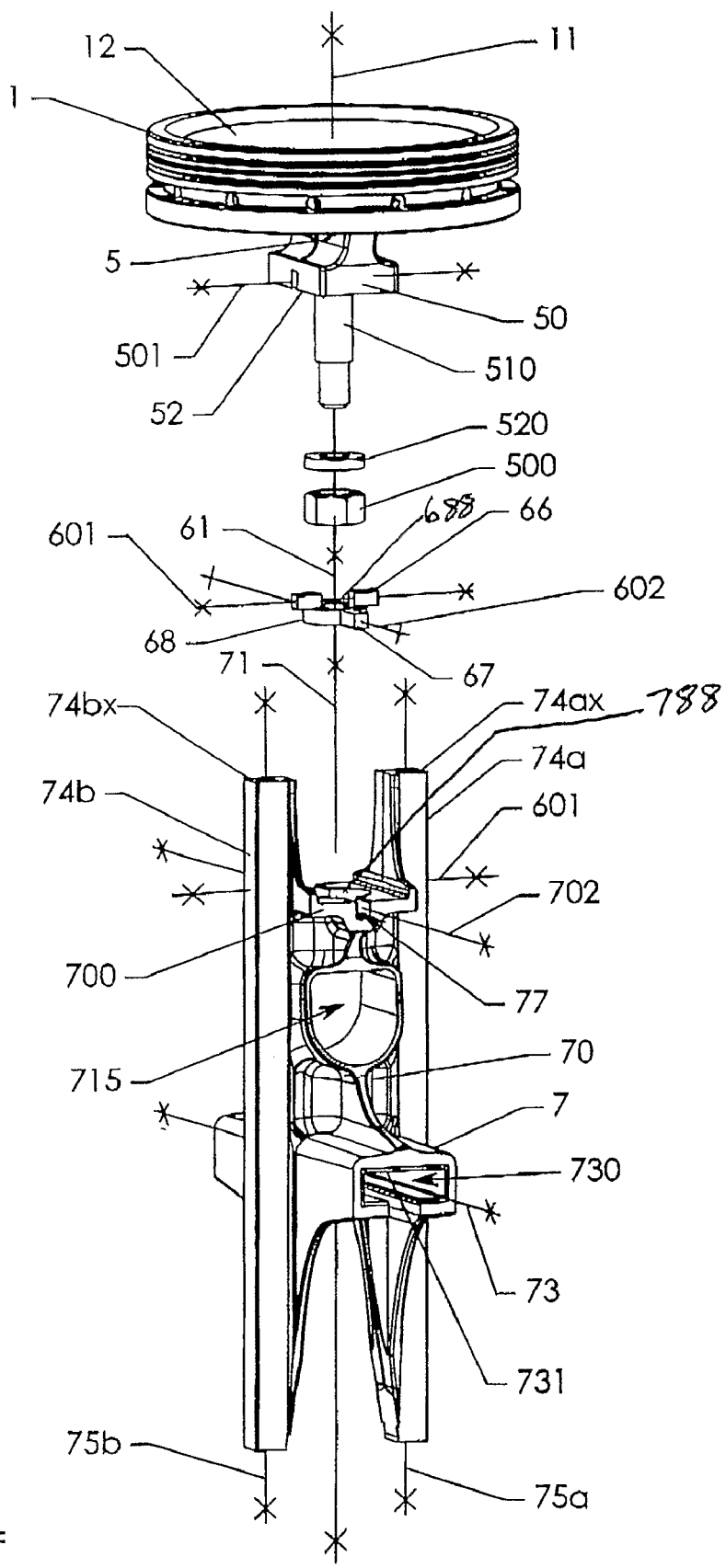
FIG. 2*f* is an exploded isometric view of an assembly of components from FIGS. 2*a*, 2*b*, 2*c* and 2*d*, it can be seen that the piston axis 11 and the flying cross alignment axis 61 and the yoke structure alignment axis 71 extend substantially parallel to each other, that the axes 601 and 501 are substantially parallel and that axes 602 and 702 are substantially parallel also, the upper key axis 601 and base key way axis 501 are parallel, the lower key axis 602 and endplate axis 702 are parallel, the flying cross 60 is adapted to be engaged in both the base key way 55 and the endplate keyway 77, the securement means being a threaded fastener system.
Figure 2G:
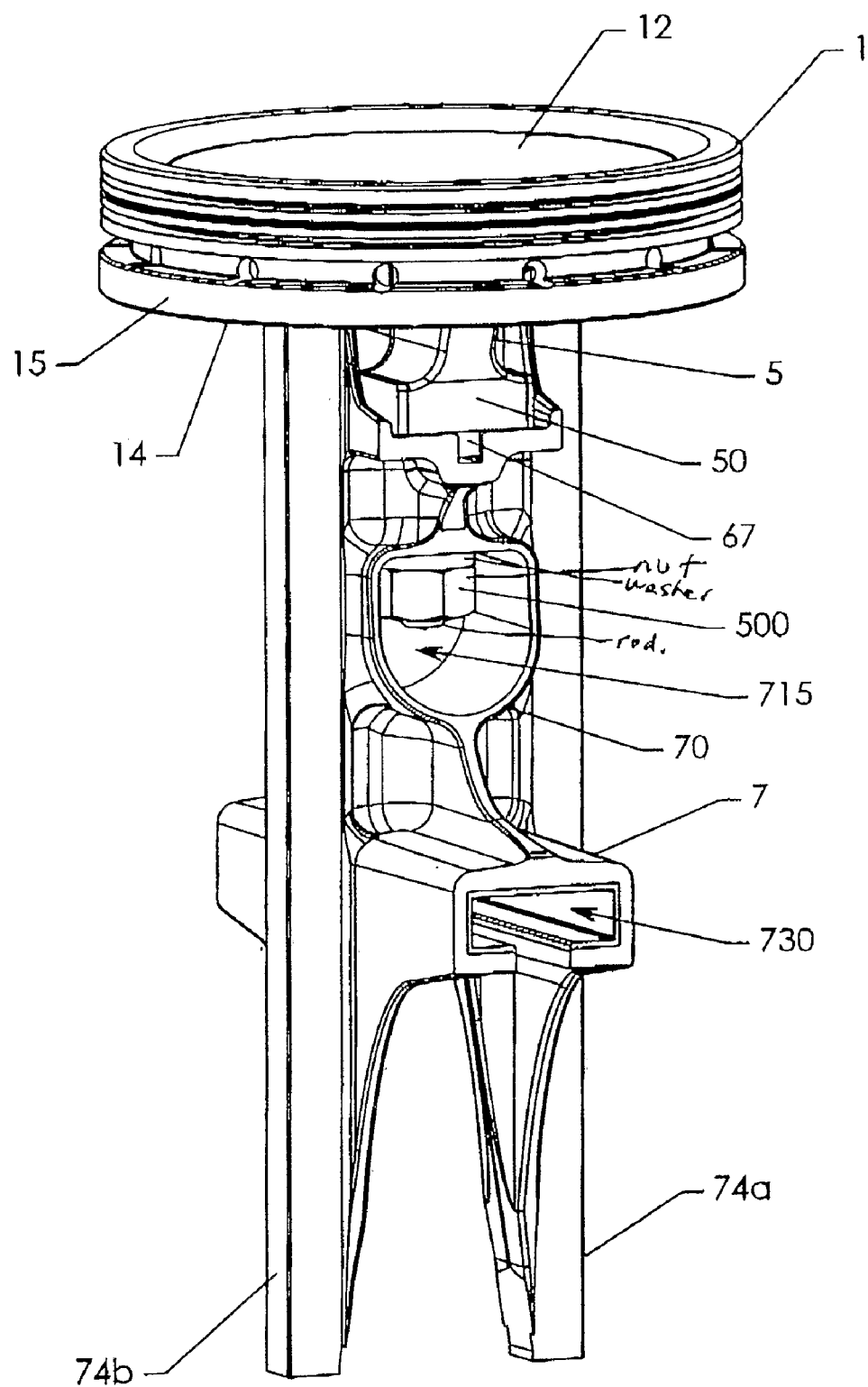
FIG. 2*g* is an isometric view of the components in FIGS. 2*a*, 2*b*, 2*c* and 2*d*, in assembled form wherein it can be seen that the lower key 67 of the flying cross 60 has been placed into the endplate key way 77, the upper key 66 having been placed into the base key way 55, the flat bearing arrangement 52 of the base and the flat bearing arrangement of the endplate being positioned for engagement with each other and the piston 1 is linked to the yoke structure 7 by way securement means extending through the through hole in the endplate, the securement means including a retaining surface below the endplate for engagement with an underside surface of the endplate, the retaining surface for holding the piston base 50 proximate to the endplate 700, the nature of the engagement of the flat bearing arrangement of the base 50 and the flat bearing arrangement of the end plate 700 being such that the piston 1 is prevented from rotating around an axis perpendicular relative to the piston axis 11, the flying cross 60 engagement with the endplate key way 77 and the base key way 55 being such that the piston 1 is prevented from rotating around the piston axis 11, the piston 1 and the yoke structure 77 can move sideways relative to each other but sideways motion is constrained to be along the plane of engagement of the base flat type bearing arrangement 52 with the endplate flat type bearing arrangement and then only inline with the upper key axis 66 and lower key axis 67, the lower key 67 engagement with the endplate key way 77 being a bearing engagement such the lower key 67 is constrained to motion along the endplate keyway 77 inline with endplate key way axis 702 and the engagement of the upper key 66 with the base key way 55 being such that the upper key 66 is constrained to motion along the base key way 55 inline with the base key way axis 501.
Figure 2H:
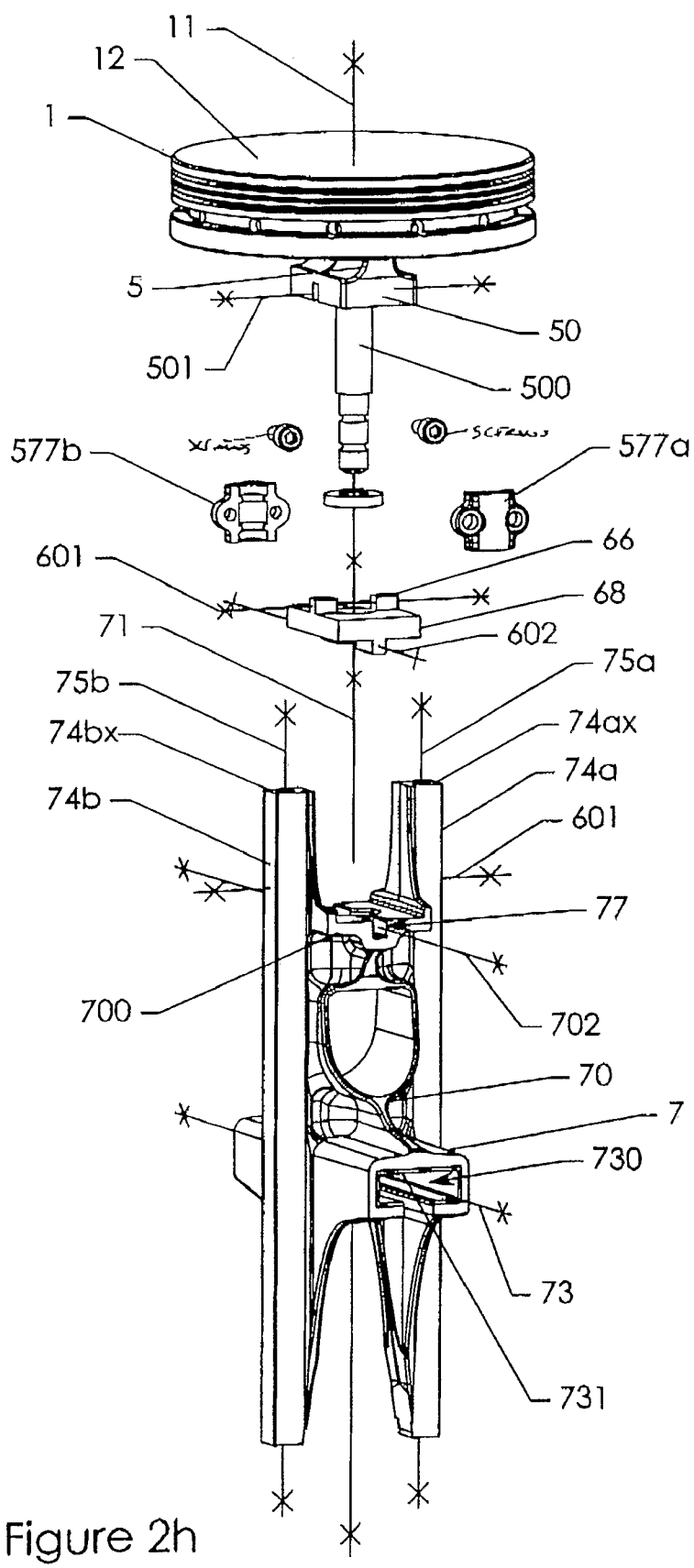
FIG. 2*h* is an exploded isometric view of an assembly of components from FIGS. 2*a*, 2*b*, 2*c* and 2*e*, it can be seen that the piston axis 1 and the flying cross alignment axis 61 and the yoke structure axis 71 are aligned substantially parallel to each other, that the axes 601 and 501 are substantially parallel and that axes 602 and 702 are substantially parallel also, the upper key axis 601 and base key way axis 501 are parallel, the lower key axis 602 and endplate axis 702 are parallel, the flying cross 60 is adapted to be engaged in both the base key way 55 and the endplate keyway 77, the securement means being a collet and post system.
Figure 2I:
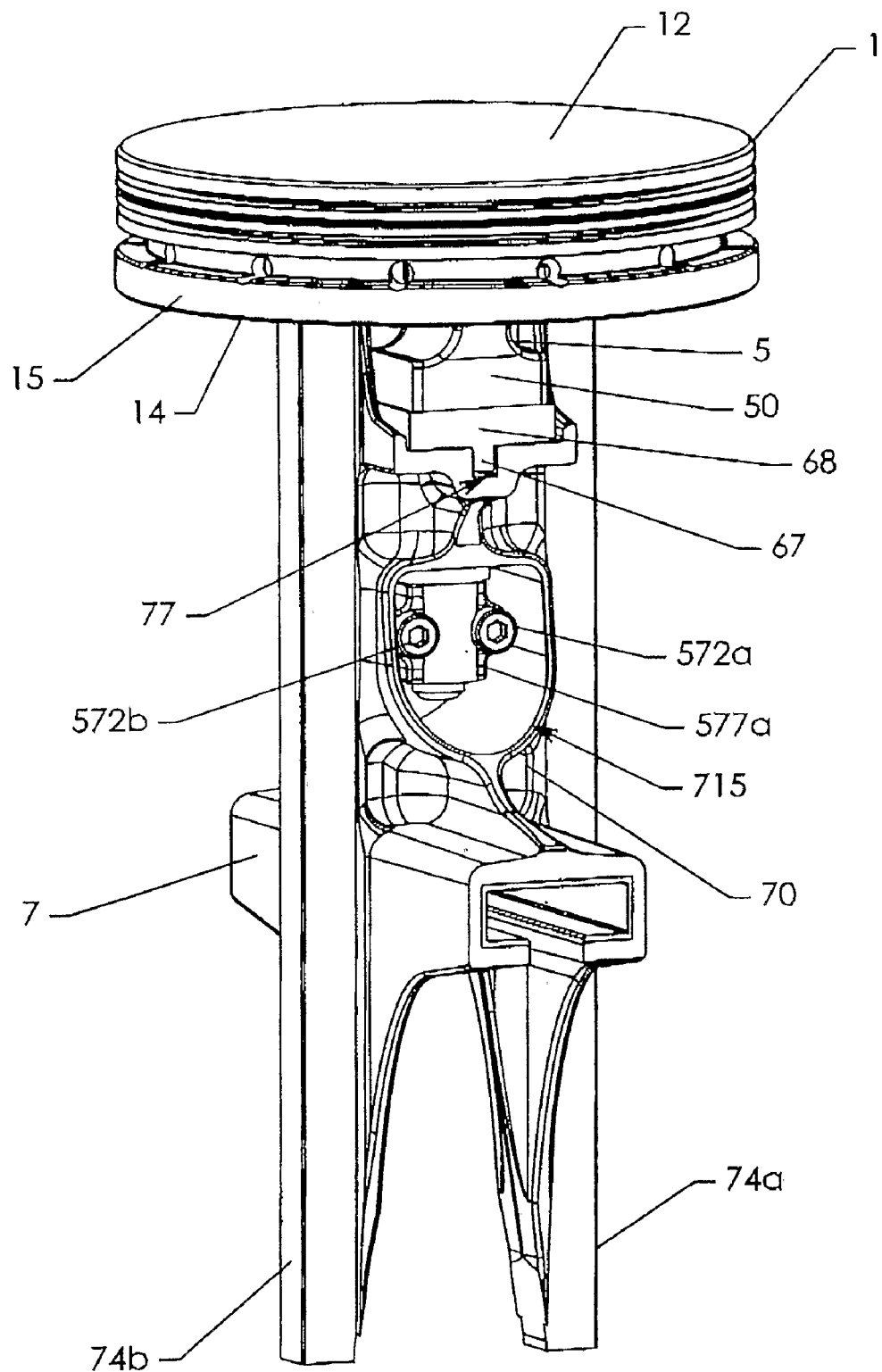
FIG. 2*i* is an isometric view of the components in FIGS. 2*a*, 2*b*, 2*c* and 2*e*, in assembled form wherein it can be seen that the lower key 67 of the flying cross 60 has been placed into the endplate key way 77, the upper key 66 having been placed into the base key way 55, the flat bearing arrangement 52 of the base and the flat bearing arrangement of the endplate being positioned for engagement with each other and the piston 1 is linked to the yoke structure 7 by way securement means extending through the through hole in the endplate 700, the securement means including a collet arrangement having a retaining surface below the endplate for engagement with an underside surface of the endplate, the retaining surface for holding the piston base 50 proximate to the endplate 700, the nature of the engagement of the flat bearing arrangement 52 of the base and the flat bearing arrangement of the end plate being such that the piston 1 is prevented from rotating around an axis perpendicular relative to the piston axis 11, the flying cross engagement with the endplate key way 77 and the base key way 55 being such that the piston 1 is prevented from rotating around the piston axis 11, the piston 1 and the yoke structure 77 can move sideways relative to each other but sideways motion is constrained to be along the plane of engagement of the base flat type bearing arrangement 52 with the endplate flat type bearing arrangement, and then only inline with the upper key axis 66 or lower key axis 67, the lower key 67 engagement with the endplate key way 77 being a bearing engagement such the lower key 67 is constrained to motion along the endplate keyway 77 inline with endplate key way axis 702 and the engagement of the upper key 66 with the base key way 55 being such that the upper key 66 is constrained to motion along the base key way 55 inline with the base key way axis 501.

An alternative piston arrangement can be similar to FIG. 1 except for the shape of the key way slot, the key way slot being a special type of key way of what we call a dove type key way in that the key way is adapted to capture a key suitable for engagement with is interior shape, the key way resembling a pole with a bigger ball on its end in an sectional end view of the key way.

The flying cross could have key ways instead of keys and the flying cross including a first upper keyway elongate along axis 601 and a second key way elongate along axis 602, the flying cross including a midplate 68 in which the key ways and are located.

The piston 1 could likewise include a first key adjacent its flat type bearing arrangement, the key standing proud of the bearing arrangement, this is different from FIG. 1 because the piston has a key instead of a keyway, the key elongate along axis 501.

Figure 3D:
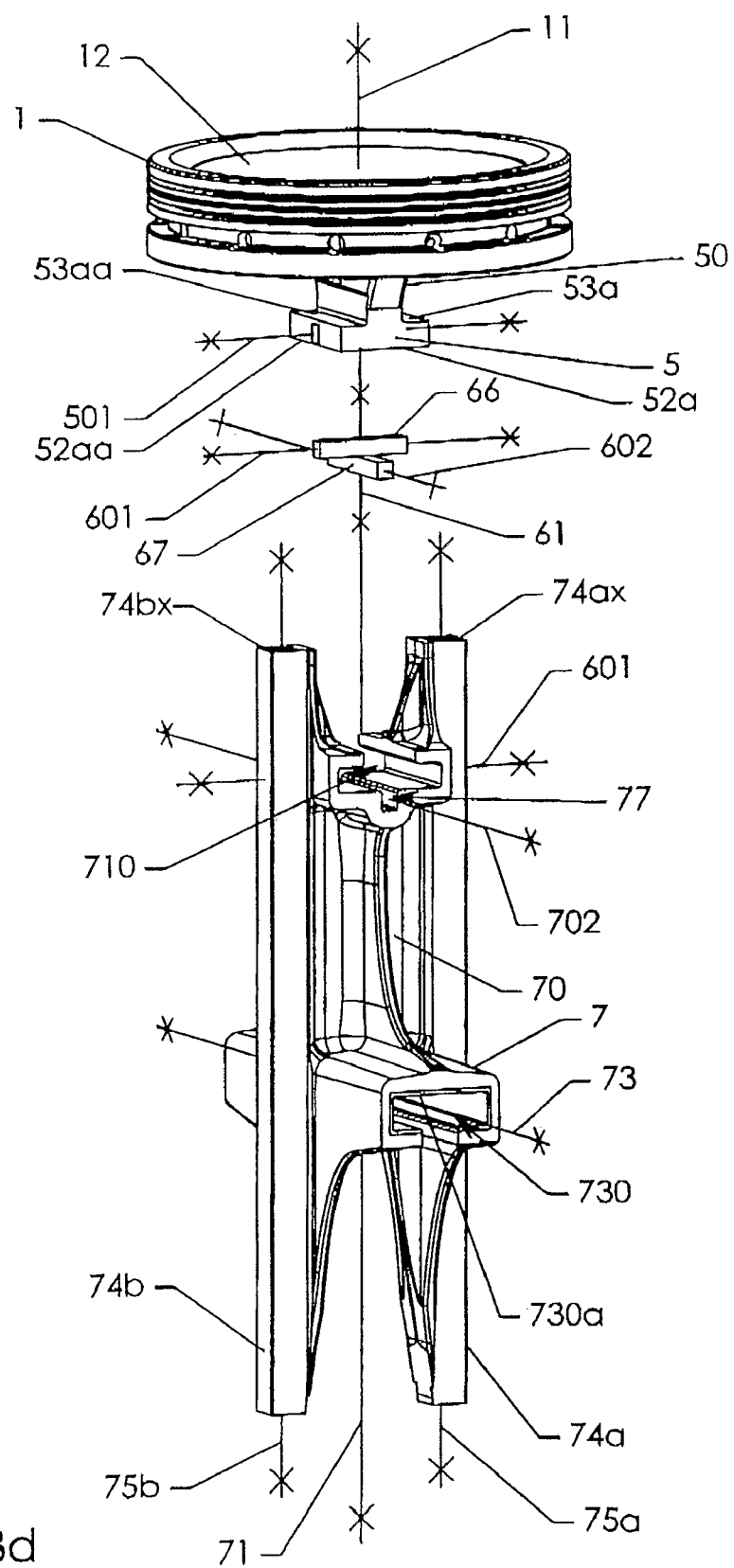
FIG. 3d is an exploded isometric view of an assembly of components from FIGS. 3a, 3b, 3c, it can be seen that the piston axis 11 and the flying cross alignment axis 61 and the yoke structure axis 71 are substantially parallel, that the axes 601 and 501 are substantially parallel and that axes 602 and 702 are substantially parallel also, the upper key 66 may be moved into the base key way 55, the lower key 67 may be moved into the T-slot floor key way 77, the flying cross 60 is adapted to be engage both the base key way 55 and the T-slot floor keyway 77.
Figure 3E:
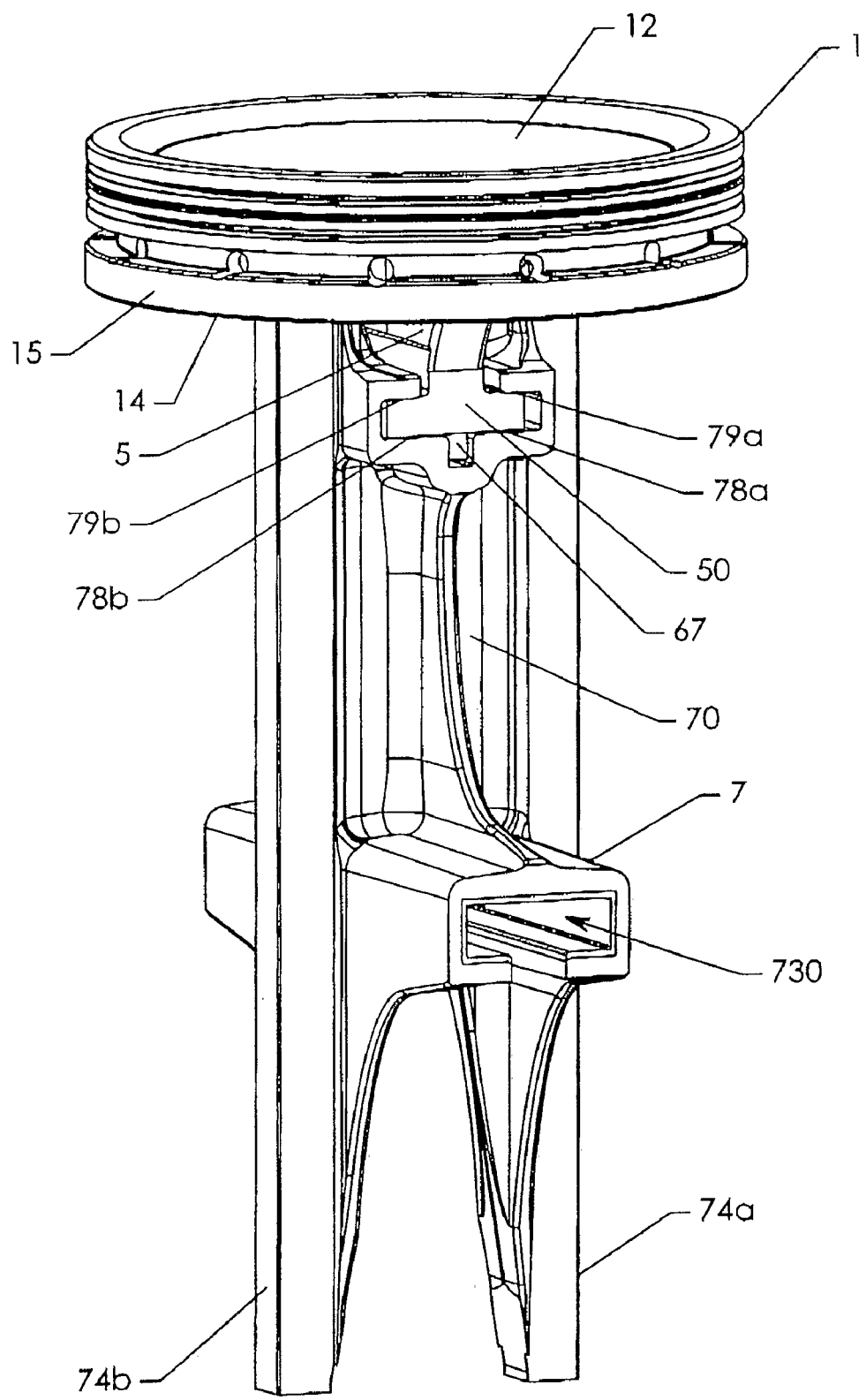
FIG. 3e is an isometric view of the components in FIGS. 3a, 3b, 3c in assembled form wherein it can be seen that the lower key 67 of the flying cross 60 has been moved into the T-slot floor key way 77, the upper key 66 having been moved into the base key way 55, the flat bearing arrangement 52 of the base and the flat bearing arrangement 53 of the T-slot 700 being positioned for engagement with each other and the piston 1 is linked to the yoke structure 7 by way of the piston foot T-piece 50 being captive in the T-slot 700 of the shank 70, the nature of the engagement of the flat bearing arrangement 52 of the base and the flat bearing arrangement of the T-slot being such that the piston 1 is prevented from rotating around an axis perpendicular relative to the piston axis 11, the flying cross 60 engagement with the T-slot floor key way 77 and the base key way 55 being such that the piston 1 is prevented from rotating around the piston axis 11, the piston 1 and the yoke structure 7 can move sideways relative to each other but sideways motion is constrained to be along the plane of engagement of the base flat type bearing 52 arrangement with the T-slot flat type bearing arrangement and then only inline with the upper key axis 66 or lower key axis 67, the lower key 67 engagement with the t-slot floor key way 77 being a bearing engagement such the lower key 67 is constrained to motion along the T-slot floor keyway 77 inline with key way axis 702 and the engagement of the upper key 66 with the base key way 55 being such that the upper key 66 is constrained to motion along the base key way 55 inline with the base key way axis 501, it is clear that the piston base and the flying cross and the shank end portion of the yoke are member of flat joint arrangement enabling the piston to be held to the yoke for the purposes of reciprocation along the piston axis but free to move transversely relative to the yoke axis 71 to find a place to be in the cylinder actively even during reciprocation of the piston.

The yoke structure 7 could likewise include a key instead of a key way as is the case in FIG. 3.

Figure 4D:
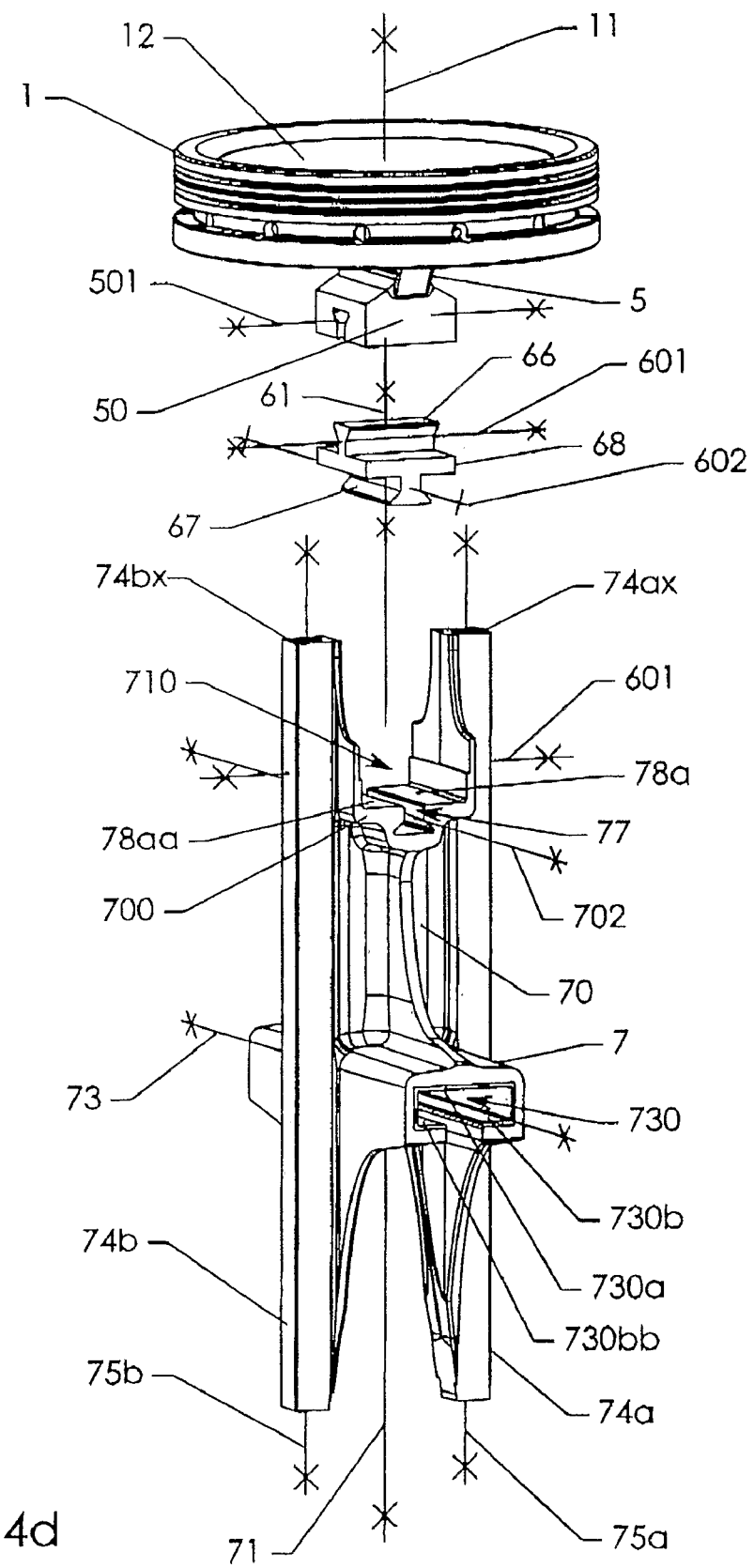
FIG. 4d is an exploded isometric view of an assembly of components from FIGS. 1a, 1b, 1c, it can be seen that the piston axis 11 and the flying cross alignment axis 61 and the yoke structure axis 71 are substantially parallel, that the axes 601 and 501 are substantially parallel and that axes 602 and 702 are substantially parallel also, the upper key 66 may be moved into the base key way 55 in a direction along the axes 501 and 601, the lower key 67 may be moved into the endplate key way along axes 602 and 702, the flying cross 60 is being captive in both the base key way 55 and the endplate keyway 77.
Figure 4E:
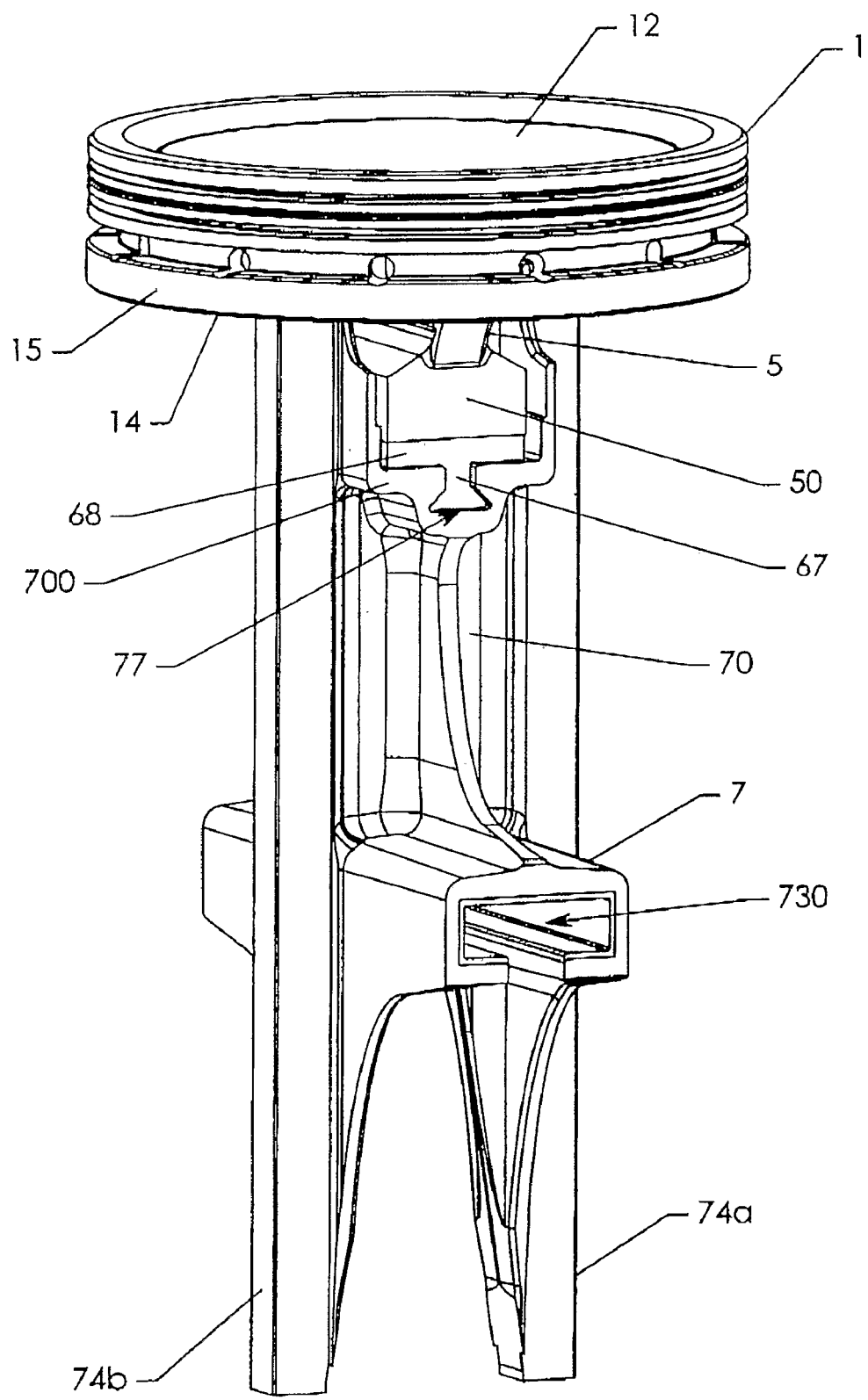
FIG. 4e is an isometric view of the components in FIGS. 1a, 1b, 1c in assembled form wherein it can be seen that the lower key 67 of the flying cross 60 has been moved into the endplate key way 77, the upper key 66 having been moved into the base key way 55, the midplate being positioned between the flat bearing arrangement 52 of the base 50 and the flat bearing arrangement of the endplate 700 such that it is positioned for engagement with the piston base flat type bearing arrangement and the endplate flat bearing arrangement and the nature of the engagement of the flat bearing arrangement 52 of the base and the flat bearing arrangement of the end plate with the midplate flat bearing arrangement being such that the piston 1 is prevented from rotating around an axis perpendicular relative to the piston axis 11, the flying cross 60 engagement with the endplate key way 77 and the base key way 55 being such that the piston 1 is prevented from rotating around the piston axis 11, the piston 1 and the yoke structure 7 can move sideways relative to each other but sideways motion is constrained to be along the plane of engagement of the base flat type bearing arrangement 52 with the endplate flat type bearing arrangement and then only inline with the upper key axis 66 or lower key axis 67, the lower key engagement with the endplate key way 77 being a bearing engagement such the lower key 67 is constrained to motion along the endplate keyway 77 inline with endplate key way axis 702 and the engagement of the upper key 66 with the base key way 55 being such that the upper key 66 is constrained to motion along the base key way 55 inline with the base key way axis 501, the flying cross linking the piston 1 to the yoke structure 7, the piston being restricted to move inline the upper key axis 601 of the flying cross 60 and together with the flying cross to movement inline with the keyway axis 702 of the endplate 700, clearly once again it can be seen that the base and the flying cross and the shank end of the yoke structure cooperate together to form a flat type joint arrangement allowing the piston or the yoke to move sideways relative to the yoke axis 71 or piston axis 1 and when the assembly is mounted for reciprocation along a cylinder axis of a cylinder the yoke and the piston can move transversely relative to the cylinder axis but remain together for the purposes of reciprocation.

Upon assembly of these alternative components the base key would be fitted into the flying cross upper key way and the yoke structure shank end arrangement key would be fitted into the lower key way of the flying cross, the flat joint formed by the arrangement being simliar to that of FIGS. 4 and 5. The functionality is the same it is just that the sex of each component in the key system has been reversed. So all the reader need do in comprehend that the keys can be swapped for keyways in the system as long as there is a mate of engagement between male and female key feature in need not matter which member is what sex.

The claims defining the invention:

1. A scotch yoke engine or pump includes a block, a crankshaft having a main axis and including an offset big end bearing pin, a slider mechanism mounted for rotation on the bearing pin, a piston having a piston axis, a yoke structure including first guide means which is elongate along an axis extending perpendicular relative to the piston axis, the first guide means engaging the slider mechanism and constraining the slider mechanism to reciprocate along the first guide means, the yoke structure including second guide means for constraining the yoke structure to reciprocate along the piston axis, the second guide means engaging third guide means, the engagement of the second guide means with the third guide means being such that the yoke structure is prevented from rotating around an axis parallel to the main axis, the piston and the yoke structure being separate units;
   the piston having a crown and a base surface opposite the crown;
   the yoke structure having an end facing the piston base;
   the end of the yoke structure and the piston base having respective bearing surfaces;
   the bearing surfaces being members of a flat bearing joint which also includes a flying key, the flying key having an upper key element which engages a cooperating key element of the piston base, the flying key having a lower key element which engages a cooperating key element of the yoke end, the piston and the yoke structure being connected together such that the piston is prevented from rotating relative to the yoke structure but is allowed to move relative to the yoke structure along a path defined by the upper key element, and the flying key is free to move relative to the yoke structure along a path defined by the lower key element, during engine operation.

2. A scotch yoke engine or pump according to claim 1 wherein the bearing surface of the piston base bears directly on the bearing surface of the end of the yoke.

3. A scotch yoke engine or pump according to claim 2 wherein the bearing surface of the piston base surface bears on the bearing surface of the end of the yoke by way of rolling bearings.

4. A scotch yoke engine or pump according to claim 1 wherein the bearing surface of the piston base extends along a plane extending perpendicular to the piston axis.

5. A scotch yoke engine or pump according to claim 1 wherein the bearing surface of the piston base bears indirectly on the bearing surface of the end of the yoke, the respective bearing surfaces engaging respective surfaces of a midplate, wherein the upper key element is located on a first side of the midplate and the lower key element is located on an opposite second side of the midplate.

6. A scotch yoke engine or pump according to claim 1 wherein the yoke structure includes a shank having a T-slot in its head end for trapping the piston base.

7. A scotch yoke engine or pump according to claim 1 wherein the yoke structure includes a shank having a T-piece at its head end for being trapped by a slot in the piston base.

8. A scotch yoke engine or pump according to claim 1 wherein the yoke structure includes a shank having an end face having a through hole through which extends a securement means.

9. A scotch yoke engine or pump according to claim 1 wherein the flying key upper key element is in engagement with a key element of the piston base and the flying key lower key element is in engagement with the key element of the end of the yoke such that the piston is maintained at a set distance from the yoke structure.

10. A scotch yoke engine or pump according to claim 1 wherein the flying key is adapted to carry a compressive load.

11. A scotch yoke engine or pump according to claim 1 wherein the flying key is adapted to carry a tensile load.

12. A scotch yoke engine or pump according to claim 1 wherein the upper key element and the lower key element of the flying key are at an angle to each other around an axis parallel to the cylinder axis.

13. A scotch yoke engine or pump according to claim 12 wherein the angle is between 45 and 90 degrees.

14. A scotch yoke piston and yoke assembly, the piston having a piston axis, the yoke including first guide means which is elongate along an axis extending perpendicular relative to the piston axis and a second guide means which is elongate along an axis parallel to the piston axis;

the piston having a crown and a base opposite the crown;

the yoke having an end facing the piston base;

the end of the yoke and the base of the piston having respective bearing surfaces;

the bearing surfaces being members of a flat bearing joint which also includes a flying key, the flying key having an upper key element which engages a cooperating key element of the piston base, the flying key having a lower key element which engages a cooperating key element of the yoke end, the flat bearing joint preventing rotation of the piston relative to the yoke but allowing movement of the piston relative to the flying key along a path defined by the upper key element, the flying key being free to move relative to the yoke along a path defined by the key element of the yoke end.

15. A scotch yoke engine or pump according to claim 12 wherein the angle is 90 degrees.

* * * * *